United States Patent
Onozaki

(10) Patent No.: US 10,295,808 B2
(45) Date of Patent: May 21, 2019

(54) ZOOM LENS SYSTEM HAVING THIRD LENS GROUP WITH AIR LENS FORMED OF ADJACENT NEGATIVE AND POSITIVE SINGLE LENS ELEMENTS

(71) Applicant: RICOH IMAGING COMPANY, LTD., Tokyo (JP)

(72) Inventor: Tatsuyuki Onozaki, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/882,486

(22) Filed: Jan. 29, 2018

(65) Prior Publication Data

US 2018/0149844 A1 May 31, 2018

Related U.S. Application Data

(62) Division of application No. 14/524,472, filed on Oct. 27, 2014, now Pat. No. 9,915,811.

(30) Foreign Application Priority Data

Nov. 1, 2013 (JP) ................................ 2013-227784
Nov. 1, 2013 (JP) ................................ 2013-227785

(51) Int. Cl.
*G02B 15/14* (2006.01)
*G02B 15/16* (2006.01)
(Continued)

(52) U.S. Cl.
CPC ......... *G02B 15/177* (2013.01); *G02B 27/646* (2013.01); *G02B 15/14* (2013.01);
(Continued)

(58) Field of Classification Search
CPC ...... G02B 13/009; G02B 15/14; G02B 15/16; G02B 15/163; G02B 15/177; G02B 15/20; G03B 2205/0046
(Continued)

(56) References Cited

U.S. PATENT DOCUMENTS 5,663,835 A 9/1997 Shibayama
5,835,272 A * 11/1998 Kodama ............... G02B 15/177
359/557

(Continued)

FOREIGN PATENT DOCUMENTS

JP 07-152002 6/1995
JP 08-094935 4/1996
(Continued)

OTHER PUBLICATIONS

Office Action issued in Japan Counterpart Patent Appl. No. 2013-227785, dated Jul. 4, 2017, along with an English translation thereof.

*Primary Examiner* — Stephone B Allen
*Assistant Examiner* — Ryan S Dunning
(74) *Attorney, Agent, or Firm* — Greenblum & Bernstein, P.L.C.

(57) ABSTRACT

A zoom lens system includes a negative first lens group, a positive second lens group, a negative third lens group and a positive fourth lens group, in that order from the object side. Upon zooming from a short focal length extremity to a long focal length extremity, at least the first lens group, the second lens group and the fourth lens group are moved in the optical axis direction of the zoom lens. The third lens group includes a negative first sub-lens group and a negative second sub-lens group, in that order from the object side, the second sub-lens group is provided with a negative single lens element and a positive single lens element, and an air
(Continued)

lens is formed between the negative single lens element and the positive single lens element.

13 Claims, 69 Drawing Sheets

(51) Int. Cl.
 *G02B 15/163* (2006.01)
 *G02B 15/167* (2006.01)
 *G02B 15/177* (2006.01)
 *G02B 27/64* (2006.01)
 *G02B 15/20* (2006.01)

(52) U.S. Cl.
 CPC ............ *G02B 15/16* (2013.01); *G02B 15/163* (2013.01); *G02B 15/167* (2013.01); *G02B 15/20* (2013.01); *G03B 2205/0046* (2013.01)

(58) Field of Classification Search
 USPC ......... 348/240.99–240.3, 335–369; 359/379, 359/380, 422, 432, 676–680, 682–686
 See application file for complete search history.

(56) References Cited

U.S. PATENT DOCUMENTS

| | | |
|---|---|---|
| 6,320,698 B1 | 11/2001 | Suzuki |
| 2004/0156120 A1 | 8/2004 | Yoneyama |
| 2008/0144189 A1 | 6/2008 | Iwasawa et al. |
| 2008/0285146 A1 | 11/2008 | Shirasuna |
| 2010/0188755 A1 | 7/2010 | Shibata |
| 2010/0238560 A1 | 9/2010 | Fujimoto |
| 2011/0164153 A1* | 7/2011 | Yoshitsugu .......... G02B 15/173 348/240.3 |
| 2012/0069441 A1* | 3/2012 | Fujimoto ............. G02B 15/177 359/557 |

FOREIGN PATENT DOCUMENTS

| | | |
|---|---|---|
| JP | 2002-287031 | 10/2002 |
| JP | 2004-061910 | 2/2004 |
| JP | 2008-145967 | 6/2008 |
| JP | 2008-281917 | 11/2008 |
| JP | 2010-170061 | 8/2010 |
| JP | 2010-217535 | 9/2010 |
| JP | 2011-145518 | 7/2011 |
| JP | 2012-063568 | 3/2012 |
| JP | 2012-068303 | 4/2012 |

* cited by examiner

SPHERICAL ABERRATION CHROMATIC ABERRATION

LATERAL CHROMATIC ABERRATION

ASTIGMATISM

DISTORTION

Fig. 16A   Fig. 16B   Fig. 16C   Fig. 16D
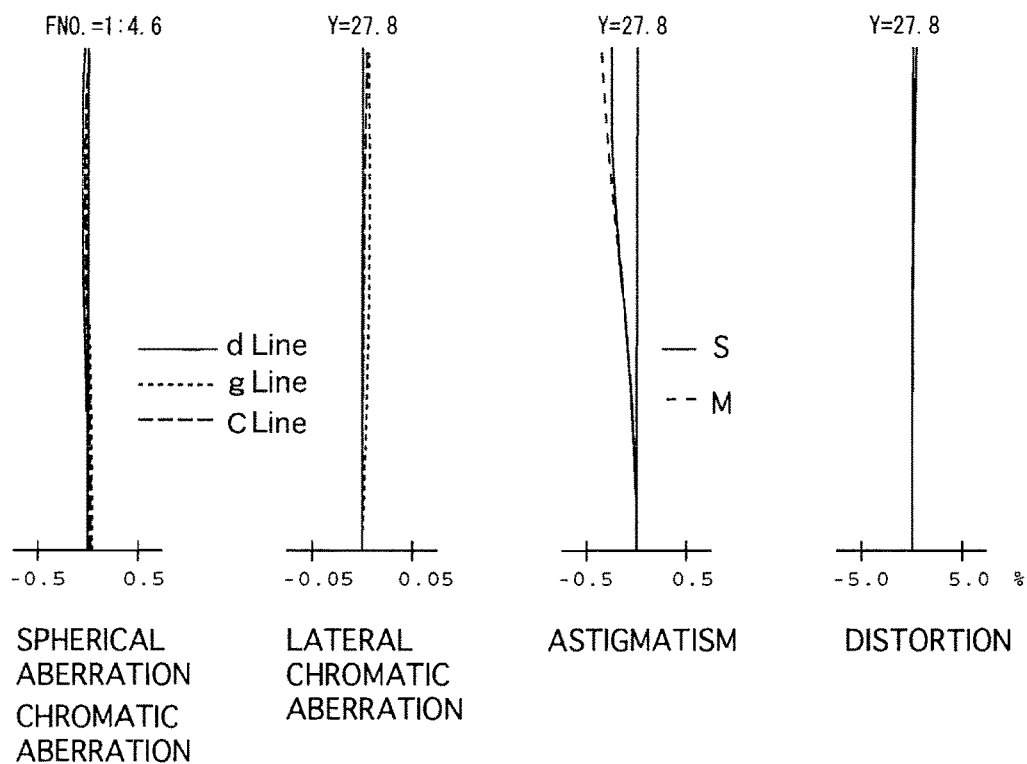
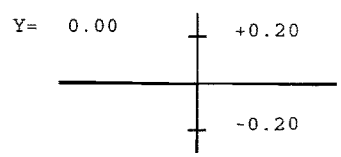
Fig. 17A
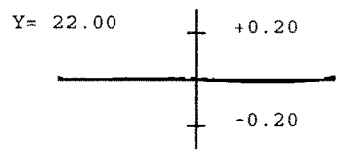
Fig. 17B
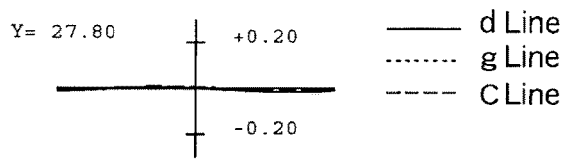
Fig. 17C Fig. 24A   Fig. 24B   Fig. 24C   Fig. 24D
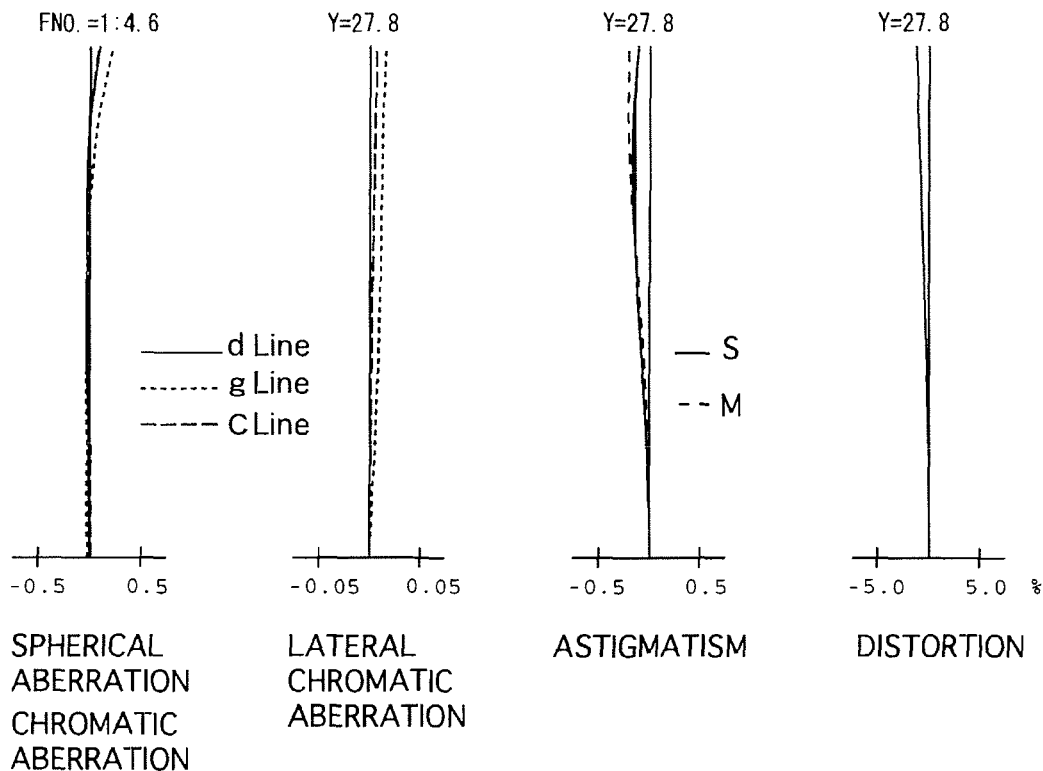
SPHERICAL         LATERAL            ASTIGMATISM       DISTORTION
ABERRATION        CHROMATIC
CHROMATIC         ABERRATION
ABERRATION
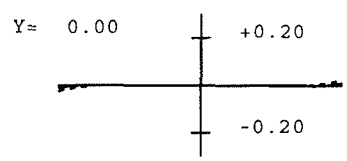
Fig. 25A
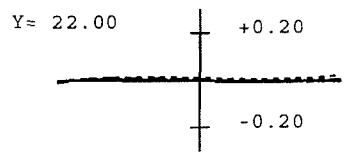
Fig. 25B
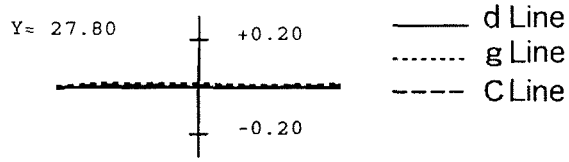
Fig. 25C SPHERICAL ABERRATION CHROMATIC ABERRATION
LATERAL CHROMATIC ABERRATION
ASTIGMATISM
DISTORTION

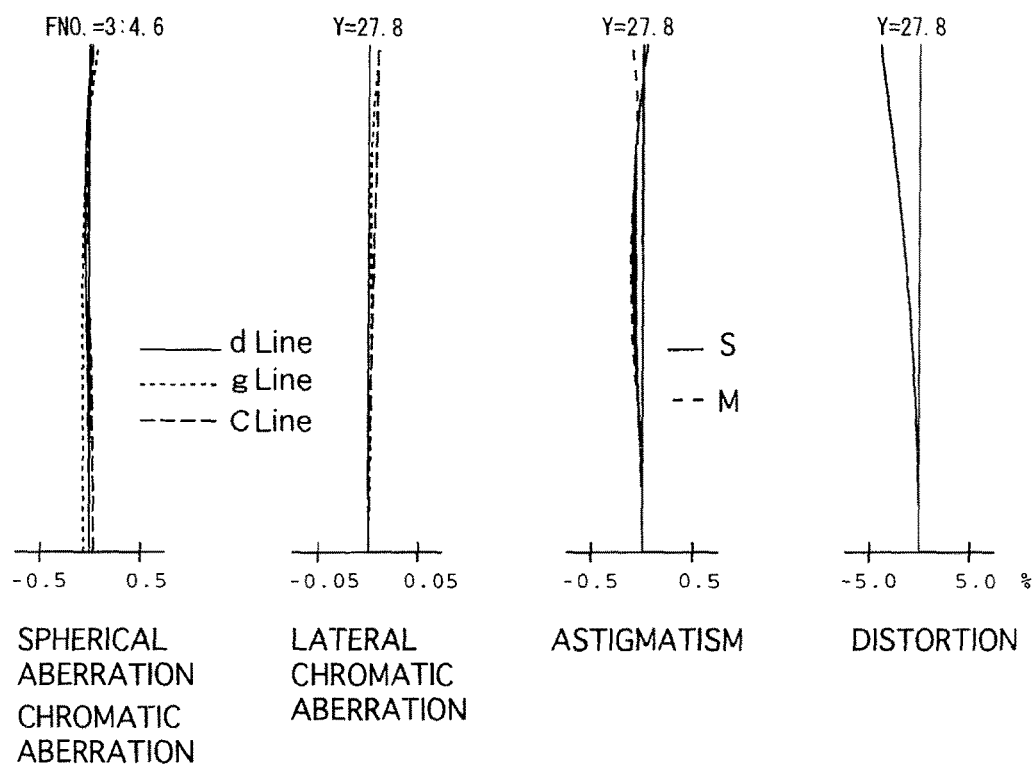
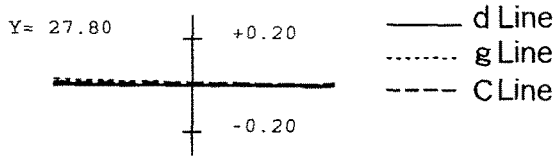

Fig. 34A    Fig. 34B    Fig. 34C    Fig. 34D
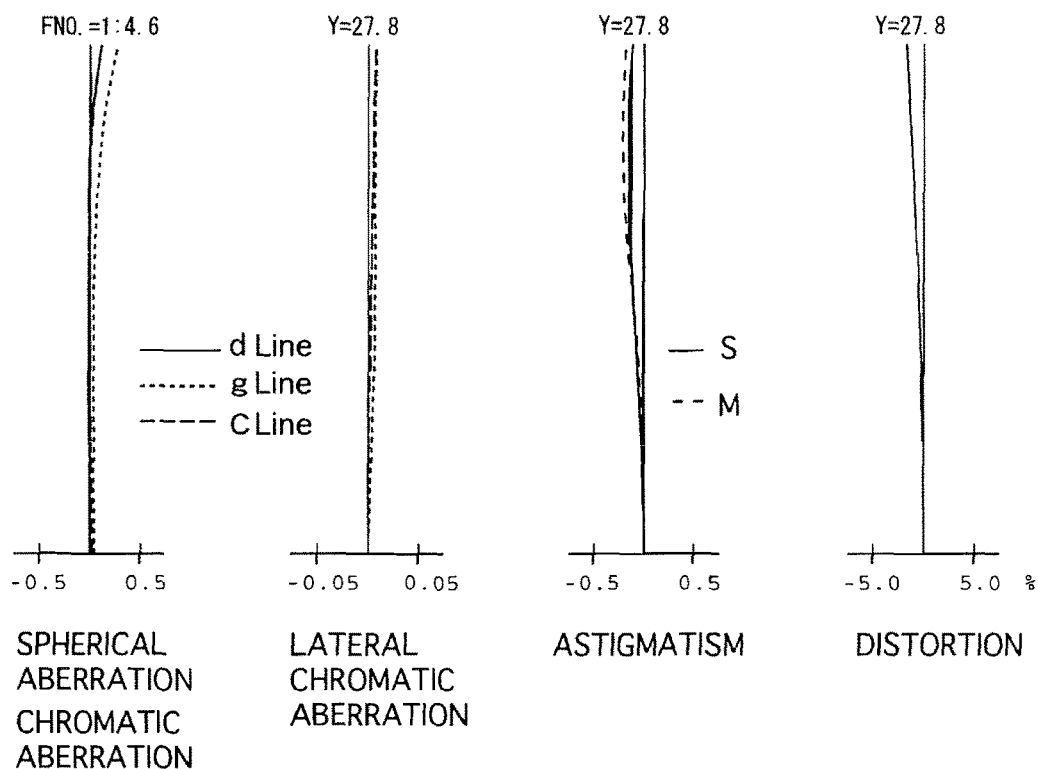
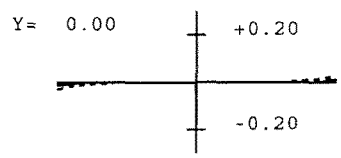
Fig. 35A
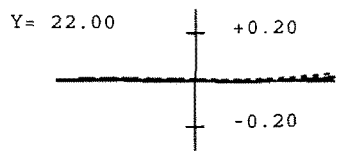
Fig. 35B
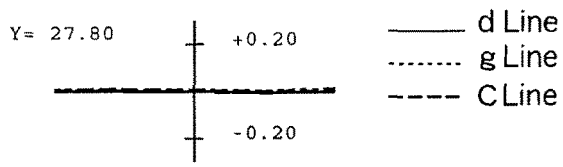
Fig. 35C

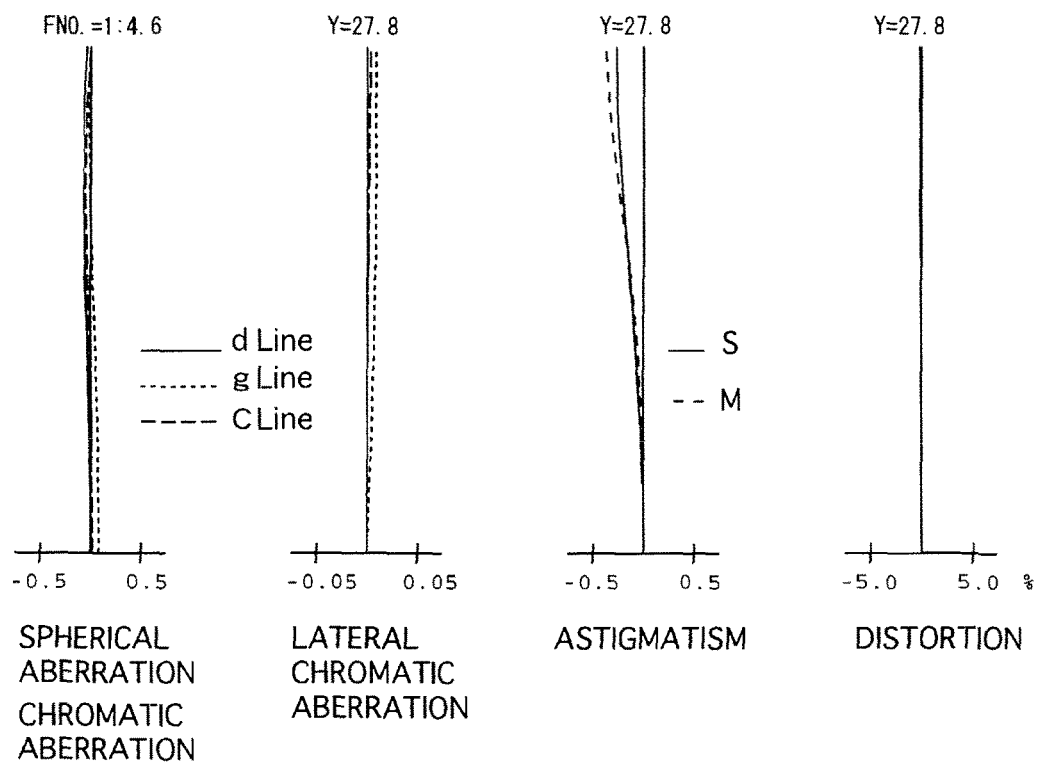
Fig. 36A  Fig. 36B  Fig. 36C  Fig. 36D
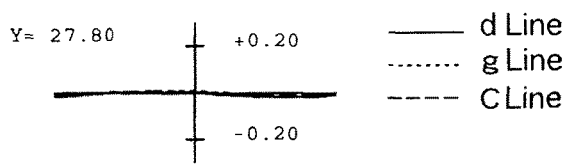
Fig. 37A
Fig. 37B
Fig. 37C

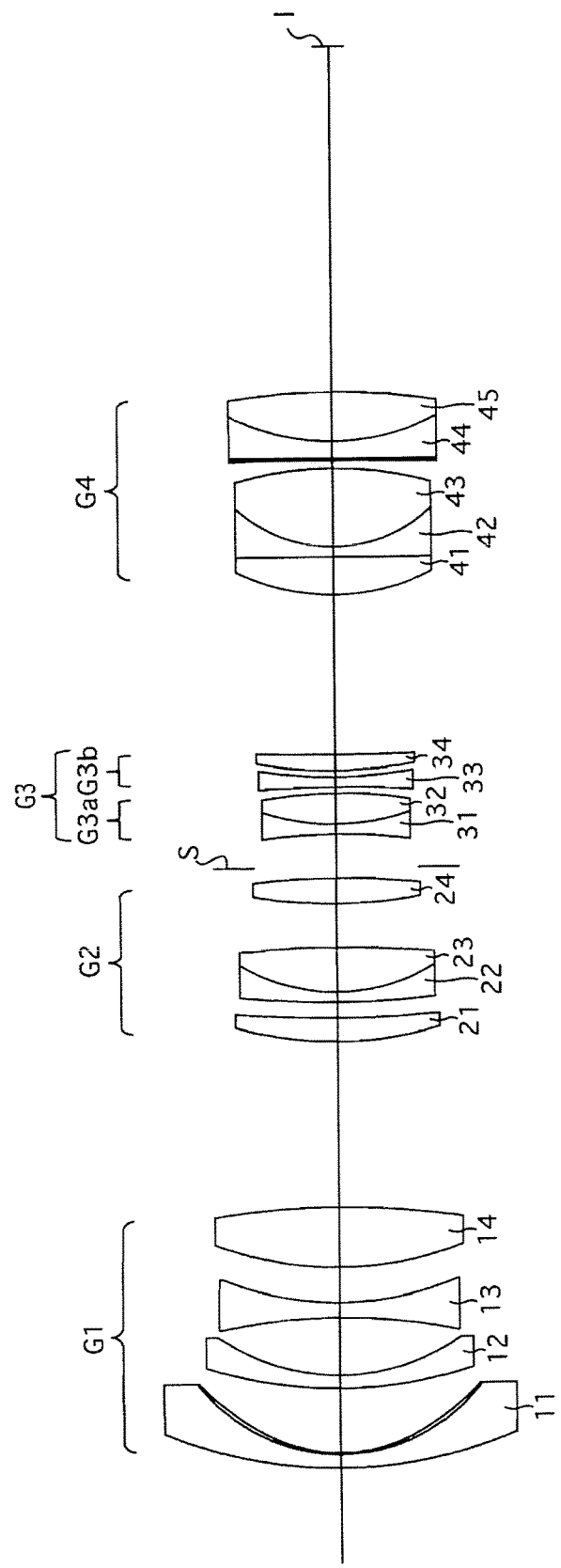

SPHERICAL ABERRATION CHROMATIC ABERRATION | LATERAL CHROMATIC ABERRATION | ASTIGMATISM | DISTORTION

SPHERICAL ABERRATION CHROMATIC ABERRATION    LATERAL CHROMATIC ABERRATION    ASTIGMATISM    DISTORTION

SPHERICAL ABERRATION CHROMATIC ABERRATION   LATERAL CHROMATIC ABERRATION   ASTIGMATISM   DISTORTION

SPHERICAL ABERRATION CHROMATIC ABERRATION   LATERAL CHROMATIC ABERRATION   ASTIGMATISM   DISTORTION

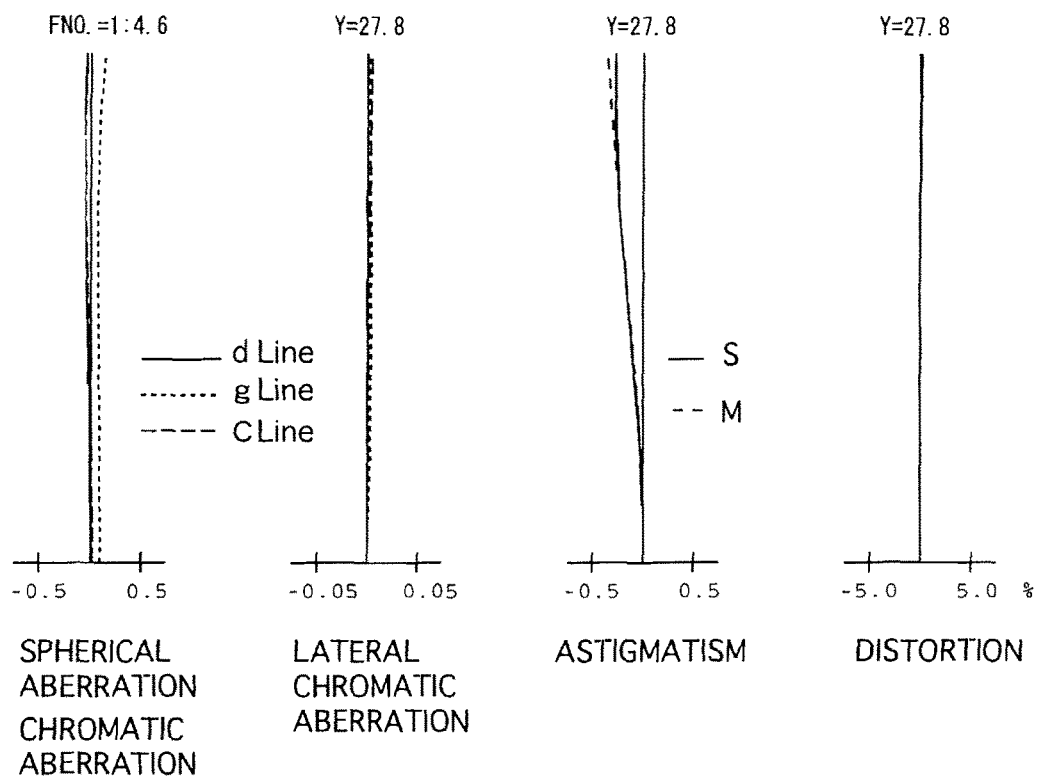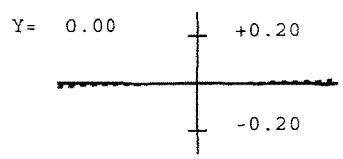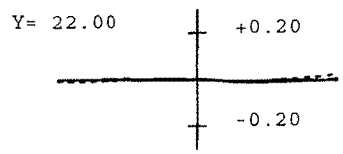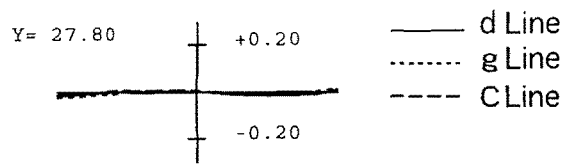

SPHERICAL ABERRATION CHROMATIC ABERRATION    LATERAL CHROMATIC ABERRATION    ASTIGMATISM    DISTORTION

SPHERICAL ABERRATION CHROMATIC ABERRATION

LATERAL CHROMATIC ABERRATION

ASTIGMATISM

DISTORTION

Fig. 66A  Fig. 66B  Fig. 66C  Fig. 66D
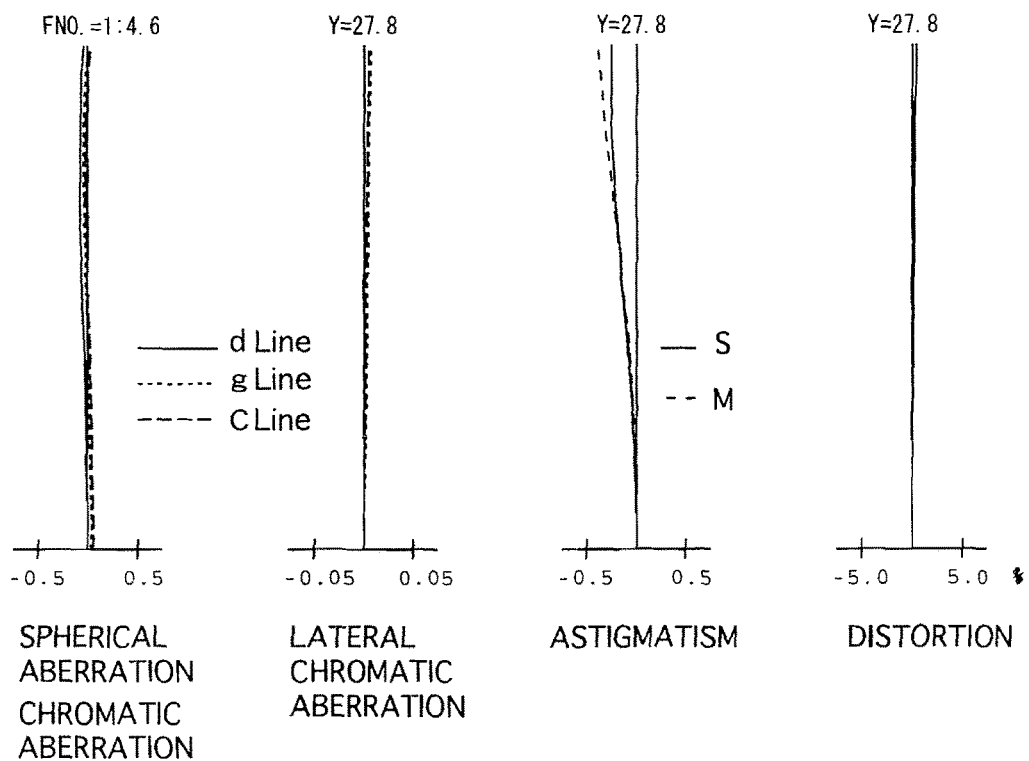
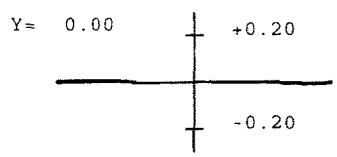
Fig. 67A
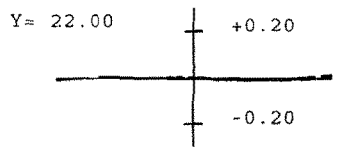
Fig. 67B
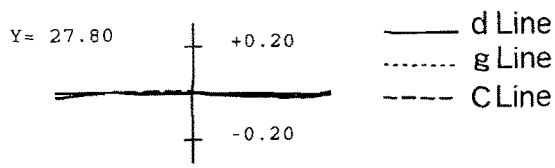
Fig. 67C Fig. 69A  Fig. 69B  Fig. 69C  Fig. 69D
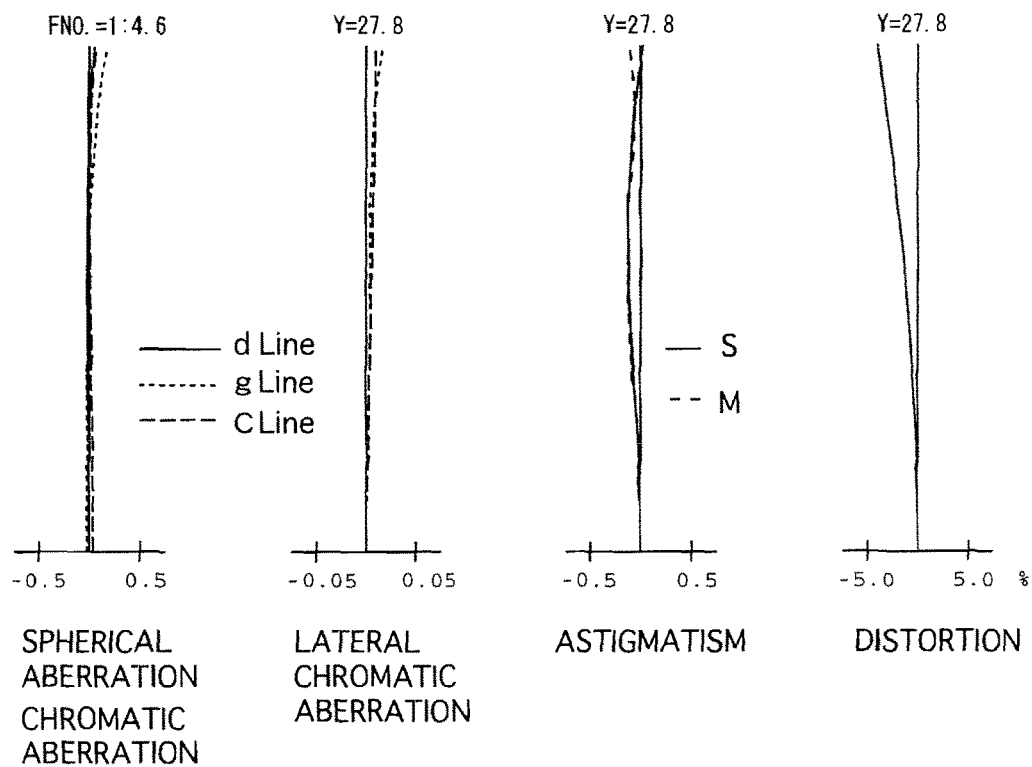
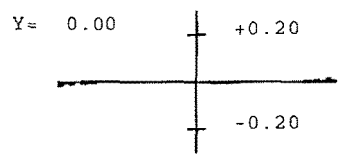
Fig. 70A
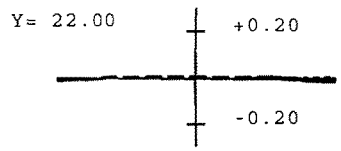
Fig. 70B
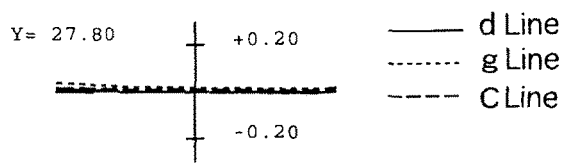
Fig. 70C Fig. 76A  Fig. 76B  Fig. 76C  Fig. 76D
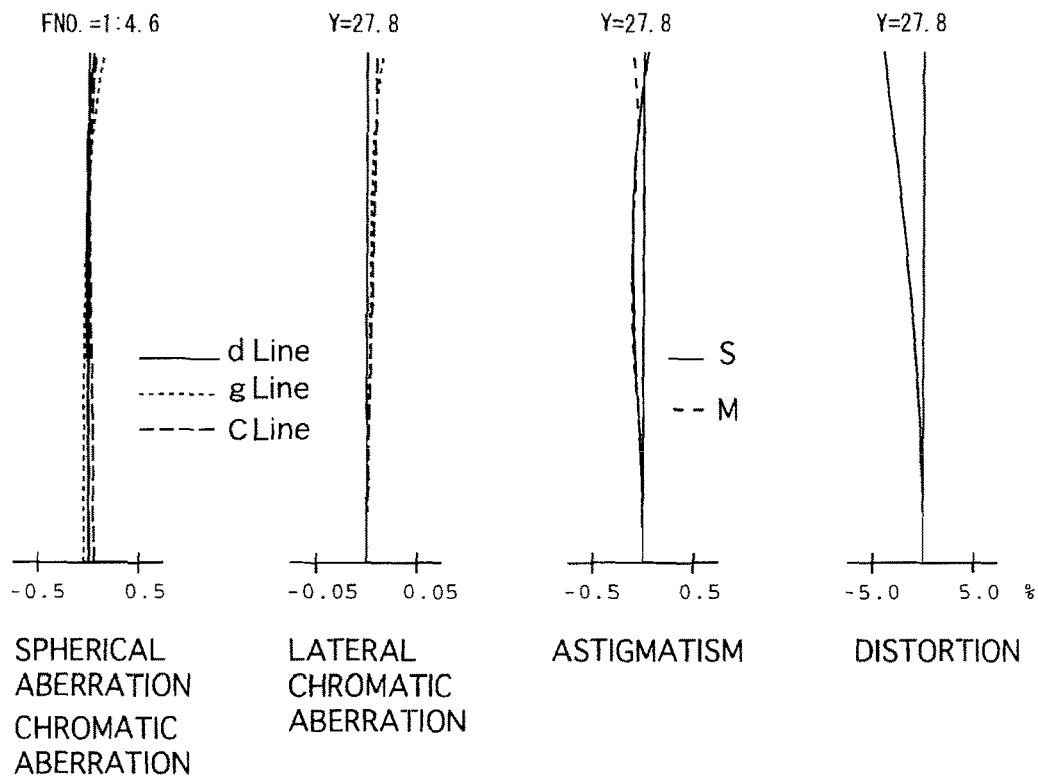
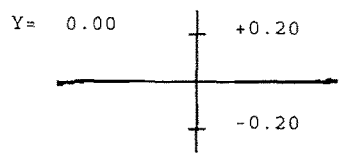
Fig. 77A
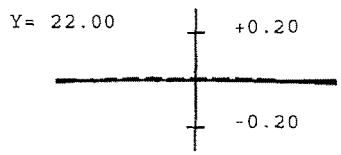
Fig. 77B
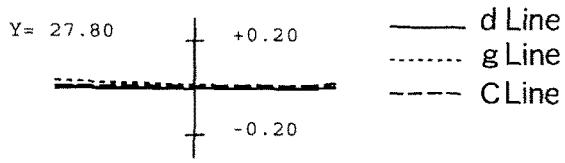
Fig. 77C

SPHERICAL ABERRATION CHROMATIC ABERRATION

LATERAL CHROMATIC ABERRATION

ASTIGMATISM

DISTORTION

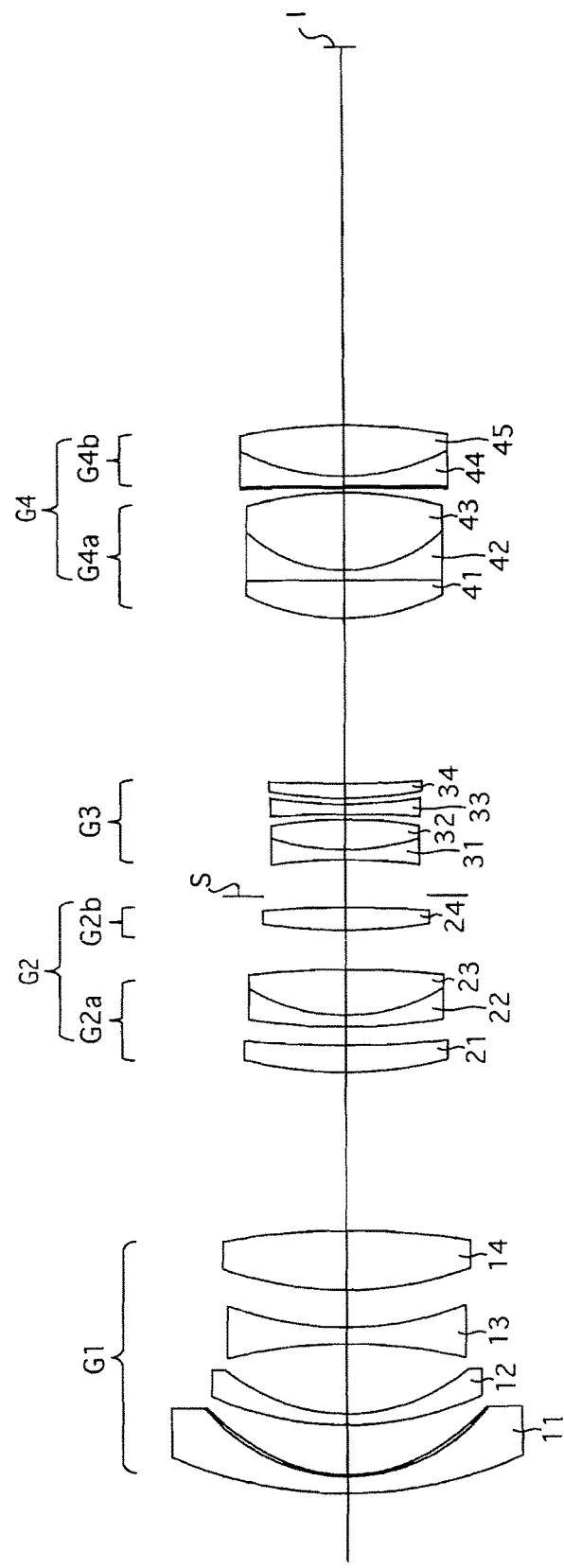

Fig. 83A  Fig. 83B  Fig. 83C  Fig. 83D
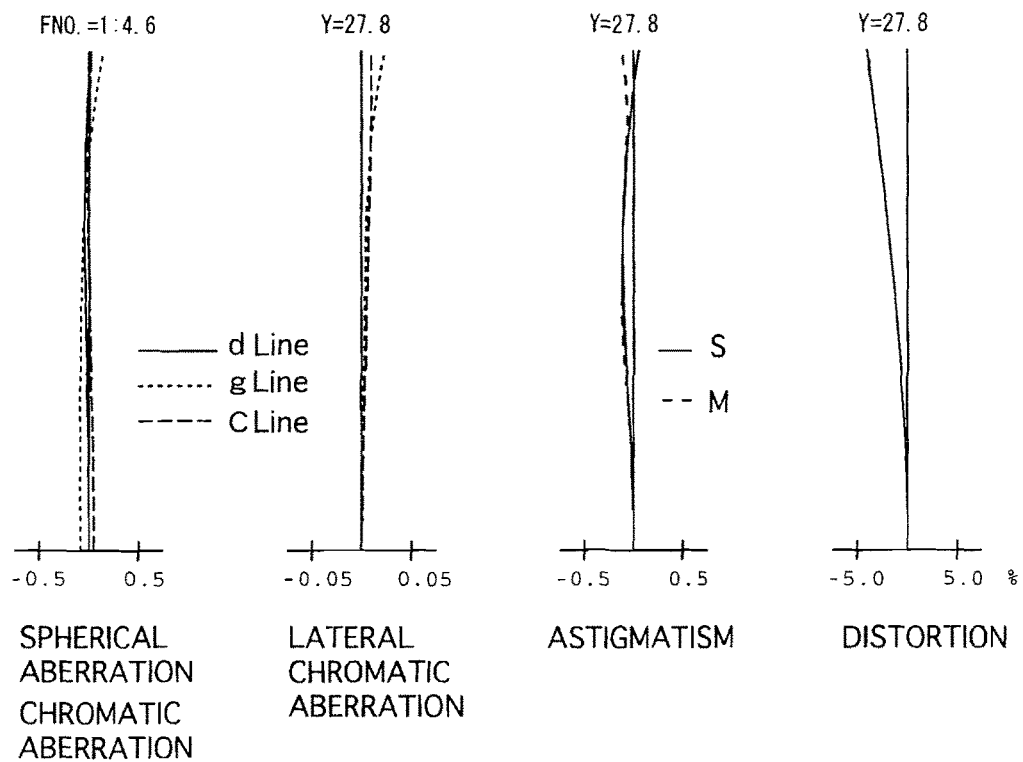
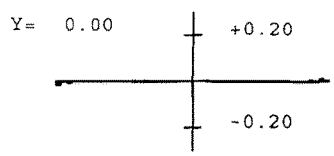
Fig. 84A
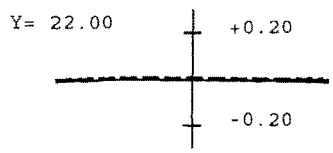
Fig. 84B
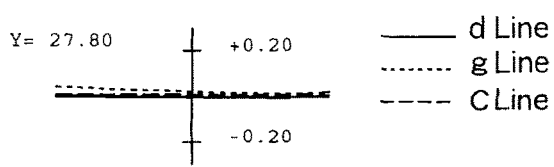
Fig. 84C

| SPHERICAL ABERRATION CHROMATIC ABERRATION | LATERAL CHROMATIC ABERRATION | ASTIGMATISM | DISTORTION |

SPHERICAL ABERRATION CHROMATIC ABERRATION

LATERAL CHROMATIC ABERRATION

ASTIGMATISM

DISTORTION

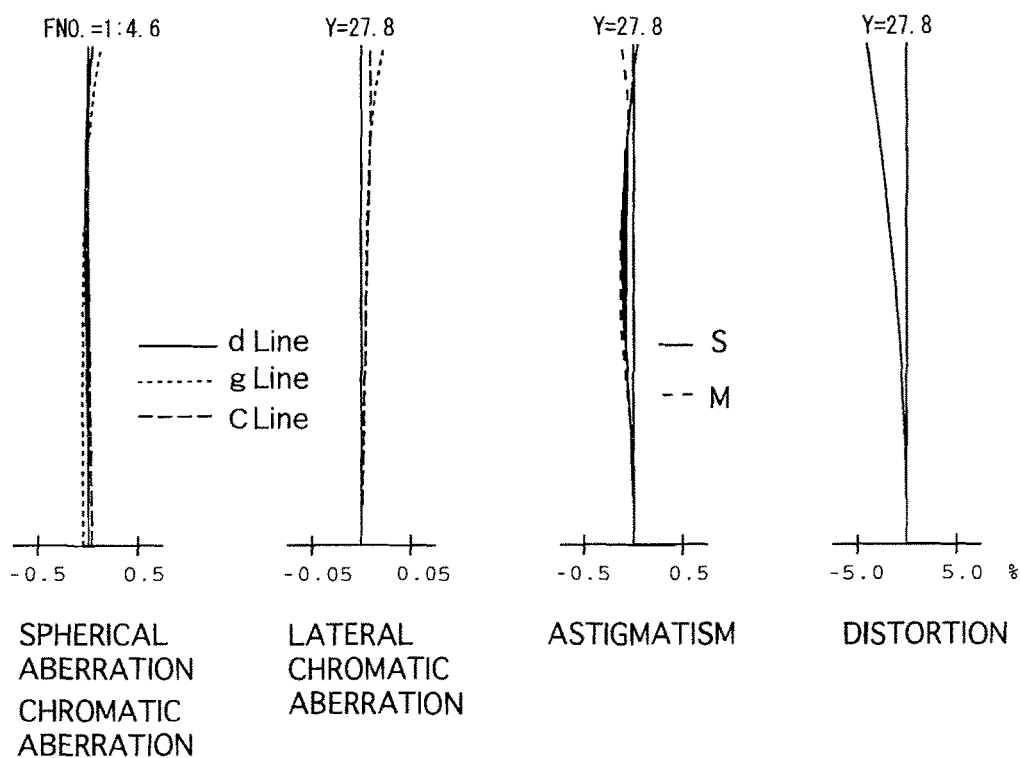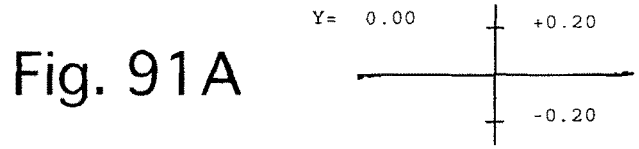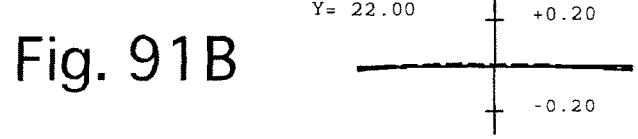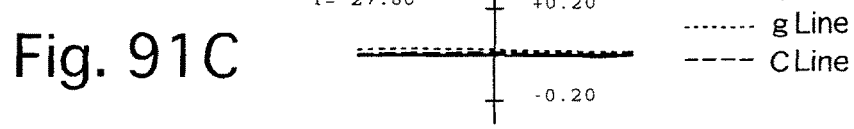

Fig. 92A  Fig. 92B  Fig. 92C  Fig. 92D
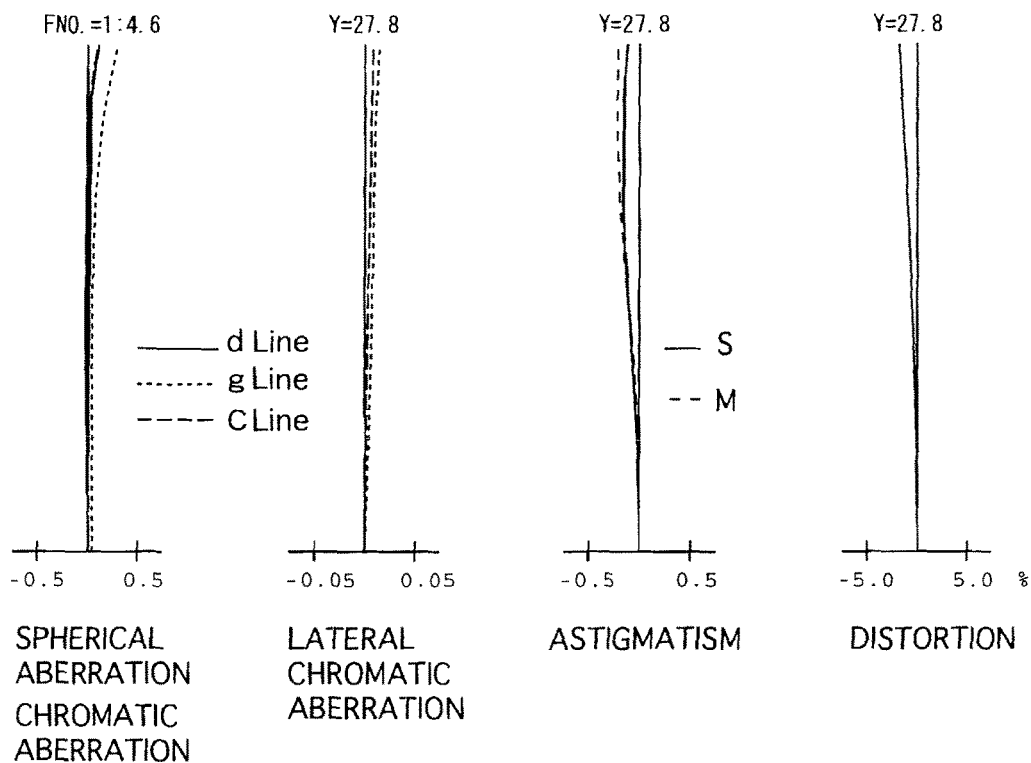
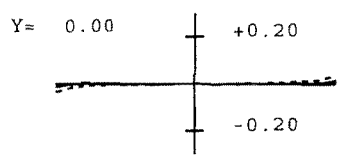
Fig. 93A
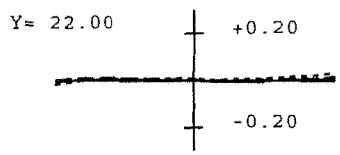
Fig. 93B
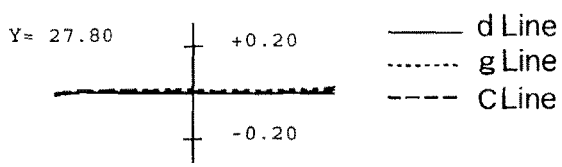
Fig. 93C Fig. 94A  Fig. 94B  Fig. 94C  Fig. 94D
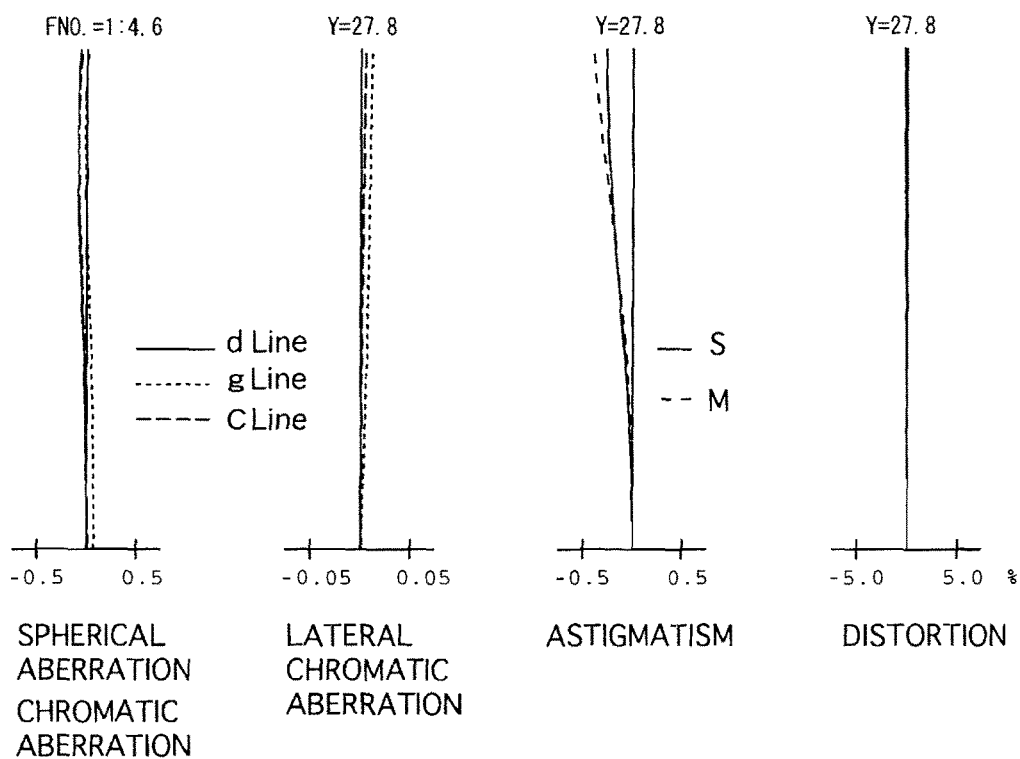
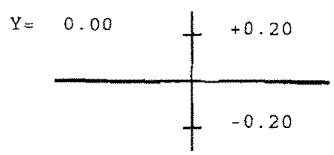
Fig. 95A
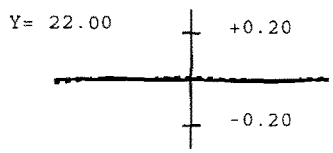
Fig. 95B
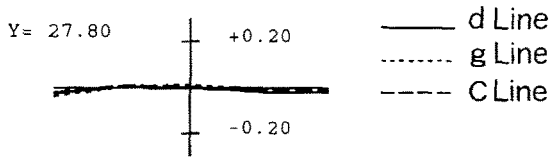
Fig. 95C Fig. 97A  Fig. 97B  Fig. 97C  Fig. 97D
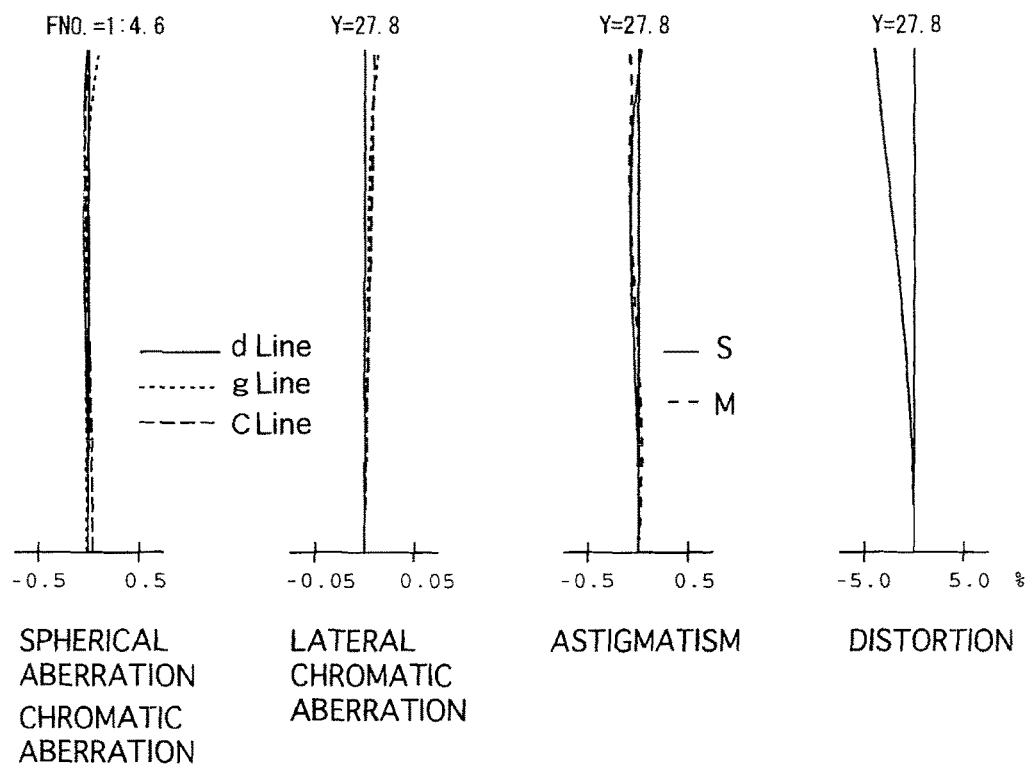
Fig. 98A
Fig. 98B
Fig. 98C
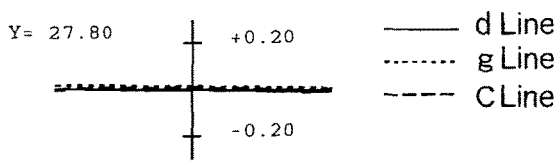

SPHERICAL ABERRATION CHROMATIC ABERRATION    LATERAL CHROMATIC ABERRATION    ASTIGMATISM    DISTORTION

Fig.101A Fig.101B Fig.101C Fig.101D
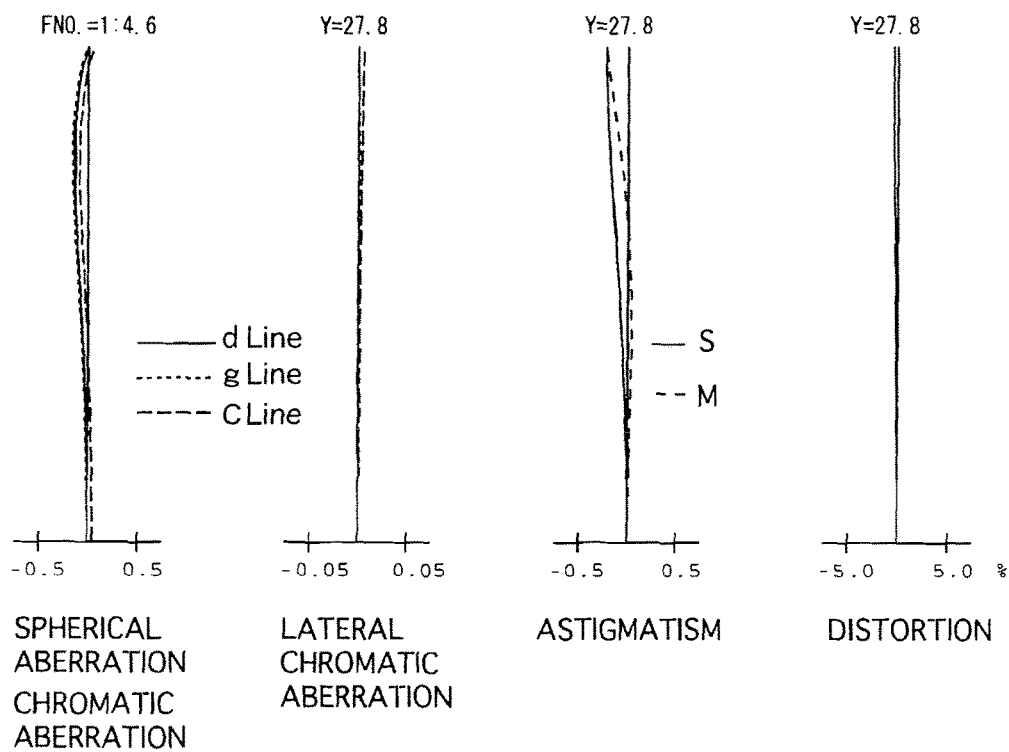
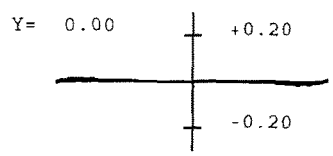
Fig.102A
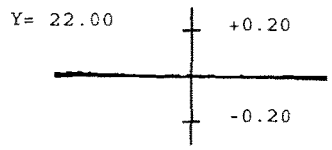
Fig.102B
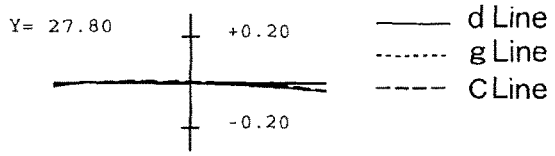
Fig.102C

Fig.106A  Fig.106B  Fig.106C  Fig.106D
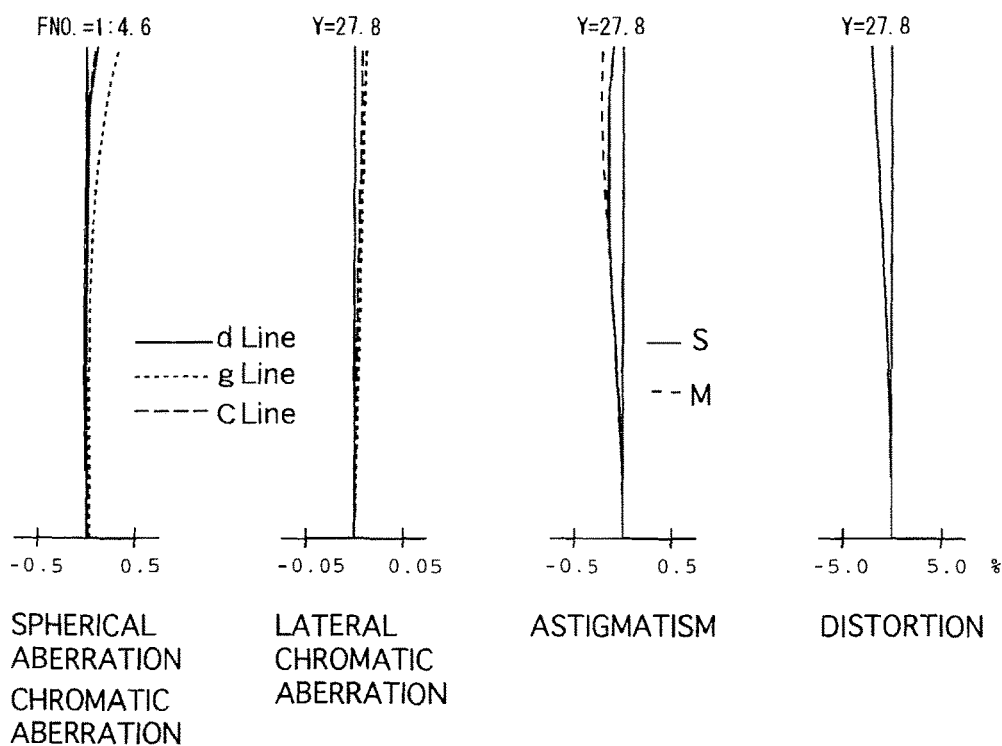
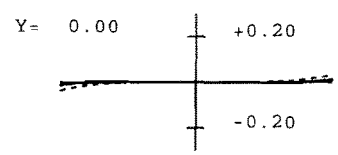
Fig.107A
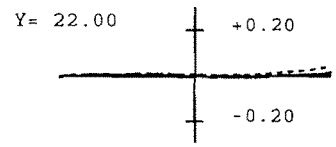
Fig.107B
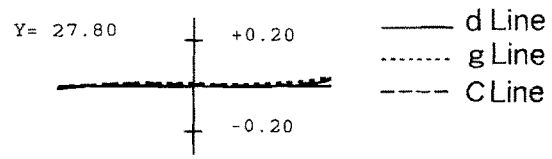
Fig.107C Fig.113A  Fig.113B  Fig.113C  Fig.113D
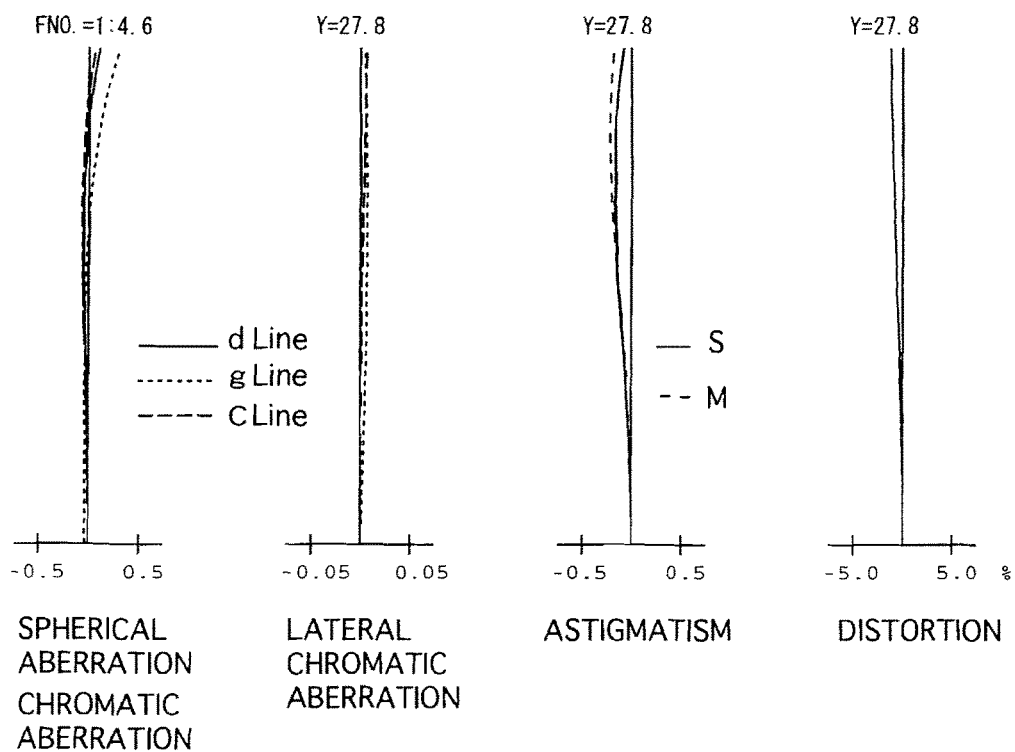
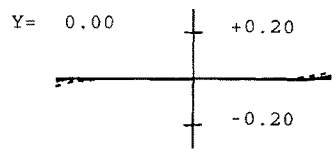
Fig.114A
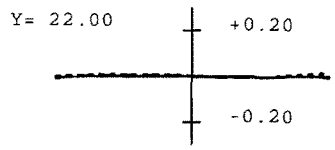
Fig.114B
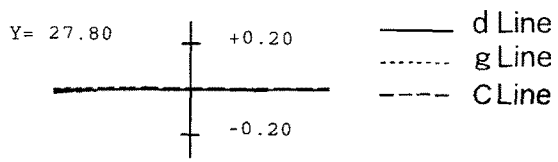
Fig.114C Fig.118A  Fig.118B  Fig.118C  Fig.118D
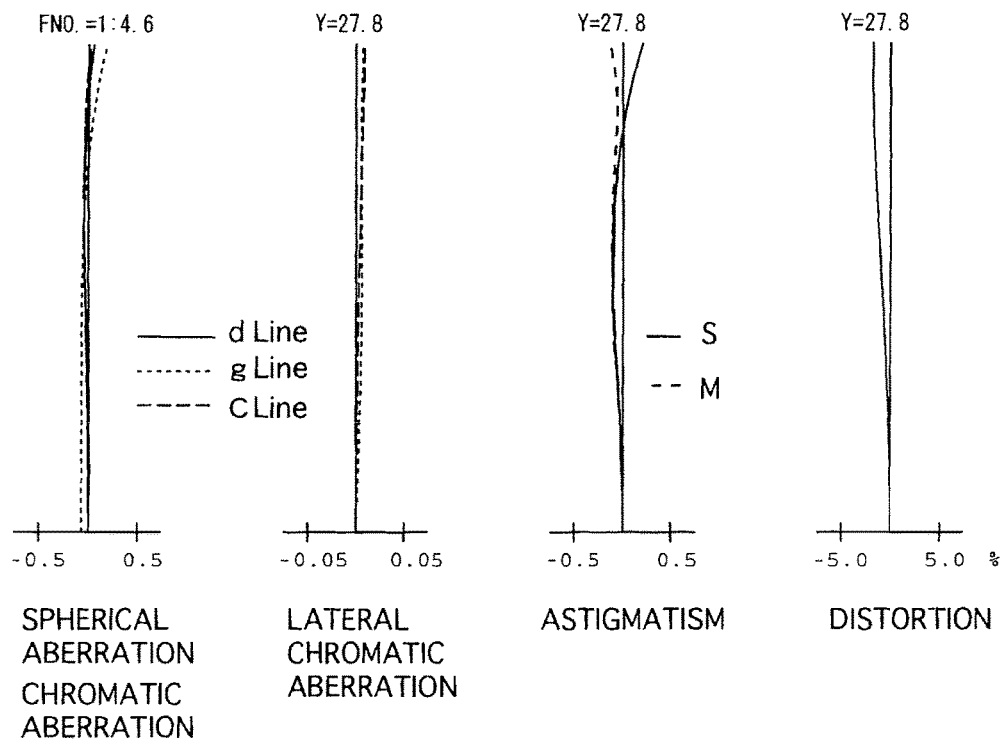
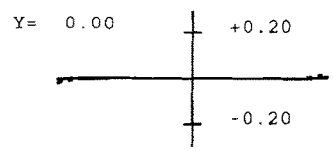
Fig.119A
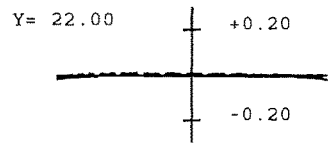
Fig.119B
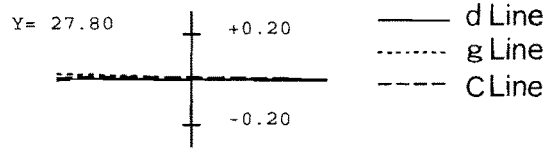
Fig.119C Fig.120A  Fig.120B  Fig.120C  Fig.120D
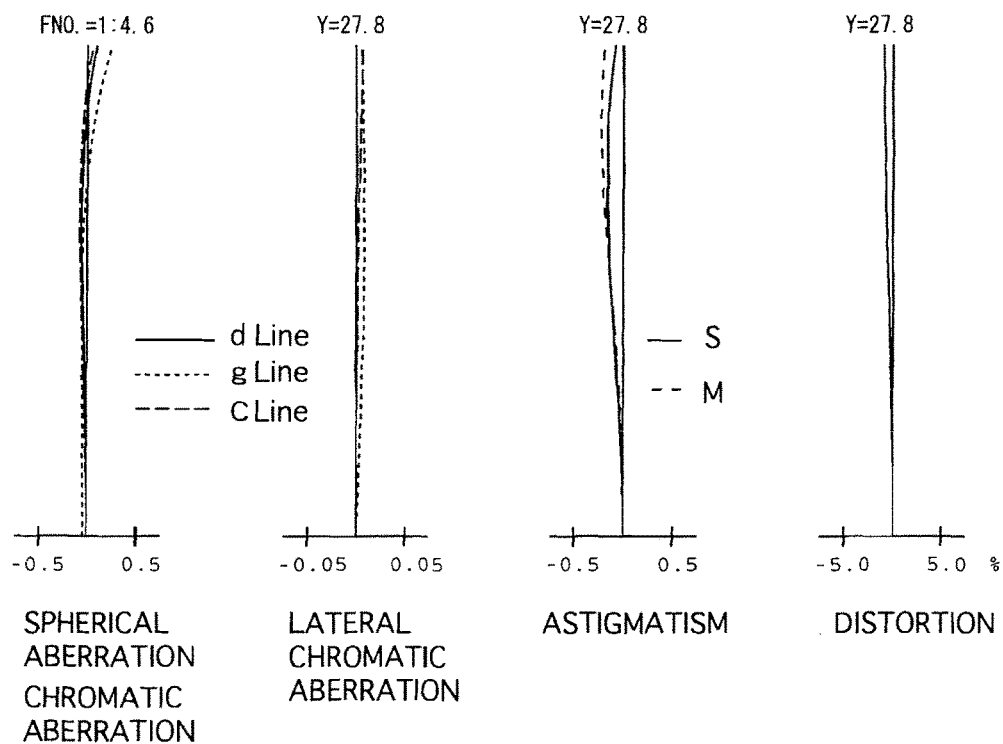
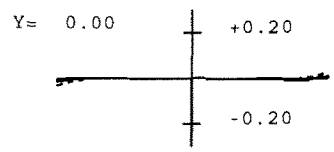
Fig.121A
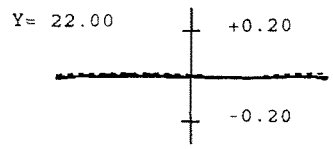
Fig.121B
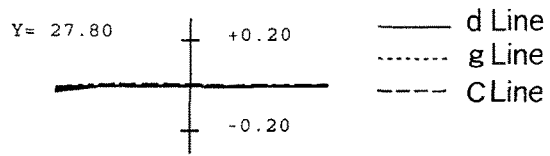
Fig.121C Fig.122A Fig.122B Fig.122C Fig.122D
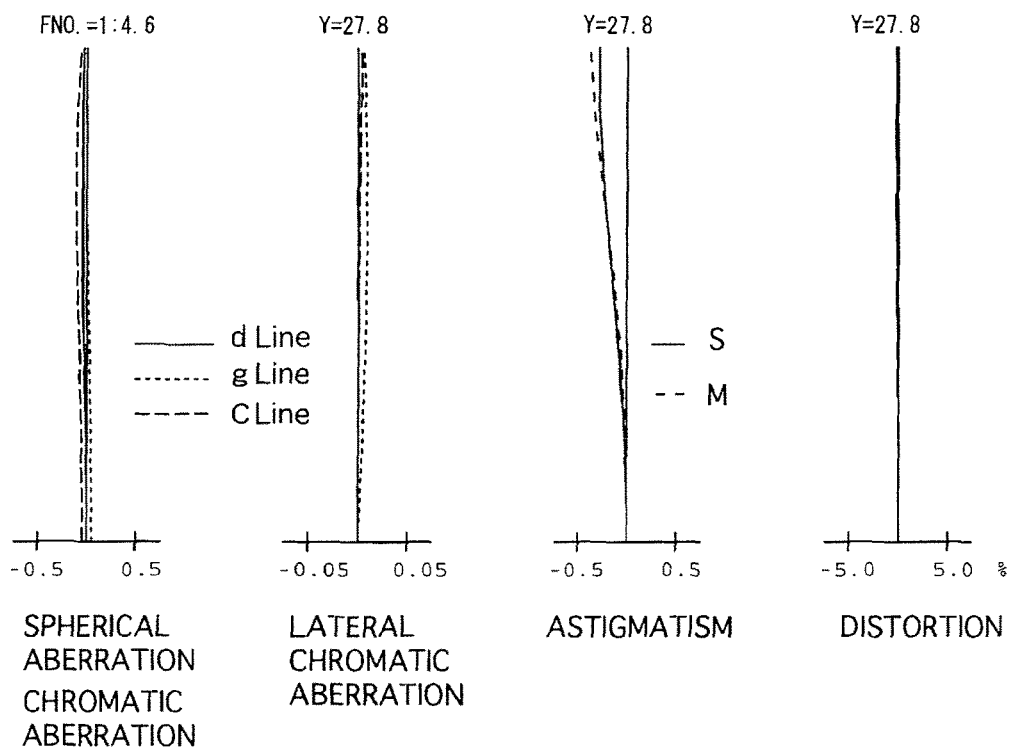
Fig.123A
Fig.123B
Fig.123C
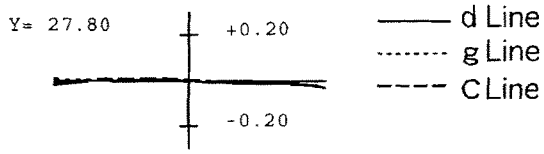

ZOOM LENS SYSTEM HAVING THIRD LENS GROUP WITH AIR LENS FORMED OF ADJACENT NEGATIVE AND POSITIVE SINGLE LENS ELEMENTS

CROSS REFERENCE TO RELATED APPLICATIONS

This is a divisional application of U.S. patent application Ser. No. 14/524,472, filed Oct. 27, 2014, which claims the benefit of Japanese Patent Application No. 2013-227785, filed Nov. 1, 2013, and Japanese Application No. 2013-227784 filed Nov. 1, 2013. The entire disclosure of each of the above-identified applications, including the specification, drawings, and claims, is incorporated herein by reference in its entirety.

BACKGROUND OF THE INVENTION

1. Field of the Invention

The present invention relates to a zoom lens system, and in particular, relates to a wide-angle zoom lens system that is favorable for use in a single-lens reflex camera. In addition, the present invention relates to an intra-lens image-stabilizing zoom optical system in which part of the lens system thereof can be decentered in order to correct image-blur caused by vibrations/hand-shake, etc.

2. Description of Related Art

Since it is relatively easy for a so-called "negative-lead zoom lens system", in which a lens group having a negative refractive power is provided closest to the object side, to obtain a wide angle-of-view and a long backfocus relative to the focal length, negative-lead zoom lens systems are often utilized in wide-angle zoom lens systems for use in a single-lens reflex camera.

A number of negative-lead zoom lens systems have been proposed in which an image-stabilizing function (image-shake correcting function) is installed, which corrects deviations in the imaging position caused by vibrations/hand-shake, etc., by decentering part of the lens system thereof in a direction orthogonal to the optical axis direction (refer to Patent Literature 1 through 4 indicated below).

In such intra-lens image-stabilizing zoom optical systems, aberrations such as decentration coma, in a state where a image-stabilizing lens group is decentered, and image plane tilt, etc., are required to be favorably corrected, and aberration fluctuations occurring during an image-stabilizing drive operation are also required to be reduced.

In regard to such requirements, in order to apply the image-stabilizing zoom lens systems disclosed in Patent Literature 1 through 4 to a highly-pixelized digital camera, etc., which requires a relatively high optical quality, the correction of aberrations during an image-stabilizing drive operation (during decentering of an image-stabilizing lens group) and the optical quality are insufficient.

In order to improve the optical quality of the zoom lens system during an image-stabilizing drive operation, it is effective to increase the freedom in design of the image-stabilizing lens group and to reduce the occurrence of aberrations within the image-stabilizing lens group by increasing the number of lens elements thereof or by utilizing at least one aspherical surface therein.

However, if the number of lens elements of the image-stabilizing lens group are increased too much, the burden on the drive mechanism for the image-stabilizing lens group increases, and also causes enlargement of the entire zoom lens system (and also the entire apparatus which includes the drive mechanism of the image-stabilizing lens group). Furthermore, an increase in the number of lens elements in the image-stabilizing lens group and the use of lens elements having at least one aspherical surface become a cause for increasing the manufacturing costs.

On the other hand, such negative-lead wide-angle zoom lens systems for a single-lens reflex camera are known to be configured of a negative first lens group, a positive second lens group, a negative third lens group and a positive fourth lens group, in that order from the object side (refer to Patent Literature 5 through 10 indicated below).

Generally, in a wide-angle zoom lens system, since abaxial aberrations such as distortion, field curvature, astigmatism, and lateral chromatic aberration, etc., occur together with a zooming operation or a focusing operation being carried out, it is difficult to obtain a high optical quality over the entire focal length range and over the entire photographing distance range.

In regard to this matter, the zoom lens systems in Patent Literature 5 through 10 are no exception; in order to apply the zoom lens systems of Patent Literature 5 through 10 to a highly-pixelized digital camera, etc., which requires a relatively high optical quality, the optical quality thereof is insufficient, and aberration fluctuations, which accompany a change in focal length or photographing distance, are required to be favorably corrected.

PATENT LITERATURE

[Patent Literature 1] Japanese Unexamined Patent Publication No. H07-152002
[Patent Literature 2] Japanese Unexamined Patent Publication No. 2004-61910
[Patent Literature 3] Japanese Unexamined Patent Publication No. 2010-170061
[Patent Literature 4] Japanese Unexamined Patent Publication No. 2010-217535
[Patent Literature 5] Japanese Unexamined Patent Publication No. 2002-287031
[Patent Literature 6] Japanese Unexamined Patent Publication No. 2008-145967
[Patent Literature 7] Japanese Unexamined Patent Publication No. 2008-281917
[Patent Literature 8] Japanese Unexamined Patent Publication No. 2011-145518
[Patent Literature 9] Japanese Unexamined Patent Publication No. 2012-63568
[Patent Literature 10] Japanese Unexamined Patent Publication No. 2012-68303

SUMMARY OF THE INVENTION

The present invention has been devised in view of the above-mentioned problems, and provides a zoom lens system which, in particular, achieves a superior optical quality by favorably correcting aberrations which occur during an image-stabilizing drive operation (when decentering the image-stabilizing lens group), while reducing the burden on the drive mechanism of the image-stabilizing lens group, miniaturizing the entire zoom lens system (and also the entire apparatus including the image-stabilizing lens group), and reducing the manufacturing cost.

Furthermore, in a wide-angle zoom lens system for use in a single-reflex camera in particular, the present invention also obtains a high optical quality over the entire focal length range and over the entire photographing distance range while suppressing abaxial aberrations such as distortion, field curvature, astigmatism, and lateral chromatic aberration, etc.

According to an aspect of the present invention, a zoom lens system is provided, including a negative first lens group, a positive second lens group, a negative third lens group and a positive fourth lens group, in that order from the object side. Upon zooming from the short focal length extremity to the long focal length extremity, at least the first lens group, the second lens group and the fourth lens group are moved in the optical axis direction thereof. The third lens group includes a negative first sub-lens group and a negative second sub-lens group, in that order from the object side. The second sub-lens group is provided with a negative single lens element and a positive single lens element, wherein an air lens is formed between the negative single lens element and the positive single lens element.

It is desirable for the second sub-lens group to include a negative single lens element having a concave surface on the image side, and a positive single lens element having convex surface on the object side, in that order from the object side, wherein a meniscus shaped air lens having a convex surface on the object side is formed between the negative single lens element and the positive single lens element.

It is desirable for the following condition (1) to be satisfied:

$$0.1 < Ri/Ro < 1.1 \qquad (1),$$

wherein Ri designates the radius of curvature of the surface on the image side of the air lens provided within the second sub-lens group, and Ro designates the radius of curvature of the surface on the object side of the air lens provided within the second sub-lens group.

It is desirable for the focal length of the air lens provided within the second sub-lens group to have a positive value.

It is desirable for the following condition (2) is satisfied:

$$-0.7 < (R3ao+R3ai)/(R3ao-R3ai) < 0.3 \qquad (2),$$

wherein R3ao designates the radius of curvature of the surface on the object side of the first sub-lens group, and R3ai designates the radius of curvature of the surface on the image side of the first sub-lens group.

It is desirable for the following condition (3) to be satisfied:

$$-1.1 < (R3ai+R3bo)/(R3ai-R3bo) < 0.7 \qquad (3),$$

wherein R3ai designates the radius of curvature of the surface on the image side of the first sub-lens group, and R3bo designates the radius of curvature of the surface on the object side of the second sub-lens group.

It is desirable for the following conditions (4) and (5) to be satisfied:

$$-0.7 < (1-m3bS) \cdot m4S < -0.2 \qquad (4),$$

and $$-0.8 < (1-m3bL) \cdot m4L < -0.3 \qquad (5),$$

wherein m3bS designates the lateral magnification of the second sub-lens group when focusing on an object at infinity at the short focal length extremity, m4S designates the lateral magnification of the fourth lens group when focusing on an object at infinity at the short focal length extremity, m3bL designates the lateral magnification of the second sub-lens group when focusing on an object at infinity at the long focal length extremity, and m4L designates the lateral magnification of the fourth lens group when focusing on an object at infinity at the long focal length extremity.

Upon zooming from the short focal length extremity to the long focal length extremity, the third lens group can remain stationary with respect to the optical axis direction thereof. Alternatively, upon zooming from the short focal length extremity to the long focal length extremity, the third lens group can move in the optical axis direction thereof.

In an embodiment, a zoom lens system is provided, including a negative first lens group, a positive second lens group, a negative third lens group and a positive fourth lens group, in that order from the object side. Upon zooming from the short focal length extremity to the long focal length extremity, at least the first lens group, the second lens group and the fourth lens group move in the optical axis direction thereof, wherein the following condition (6) is satisfied:

$$1.35 < \Delta X4/\Delta X2 < 2.80 \qquad (6),$$

wherein $\Delta X2$ designates an amount of movement of the second lens group in the optical axis direction thereof when zooming from the short focal length extremity to the long focal length extremity, and $\Delta X4$ designates an amount of movement of the fourth lens group in the optical axis direction thereof when zooming from the short focal length extremity to the long focal length extremity.

In condition (6), $\Delta X2$ and $\Delta X4$ have no concept of a positive or a negative movement amount, in other words, $\Delta X2$ and $\Delta X4$ designate absolute values of movement amounts toward the object side or toward the image side. Accordingly, $\Delta X2$ and $\Delta X4$ and also $\Delta X4/\Delta X2$ never take a negative value but are always a positive value, not only in the case where the second lens group and the fourth lens group are both moved toward the object side or are both moved toward the image side, but also in the case where one of the second lens group and the fourth lens group moves toward the object side and the other thereof moves toward the image side.

It is desirable for, upon zooming from the short focal length extremity to the long focal length extremity, the third lens group to remain stationary with respect to the optical axis direction thereof.

It is desirable for the following condition (7) to be satisfied:

$$-1.95 < f2/f1 < -1.55 \qquad (7),$$

wherein f1 designates the focal length of the first lens group, and f2 designates the focal length of the second lens group.

It is desirable for the following condition (8) to be satisfied:

$$2.25 < f3/f1 < 3.50 \qquad (8),$$

wherein f1 designates the focal length of the first lens group, and f3 designates the focal length of the third lens group.

It is desirable for the following condition (9) to be satisfied:

$$-3.00 < f4/f1 < -2.05 \qquad (9),$$

wherein f1 designates the focal length of the first lens group, and f4 designates the focal length of the fourth lens group.

It is desirable for the second lens group to include a positive first sub-lens group and a positive second sub-lens group, in that order from the object side. The first sub-lens group serves as a focusing lens group which is moved in the optical axis direction thereof during a focusing operation. The following conditions (10) and (11) are satisfied:

$$-1.2 < (1-m2aS^2)mRS^2 < -0.8 \quad (10),$$

and $$-2.7 < (1-m2aL^2)mRL^2 < -1.7 \quad (11),$$

wherein m2aS designates the lateral magnification of the first sub-lens group when focusing on an object at infinity at the short focal length extremity, mRS designates the combined lateral magnification of the second sub-lens group, the third lens group and the fourth lens group, when focusing on an object at infinity at the short focal length extremity, m2aL designates the lateral magnification of the first sub-lens group when focusing on an object at infinity at the long focal length extremity, and mRL designates the combined lateral magnification of the second sub-lens group, the third lens group and the fourth lens group, when focusing on an object at infinity at the long focal length extremity.

It is desirable for the first sub-lens group to include a positive lens element having a convex surface on the object side, and a cemented lens having a negative lens element having a convex surface on the object side and a positive lens element, in that order from the object side.

It is desirable for the fourth lens group to include a positive third sub-lens group and a negative fourth sub-lens group, in that order from the object side. The third sub-lens group is formed as a cemented lens which is provided with a positive lens element having a convex surface on the object side, a negative lens element and a biconvex positive lens element, in that order from the object side. The following condition (12) is satisfied:

$$15 < vdp - vdn < 25 \quad (12),$$

wherein vdp designates an average value of the Abbe number at the d-line of the positive lens elements provided in the third sub-lens group, and vdn designates the Abbe number at the d-line of the negative lens element provided in the third sub-lens group.

It is desirable for the zoom lens system of the present invention to satisfy the following conditions (13) and (14):

$$5 < m2S/m4S < 35 \quad (13),$$

and $$3.5 < m2L/m4L < 7.5 \quad (14),$$

wherein m2S designates the lateral magnification of the second lens group when focusing on an object at infinity at the short focal length extremity, m4S designates the lateral magnification of the fourth lens group when focusing on an object at infinity at the short focal length extremity, m2L designates the lateral magnification of the second lens group when focusing on an object at infinity at the long focal length extremity, and m4L designates the lateral magnification of the fourth lens group when focusing on an object at infinity at the long focal length extremity.

It is desirable for the first lens group, of the zoom lens system of the present invention, to include a negative lens element having a convex surface on the object side, a negative lens element having a convex surface on the object side, a biconcave negative lens element, and a positive lens element having a convex surface on the object side, in that order from the object side, and to satisfy the following condition (15):

$$0.56 < \theta gF < 0.60 \quad (15),$$

wherein

θgF designates the partial dispersion ratio at the g-line and at the F-line of the positive lens element that is provided closest to the image side within the first lens group.

According to the present invention, a zoom lens system is provided which, in particular, achieves a superior optical quality by favorably correcting aberrations which occur during an image-stabilizing drive operation (when decentering the image-stabilizing lens group), while reducing the burden on the drive mechanism of the image-stabilizing lens group, miniaturizing the entire zoom lens system (and also the entire apparatus including the image-stabilizing lens group), and reducing the manufacturing cost.

Furthermore, according to the present invention, in a wide-angle zoom lens system for use in a single-reflex camera in particular, a high optical quality is achieved over the entire focal length range and over the entire photographing distance range while suppressing abaxial aberrations such as distortion, field curvature, astigmatism, and lateral chromatic aberration, etc.

The present disclosure relates to subject matter contained in Japanese Patent Application Nos. 2013-227784 and 2013-227785 (both filed on Nov. 1, 2013) which are expressly incorporated herein in their entireties.

BRIEF DESCRIPTION OF THE DRAWINGS

The present invention will be discussed below in detail with reference to the accompanying drawings, in which:

FIGS. 16A, 16B, 16C and 16D show various aberrations that occurred in the lens arrangement shown in FIG. 11, at the long focal length extremity when focused on an object at infinity;

FIGS. 17A, 17B and 17C show lateral aberrations that occurred in the lens arrangement shown in FIG. 11, at the long focal length extremity when focused on an object at infinity;

FIGS. 24A, 24B, 24C and 24D show various aberrations that occurred in the lens arrangement shown in FIG. 21, at an intermediate focal length when focused on an object at infinity;

FIGS. 25A, 25B and 25C show lateral aberrations that occurred in the lens arrangement shown in FIG. 21, at an intermediate focal length when focused on an object at infinity;

FIGS. 32A, 32B, 32C and 32D show various aberrations that occurred in the lens arrangement shown in FIG. 31, at the short focal length extremity when focused on an object at infinity;

FIGS. 33A, 33B and 33C show lateral aberrations that occurred in the lens arrangement shown in FIG. 31, at the short focal length extremity when focused on an object at infinity;

FIGS. 34A, 34B, 34C and 34D show various aberrations that occurred in the lens arrangement shown in FIG. 31, at an intermediate focal length when focused on an object at infinity;

FIGS. 35A, 35B and 35C show lateral aberrations that occurred in the lens arrangement shown in FIG. 31, at an intermediate focal length when focused on an object at infinity;

FIGS. 36A, 36B, 36C and 36D show various aberrations that occurred in the lens arrangement shown in FIG. 31, at the long focal length extremity when focused on an object at infinity;

FIGS. 37A, 37B and 37C show lateral aberrations that occurred in the lens arrangement shown in FIG. 31, at the long focal length extremity when focused on an object at infinity;

FIG. 41 shows a lens arrangement of a fifth numerical embodiment of a zoom lens system, according to the present invention, at the short focal length extremity when focused on an object at infinity;

FIGS. 56A, 56B, 56C and 56D show various aberrations that occurred in the lens arrangement shown in FIG. 51, at the long focal length extremity when focused on an object at infinity;

FIGS. 57A, 57B and 57C show lateral aberrations that occurred in the lens arrangement shown in FIG. 51, at the long focal length extremity when focused on an object at infinity;

FIGS. 66A, 66B, 66C and 66D show various aberrations that occurred in the lens arrangement shown in FIG. 61, at the long focal length extremity when focused on an object at infinity;

FIGS. 67A, 67B and 67C show lateral aberrations that occurred in the lens arrangement shown in FIG. 61, at the long focal length extremity when focused on an object at infinity;

FIGS. 69A, 69B, 69C and 69D show various aberrations that occurred in the lens arrangement shown in FIG. 68, at the short focal length extremity when focused on an object at infinity;

FIGS. 70A, 70B and 70C show lateral aberrations that occurred in the lens arrangement shown in FIG. 68, at the short focal length extremity when focused on an object at infinity;

FIGS. 76A, 76B, 76C and 76D show various aberrations that occurred in the lens arrangement shown in FIG. 75, at the short focal length extremity when focused on an object at infinity;

FIGS. 77A, 77B and 77C show lateral aberrations that occurred in the lens arrangement shown in FIG. 75, at the short focal length extremity when focused on an object at infinity;

FIG. 82 shows a lens arrangement of a tenth numerical embodiment of a zoom lens system, according to the present invention, at the short focal length extremity when focused on an object at infinity;

FIGS. 83A, 83B, 83C and 83D show various aberrations that occurred in the lens arrangement shown in FIG. 82, at the short focal length extremity when focused on an object at infinity;

FIGS. 84A, 84B and 84C show lateral aberrations that occurred in the lens arrangement shown in FIG. 82, at the short focal length extremity when focused on an object at infinity;

FIGS. 90A, 90B, 90C and 90D show various aberrations that occurred in the lens arrangement shown in FIG. 89, at the short focal length extremity when focused on an object at infinity;

FIGS. 91A, 91B and 91C show lateral aberrations that occurred in the lens arrangement shown in FIG. 89, at the short focal length extremity when focused on an object at infinity;

FIGS. 92A, 92B, 92C and 92D show various aberrations that occurred in the lens arrangement shown in FIG. 89, at an intermediate focal length when focused on an object at infinity;

FIGS. 93A, 93B and 93C show lateral aberrations that occurred in the lens arrangement shown in FIG. 89, at an intermediate focal length when focused on an object at infinity;

FIGS. 94A, 94B, 94C and 94D show various aberrations that occurred in the lens arrangement shown in FIG. 89, at the long focal length extremity when focused on an object at infinity;

FIGS. 95A, 95B and 95C show lateral aberrations that occurred in the lens arrangement shown in FIG. 89, at the long focal length extremity when focused on an object at infinity;

FIGS. 97A, 97B, 97C and 97D show various aberrations that occurred in the lens arrangement shown in FIG. 96, at the short focal length extremity when focused on an object at infinity;

FIGS. 98A, 98B and 98C show lateral aberrations that occurred in the lens arrangement shown in FIG. 96, at the short focal length extremity when focused on an object at infinity;

FIGS. 101A, 101B, 101C and 101D show various aberrations that occurred in the lens arrangement shown in FIG. 96, at the long focal length extremity when focused on an object at infinity;

FIGS. 102A, 102B and 102C show lateral aberrations that occurred in the lens arrangement shown in FIG. 96, at the long focal length extremity when focused on an object at infinity;

FIGS. 106A, 106B, 106C and 106D show various aberrations that occurred in the lens arrangement shown in FIG. 103, at an intermediate focal length when focused on an object at infinity;

FIGS. 107A, 107B and 107C show lateral aberrations that occurred in the lens arrangement shown in FIG. 103, at an intermediate focal length when focused on an object at infinity;

FIGS. 113A, 113B, 113C and 113D show various aberrations that occurred in the lens arrangement shown in FIG. 110, at an intermediate focal length when focused on an object at infinity;

FIGS. 114A, 114B and 114C show lateral aberrations that occurred in the lens arrangement shown in FIG. 110, at an intermediate focal length when focused on an object at infinity;

FIGS. 118A, 118B, 118C and 118D show various aberrations that occurred in the lens arrangement shown in FIG. 117, at the short focal length extremity when focused on an object at infinity;

FIGS. 119A, 119B and 119C show lateral aberrations that occurred in the lens arrangement shown in FIG. 117, at the short focal length extremity when focused on an object at infinity;

FIGS. 120A, 120B, 120C and 120D show various aberrations that occurred in the lens arrangement shown in FIG. 117, at an intermediate focal length when focused on an object at infinity;

FIGS. 121A, 121B and 121C show lateral aberrations that occurred in the lens arrangement shown in FIG. 117, at an intermediate focal length when focused on an object at infinity;

FIGS. 122A, 122B, 122C and 122D show various aberrations that occurred in the lens arrangement shown in FIG. 117, at the long focal length extremity when focused on an object at infinity;

FIGS. 123A, 123B and 123C show lateral aberrations that occurred in the lens arrangement shown in FIG. 117, at the long focal length extremity when focused on an object at infinity;

FIG. 124 shows a first zoom path of the zoom lens system according to the present invention;

FIG. 125 shows a second zoom path of the zoom lens system according to the present invention; and FIG. 126 shows a third zoom path of the zoom lens system according to the present invention.

DESCRIPTION OF THE EMBODIMENTS

The illustrated embodiments of the zoom lens system include a "first aspect of the present invention", to which the first through sixth numerical embodiments belong, and a "second aspect of the present invention", to which the seventh through fifteenth numerical embodiments belong.

First Aspect of Present Invention

Figure 124:
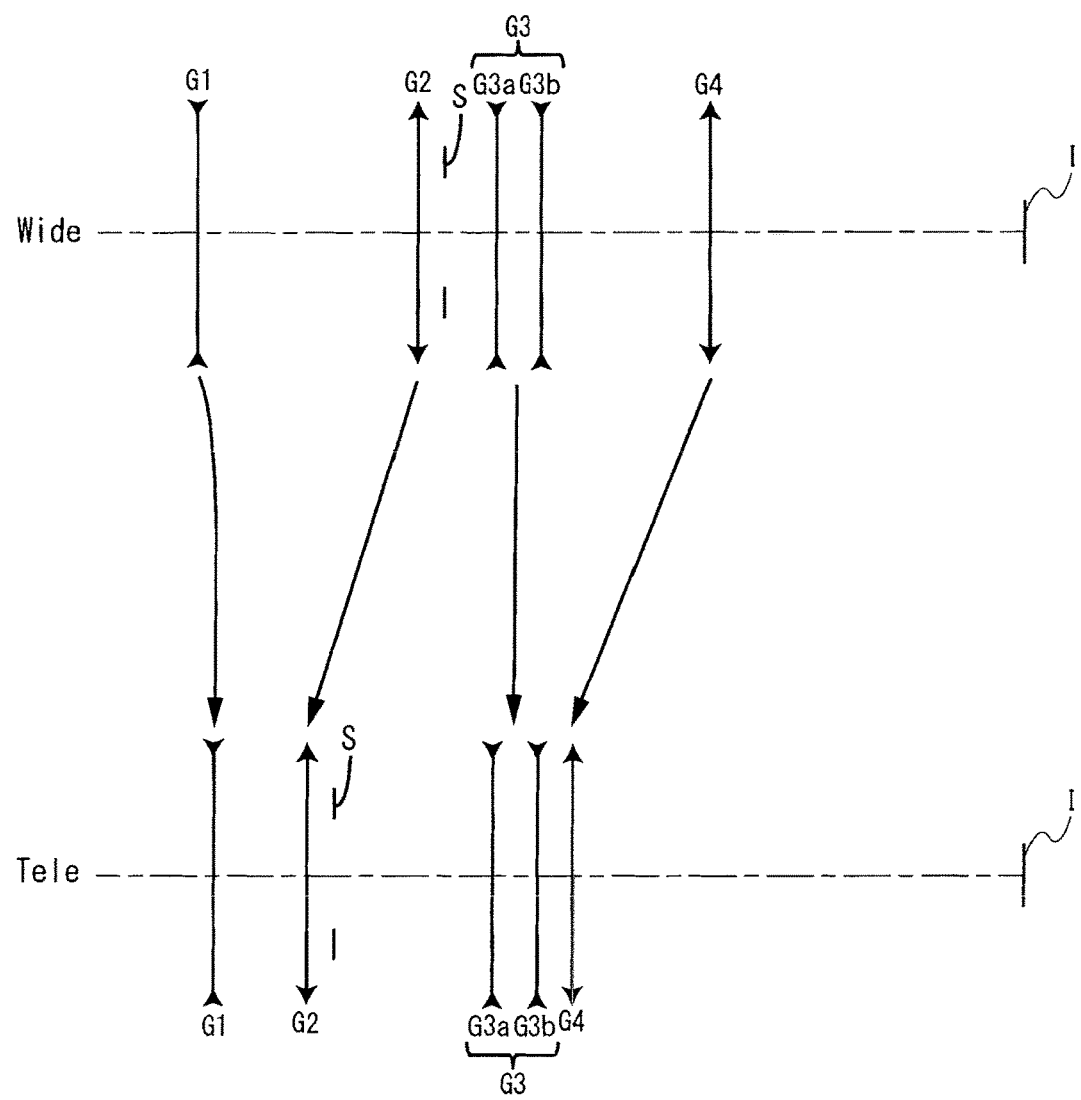
Figure 125:
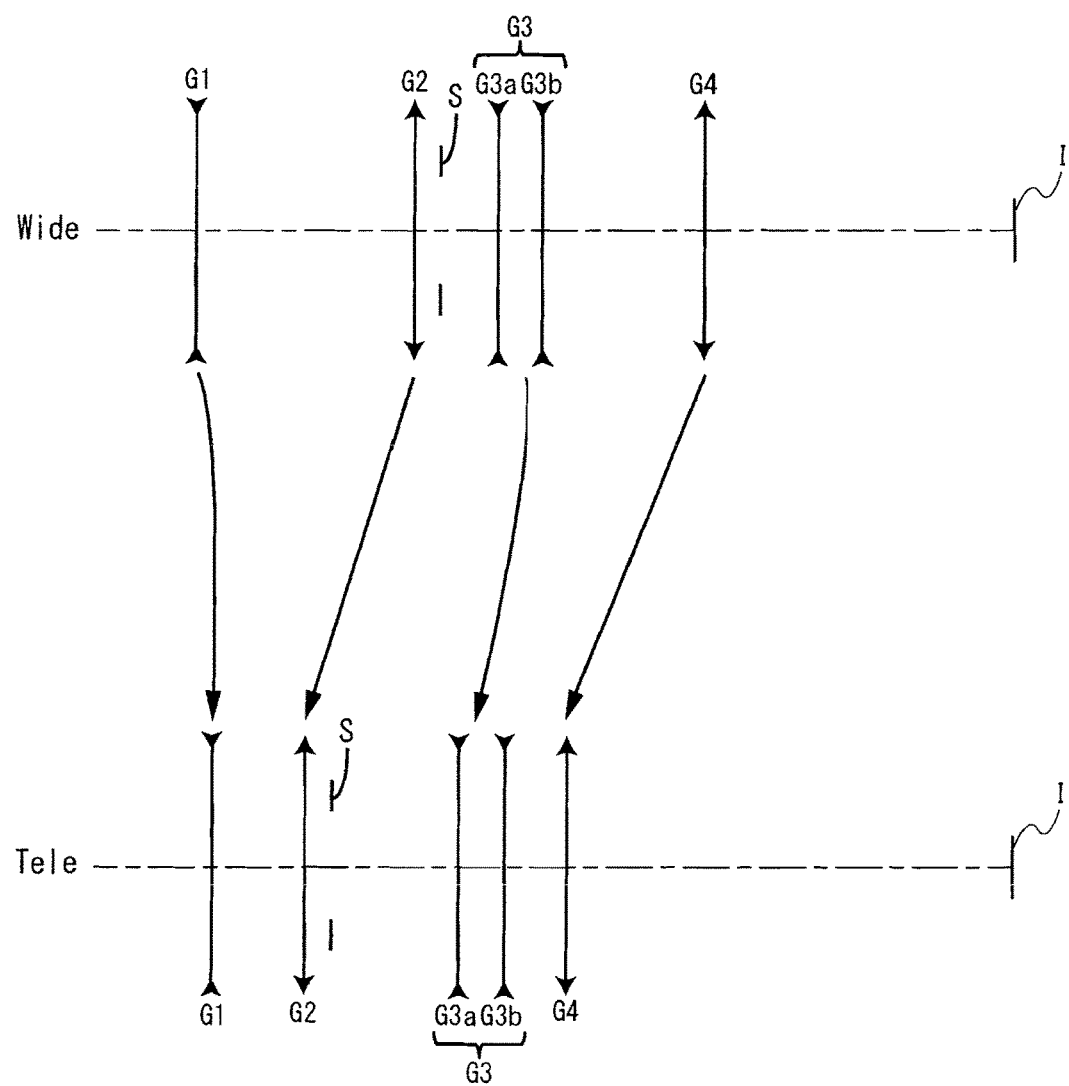

As shown in the zoom path diagrams in FIGS. 124 and 125, the zoom lens system of the first through sixth numerical embodiments is configured of a negative first lens group G1, a positive second lens group G2, a negative third lens group G3 and a positive fourth lens group G4, in that order from the object side. The third lens group G3 is configured of a negative first sub-lens group G3a and a negative second sub-lens group G3b, in that order from the object side. A diaphragm S is positioned between the second lens group G2 and the third lens group G3, and the diaphragm S integrally moves with the second lens group G2 during a zooming operation. "I" designates the image plane.

As shown in the zoom path diagrams in FIGS. 124 and 125, in the zoom lens system of the first through sixth numerical embodiments, upon zooming from the short focal length extremity (Wide) to the long focal length extremity (Tele), the distance between the first lens group G1 and the second lens group G2 decreases, the distance between the second lens group G2 and the third lens group G3 increases, and the distance between the third lens group G3 and the fourth lens group G4 decreases.

In each of the first through sixth embodiments, upon zooming from the short focal length extremity to the long focal length extremity, the first lens group G1 either monotonically moves toward the image side or first moves toward the image side and thereafter moves (returns) slightly toward the object side. It is possible, in an alternative embodiment, for the first lens group G1, upon zooming from the short focal length extremity to the long focal length extremity, to move toward the object side or first move toward the object (image) side and thereafter move toward the image (object) side to return to (U-turn) the short focal length extremity.

In each of the first through sixth embodiments, upon zooming from the short focal length extremity to the long focal length extremity, the second lens group G2 and the fourth lens group G4 monotonically move toward the object side.

In each of the first, second and fourth through sixth numerical embodiments, as shown in the zoom path diagram of FIG. 124, upon zooming from the short focal length extremity to the long focal length extremity, the third lens group G3 does not move in the optical axis direction (the third lens group G3 remains stationary relative to the image plane I). In the third numerical embodiment, as shown in the zoom path diagram of FIG. 125, upon zooming from the short focal length extremity to the long focal length extremity, the third lens group G3 moves toward the object side.

In each of the first through sixth numerical embodiments, the first lens group G1 is configured of a negative meniscus lens element 11 having a convex surface on the object side, a negative meniscus lens element 12 having a convex surface on the object side, a biconcave negative lens element 13 and a biconvex positive lens element 14, in that order from the object side. The negative meniscus lens element 11 is a hybrid lens formed by a glass lens element with an aspherical surface layer, formed from a synthetic resin material, adhered onto the image side thereof.

In each of the first through sixth numerical embodiments, the second lens group G2 is configured of a positive meniscus lens element 21 having a convex surface on the object side, a cemented lens formed by a negative meniscus lens element 22 having a convex surface on the object side, and a biconvex positive lens element 23; and a biconvex positive lens element 24, in that order from the object side.

In each of the first through sixth numerical embodiments, the first sub-lens group G3a is configured of a cemented lens formed by a biconcave negative lens element 31 and a biconvex positive lens element 32, in that order from the object side.

In each of the first through sixth numerical embodiments, the second sub-lens group G3b serves as an image-shake correction lens group (image-stabilizing lens group) which corrects image shake that is caused by hand shake/vibrations, etc., by moving (decentering) the image-shake correction lens group in a direction orthogonal to the optical axis to thereby change the imaging position.

In each of the first, second, fourth and fifth numerical embodiments, the second sub-lens group G3b is configured of a biconcave negative lens element (a negative single lens element having a concave surface on the image side) 33 and a positive meniscus lens element (a positive single lens element having a convex surface on the object side) 34 having convex surface on the object side, in that order from the object side, and an air lens having a meniscus shape with a convex surface on the object side is formed between the biconcave negative lens element 33 and the positive meniscus lens element 34.

In the third numerical embodiment, the second sub-lens group G3b is configured of a negative meniscus lens element (a negative single lens element having a concave surface on the image side) 33 having a convex surface on the object side and a positive meniscus lens element 34 having convex surface on the object side (a positive single lens element having a convex surface on the object side), in that order from the object side, and an air lens having a meniscus shape having a convex surface on the object side is formed between the negative meniscus lens element 33 and the positive meniscus lens element 34.

In the sixth numerical embodiment, the second sub-lens group G3b is configured of a biconcave negative lens element (a negative single lens element having a concave surface on the image side) 33 and a biconvex positive lens element (a positive single lens element having a convex surface on the object side) 34, in that order from the object side, and an air lens having a meniscus shape with a convex surface on the object side is formed between the biconcave negative lens element 33 and the biconvex positive lens element 34.

In each of the first through third numerical embodiments, the fourth lens group G4 is configured of a cemented lens provided with a biconvex positive lens element 41, a biconcave negative lens element 42 and a biconvex positive lens element 43; and a cemented lens provided with a biconcave negative lens element 44 and a biconvex positive lens element 45, in that order from the object side. The biconcave negative lens element 44 is a hybrid lens formed by a glass lens element with an aspherical surface layer, formed from a synthetic resin material, adhered onto the object side thereof.

In each of the fourth through sixth numerical embodiments, the fourth lens group G4 is configured of a cemented lens provided with a planoconvex positive lens element 41 having a convex surface on the object side, a planoconcave negative lens element 42 having a concave surface on the image side, and a biconvex positive lens element 43; and a cemented lens provided with a biconcave negative lens element 44 and a biconvex positive lens element 45, in that order from the object side. The biconcave negative lens element 44 is a hybrid lens formed by a glass lens element with an aspherical surface layer, formed from a synthetic resin material, adhered onto the object side thereof.

The zoom lens system of the first aspect of the present invention assumes a negative-lead configuration having four lens groups, namely, a negative lens group, a positive lens group, a negative lens group and a positive lens group, in that order from the object side. In this assumed configuration, the negative third lens group G3 is divided into the negative first sub-lens group G3a and the negative second sub-lens group G3b. Furthermore, the second sub-lens group G3b is configured of the negative single lens element 33 and the positive single lens element 34, and an air lens is formed between the negative single lens element 33 and the positive single lens element 34. In other words, the negative single lens element 33 and the positive single lens element 34 are not cemented to each other and are provided spaced apart with air existing therebetween.

As described above, the second sub-lens group G3b serves as an image-shake correction lens group (image-stabilizing lens group) which corrects image shake that is caused by hand shake/vibrations, etc., by moving (decentering) the image-shake correction lens group in a direction orthogonal to the optical axis to thereby change the imaging position.

In the zoom lens system according to the first aspect of the present invention, by appropriately determining the arrangement and refractive power of the second sub-lens group G3b, which serves as an image-stabilizing lens group, aberration fluctuations in a normal state (a state in which decentering of the image-stabilizing lens group is not being carried out) and in an image-stabilizing driving state (a state in which decentering of the image-stabilizing lens group is being carried out) are suppressed, and aberrations occurring during an image-stabilizing drive operation in particular are favorably corrected, thereby successfully achieving a superior optical quality.

By configuring the second sub-lens group G3b, which serves as the image-stabilizing lens group, with the negative single lens element 33 and the positive single lens element 34, decentration chromatic aberration can be favorably corrected. Furthermore, by forming the air lens between the negative single lens element 33 and the positive single lens element 34, the freedom in aberration correction is increased, and decentration coma that occurs during the decentering of the second sub-lens group G3b, serving as the image-stabilizing lens group, can be favorably corrected.

Furthermore, by forming the negative single lens element 33 to have a concave surface on the image side (either a biconcave shape or a meniscus shape with a convex surface on the object side) and by forming the positive single lens element 34 to have a convex surface on the object side (either a biconvex shape or a meniscus shape with a convex surface on the object side), and by forming both sides of the air lens, which is formed (defined) between the negative single lens element 33 and the positive single lens element 34, as convex surfaces facing the object side (a meniscus shape having a convex surface on the object side), spherical aberration can be favorably corrected, and decentration coma that occurs during the decentering of the second sub-lens group G3b, serving as the image-stabilizing lens group, can be favorably corrected.

It is desirable for the focal length of the air lens formed between the negative single lens element 33 and the positive single lens element 34 within the second sub-lens group G3b to be a positive value. If the focal length of the air lens within the second sub-lens group G3b were to have a negative value, an excessive cancelling out of spherical aberration would occur at each side of the air lens so that aberration fluctuations, due to decentration between the surfaces of the air lens, increase, so that it would be difficult to maintain a practical optical quality.

In the zoom lens system according to the first aspect of the present invention, the optical quality during the image-stabilizing drive operation is increased without relying on using methods such as increasing the number of lens elements in the image-stabilizing lens group or using aspherical surfaces within the image-stabilizing lens group. In other words, the second sub-lens group G3b, serving as an image-stabilizing lens group, is configured of two lens elements, i.e., the negative single lens element 33 and the positive single lens element 34, and no aspherical lens elements are used within the second sub-lens group G3b. Accordingly, the burden on the drive mechanism for the image-stabilizing lens group is reduced, the entire zoom lens system (and also the entire apparatus including the drive mechanism for the image-stabilizing lens group) can be miniaturized, and the manufacturing cost can be reduced.

In the zoom lens system according to the first aspect of the present invention, in the first, second and fourth through sixth numerical embodiments, the third lens group G3 does not move in the optical axis direction during zooming from the short focal length extremity to the long focal length extremity (the third lens group G3 remains stationary relative to the image plane I). Accordingly, by reducing the number of movable parts that move during a zooming operation, the mechanical structure of the lens frames can be simplified, thereby suppressing manufacturing costs. Furthermore, since causes for manufacturing error are reduced, the configuration according to the first aspect of the present invention is advantageous for maintaining a practical optical quality. Furthermore, if the second sub-lens group G3b serves as an image-stabilizing lens group, as with the case of the first aspect of the present invention, since the image-stabilizing drive mechanism can be configured separately from the zooming mechanism, this enables the outer diameter of the zoom lens system to be reduced.

On the other hand, in the third numerical embodiment, the third lens group G3 moves in the optical axis direction during zooming from the short focal length extremity to the long focal length extremity. Accordingly, since the freedom in correcting aberration fluctuations which accompany a zooming operation is increased, this is advantageous for aberration correction.

Hence, the zoom lens system according to the first aspect of the present invention can be implemented regardless of whether or not the third lens group G3 moves in the optical axis direction during a zooming operation.

The zoom lens system of the first aspect of the present invention is an optical system which is especially suitable for use in a single-lens reflex camera, however, the photographing apparatus to which the zoom lens system of the first aspect of the present invention can be applied can be a single-lens reflex camera or a so-called non-reflex (mirrorless) camera that does not have a quick-return mirror.

In the zoom lens system of the first aspect of the present invention, although the second sub-lens group G3b serves as the image-stabilizing lens group, even if the zoom lens system uses a lens group other than the second sub-lens group G3b as the image-stabilizing lens group or even if the zoom lens system is not provided with an image-stabilizing function, a high optical quality can be achieved since the design freedom can be increased due to the air lens that is formed within the second sub-lens group G3b. In other words, it is not essential to the present invention for the second sub-lens group G3b to serve as an image-stabilizing lens group.

Condition (1) specifies the shape of the air lens within the second sub-lens group G3b. By satisfying condition (1), aberration fluctuations due to decentration between the surfaces of the air lens can be reduced so that a practical optical quality is maintained, and decentration coma that occurs during the decentering of the second sub-lens group G3b, serving as the image-stabilizing lens group, can be favorably corrected.

If the upper limit of condition (1) is exceeded, an excessive cancelling out of spherical aberration would occur at each side of the air lens so that aberration fluctuations, due to decentration between the surfaces of the air lens, increase, thereby causing difficulties in maintaining a practical optical quality.

If the lower limit of condition (1) is exceeded, correction of decentration coma that occurs during the decentering of the second sub-lens group G3b, serving as the image-stabilizing lens group, becomes insufficient.

Condition (2) specifies the shape of the first sub-lens group G3a. By satisfying condition (2), axial chromatic aberration that occurs during zooming and fluctuations in lateral chromatic aberration that occur during zooming can be suppressed while coma can be favorably corrected.

If the upper limit of condition (2) is exceeded, axial chromatic aberration that occurs during zooming and fluctuations in lateral chromatic aberration that occur during zooming increase.

If the lower limit of condition (2) is exceeded, correction of coma becomes insufficient.

Condition (3) specifies the shape of the air lens between the first sub-lens group G3a and the second sub-lens group G3b. By satisfying condition (3), axial chromatic aberration that occurs during zooming and fluctuations in lateral chromatic aberration that occur during zooming can be suppressed while coma, especially decentration coma that occurs during the decentering of the second sub-lens group G3b (serving as the image-stabilizing lens group), can be favorably corrected.

If the upper limit of condition (3) is exceeded, correction of coma becomes insufficient.

If the lower limit of condition (3) is exceeded, axial chromatic aberration that occurs during zooming and fluctuations in lateral chromatic aberration that occur during zooming increase.

Conditions (4) and (5) specify the image-stabilizing sensitivity indicated by image-shake amount per unit amount of decentering carried out by the second sub-lens group G3b, serving as the image-stabilizing lens group. By satisfying conditions (4) and (5), the movement amount (orthogonal to the optical axis) of the second sub-lens group G3b (serving as the image-stabilizing lens group) can appropriately determined and aberration fluctuations that occur during a decentering operation by the second sub-lens group G3b can be favorably corrected.

If the upper limits of conditions (4) and (5) are exceeded, the image-stabilizing sensitivity becomes excessively small so that the movement amount of the image-stabilizing lens group increases greatly with respect to the same amount of image shake, and the burden on the drive mechanism for the image-stabilizing lens group increases, which is undesirable.

If the lower limits of conditions (4) and (5) are exceeded, the refractive power of the image-stabilizing lens group becomes excessively large, requiring a highly precise positional control of the image-stabilizing lens group when correctly image shake. Furthermore, it becomes difficult to correct decentration coma that occurs during the decentering of the second sub-lens group G3b.

Second Aspect of Present Invention

Figure 126:
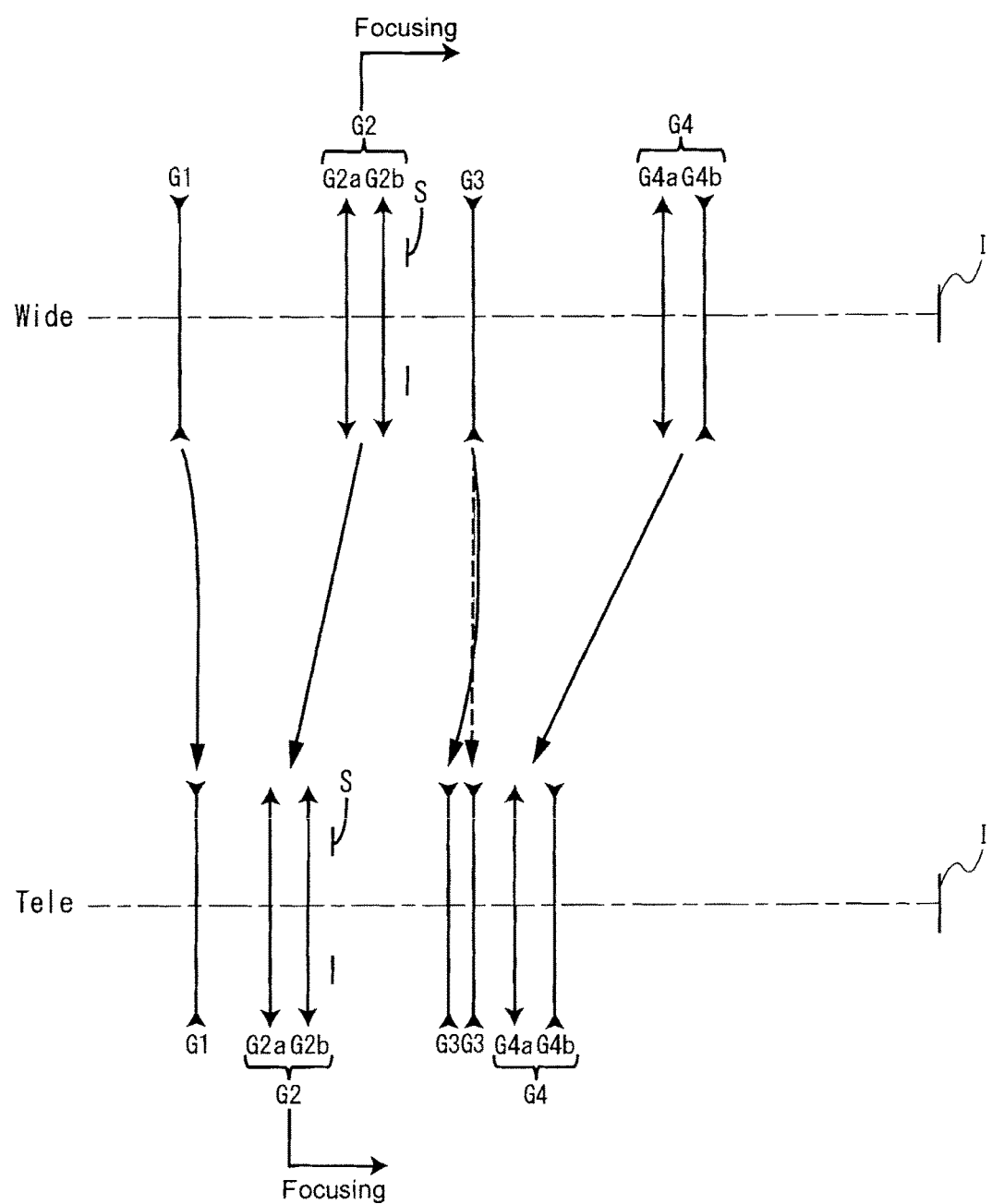

As shown in the zoom path diagram in FIG. 126, the zoom lens system of the seventh through fifteenth numerical embodiments is configured of a negative first lens group G1, a positive second lens group G2, a negative third lens group G3 and a positive fourth lens group G4, in that order from the object side. The second lens group G2 is configured of a positive first sub-lens group G2a and a positive second sub-lens group G2b, in that order from the object side. The first sub-lens group G2a serves as a focusing lens group which moves in the optical axis direction (toward the image side) during a focusing operation. The fourth lens group G4 is configured of a positive third sub-lens group G4a and a negative fourth sub-lens group G4b, in that order from the object side. A diaphragm S is positioned between the second lens group G2 and the third lens group G3, and the diaphragm S integrally moves with the second lens group G2 during a zooming operation. "I" designates the image plane.

As shown in the zoom path diagram in FIG. 126, in the zoom lens system of the seventh through fifteenth numerical embodiments, upon zooming from the short focal length extremity (Wide) to the long focal length extremity (Tele), the distance between the first lens group G1 and the second lens group G2 decreases, the distance between the second lens group G2 and the third lens group G3 increases, and the distance between the third lens group G3 and the fourth lens group G4 decreases.

In each of the seventh through fifteenth embodiments, upon zooming from the short focal length extremity to the long focal length extremity, the first lens group G1 moves toward the image side by a slight amount. It is possible, in an alternative embodiment, for the first lens group G1, upon zooming from the short focal length extremity to the long focal length extremity, to move toward the object side or to move in a U-turn at an intermediate focal length position.

In each of the seventh through fifteenth embodiments, upon zooming from the short focal length extremity to the long focal length extremity, the second lens group G2 and the fourth lens group G4 monotonically move (advance) toward the object side. The movement amount (advancing amount) of the fourth lens group G4 is greater than the movement amount (advancing amount) of the second lens group G2.

In each of the seventh through ninth and eleventh through thirteenth numerical embodiments, as shown by the broken line in the zoom path diagram of FIG. 126, upon zooming from the short focal length extremity to the long focal length extremity, the third lens group G3 does not move in the optical axis direction (the third lens group G3 remains stationary relative to the image plane I). Accordingly, by reducing the number of movable parts that move during a zooming operation, the mechanical structure of the lens frames can be simplified, thereby suppressing manufacturing costs. Furthermore, since causes for manufacturing error are reduced, the configuration according to the second aspect of the present invention is advantageous for maintaining a practical optical quality.

In the tenth, fourteenth and fifteenth numerical embodiments, as shown by the solid line in the zoom path of FIG. 126, upon zooming from the short focal length extremity to the long focal length extremity, the third lens group G3 first moves toward the image side and thereafter moves toward the object side by a slight amount past the short focal length extremity position. Accordingly, since the freedom in the zoom lens system increases, this is advantageous for correcting aberration fluctuations which occur during a zooming operation. Furthermore, an appropriate zoom path other than the those illustrated can be selected for the zoom path of the third lens group G3 for the purpose of correcting field curvature.

Hence, the zoom lens system according to the second aspect of the present invention can be implemented regardless of whether or not the third lens group G3 moves in the optical axis direction during a zooming operation.

In each of the seventh through fifteenth numerical embodiments, the first lens group G1 is configured of a negative meniscus lens element 11 having a convex surface on the object side (a negative lens element having a convex surface on the object side), a negative meniscus lens element 12 having a convex surface on the object side (a negative lens element having a convex surface on the object side), a biconcave negative lens element 13 and a biconvex positive lens element (a positive lens element having a convex surface on the object side) 14, in that order from the object side. The negative meniscus lens element 11 is a hybrid lens formed by a glass lens element with an aspherical surface layer, formed from a synthetic resin material, adhered onto the image side thereof.

In each of the seventh through fifteenth numerical embodiments, the first sub-lens group G2a is configured of a positive meniscus lens element 21 having a convex surface on the object side (positive lens element having a convex surface on the object side), and a cemented lens provided with a negative meniscus lens element 22 having a convex surface on the object side (a negative lens element having a convex surface on the object side), and a biconvex positive lens element 23, in that order from the object side.

In each of the seventh through fifteenth numerical embodiments, the second sub-lens group G2b is configured of a biconvex positive lens element 24.

In each of the seventh through fifteenth numerical embodiments, the third lens group G3 is configured of a cemented lens provided with a biconcave negative lens element 31 and a biconvex positive lens element 32; a biconcave negative lens element 33 and a positive meniscus lens element 34 having a convex surface on the object side, in that order from the object side.

In each of the seventh, eighth and eleventh numerical embodiments, the third sub-lens group G4a is configured of a cemented lens provided with a biconvex positive lens element (a positive lens element having a convex surface on the object side) 41, a biconcave negative lens element 42 and a biconvex positive lens element 43, in that order from the object side.

In each of the ninth, tenth and twelfth through fifteenth numerical embodiments, the third sub-lens group G4a is configured of a cemented lens provided with a planoconvex positive lens element 41 having a convex surface on the object side (a positive lens element having a convex surface on the object side), a planoconcave negative lens element 42 having a concave surface on the image side, and a biconvex positive lens element 43, in that order from the object side.

In each of the seventh through eleventh and thirteenth through fifteenth numerical embodiments, the fourth sub-lens group G4*b* is configured of a cemented lens having a biconcave negative lens element 44 and a biconvex positive lens element 45, in that order from the object side. The biconcave negative lens element 44 is a hybrid lens formed by a glass lens element with an aspherical surface layer, formed from a synthetic resin material, adhered onto the object side thereof.

In the twelfth numerical embodiment, the fourth sub-lens group G4*b* is configured of a cemented lens provided with negative meniscus lens element 44 having a convex surface on the object side, and a biconvex positive lens element 45, in that order from the object side. The negative meniscus lens element 44 is a hybrid lens formed by a glass lens element with an aspherical surface layer, formed from a synthetic resin material, adhered onto the object side thereof.

In the zoom lens system according to the second aspect of the present invention, the second lens group G2 possesses the main zooming function, the first lens group G1 corrects the fluctuation in the focal position that occurs during zooming, and the third and fourth lens groups G3 and G4 correct fluctuations in aberrations, such as spherical aberration and field curvature, which occur during zooming; furthermore, by appropriately determining the refractive power distribution and the zooming movement amount of the first through fourth lens groups G1 through G4, which have the above-mentioned roles, a favorable optical quality can be successfully achieved in which fluctuations in aberrations are suppressed over the entire focal length range and over the entire photographing distance range.

Condition (6) specifies the ratio of the movement amount in the optical axis direction of the second lens group G2 (movement amount relative to the image plane I) to the movement amount in the optical axis direction of the fourth lens group G4 (movement amount relative to the image plane I) when zooming from the short focal length extremity to the long focal length extremity. In the zoom lens system according to the second aspect of the present invention, not only is the movement amount of the second lens group G2 which possesses the main zooming function important, since the zooming movement amount of the third lens group G3 is either zero or very small, the appropriate determining of the change in air distance between the third lens group G3 and the fourth lens group G4 (which correct aberration fluctuations that occur during zooming), i.e., the movement amount of the fourth lens group G4, also becomes important. By determining the ratio of the zooming movement amounts of the second lens group G2 and the fourth lens group G4 in order to satisfy condition (6), fluctuation in field curvature that occurs during zooming can be suppressed, and a favorable optical quality can be achieved.

If the upper limit of condition (6) is exceeded, it becomes difficult to correct fluctuations in field curvature that occur during zooming. Furthermore, the overall length of the zoom lens system increases, so that in order to collect a sufficient quantity of peripheral light, the effective diameter and weight of the first lens group G1 is increased, which undesirably causes an increase in manufacturing costs.

If the lower limit of condition (6) is exceeded, although advantageous for reducing the overall length of the zoom lens system, it becomes difficult to correct fluctuations in field curvature that occur during zooming.

Condition (7) specifies the ratio of the focal length of the first lens group G1 to the focal length of the second lens group G2. By satisfying condition (7), the distribution of the refractive powers of the first lens group G1 and the second lens group G2 can be appropriately determined, so that fluctuation in field curvature that occurs during zooming can be suppressed, and a favorable optical quality can be achieved.

If the upper limit of condition (7) is exceeded, although advantageous for reducing the overall length of the zoom lens system, it becomes difficult to correct fluctuations in field curvature that occur during zooming.

If the lower limit of condition (7) is exceeded, it becomes difficult to correct fluctuations in field curvature that occur during zooming. Furthermore, the overall length of the zoom lens system increases, so that in order to sufficient peripheral light, the effective diameter and weight of the first lens group G1 is increased, which undesirably causes an increase in manufacturing costs.

Condition (8) specifies the ratio of the focal length of the first lens group G1 to the focal length of the third lens group G3. By satisfying condition (8), the distribution of the refractive powers of the first lens group G1 and the third lens group G3 can be appropriately determined, so that fluctuation in field curvature that occurs during zooming can be suppressed, and a favorable optical quality can be achieved.

If the upper limit of condition (8) is exceeded, it becomes difficult to correct fluctuations in field curvature that occur during zooming. Furthermore, the overall length of the zoom lens system increases, so that in order to collect a sufficient quantity of light, the effective diameter and weight of the first lens group G1 is increased, which undesirably causes an increase in manufacturing costs.

If the lower limit of condition (8) is exceeded, although advantageous for reducing the overall length of the zoom lens system, it becomes difficult to correct fluctuations in field curvature that occur during zooming.

Condition (9) specifies the ratio of the focal length of the first lens group G1 to the focal length of the fourth lens group G4. By satisfying condition (9), the distribution of the refractive powers of the first lens group G1 and the fourth lens group G4 can be appropriately determined, so that fluctuation in field curvature that occurs during zooming can be suppressed, and a favorable optical quality can be achieved.

If the upper limit of condition (9) is exceeded, although advantageous for reducing the overall length of the zoom lens system, it becomes difficult to correct fluctuations in field curvature that occur during zooming.

If the lower limit of condition (9) is exceeded, it becomes difficult to correct fluctuations in field curvature that occur during zooming. Furthermore, the overall length of the zoom lens system increases, so that in order to collect sufficient peripheral light, the effective diameter and weight of the first lens group G1 is increased, which undesirably causes an increase in manufacturing costs.

By simultaneously satisfying conditions (7), (8) and (9), the distribution of the refractive powers of the first through fourth lens groups G1 through G4 can be appropriately determined so that fluctuation in field curvature that occurs during zooming can be further suppressed and an even more favorable optical quality can be achieved.

As described above, in the zoom lens system according to the second aspect of the present invention, the second lens group G2 is configured of a positive first sub-lens group G2*a* and a positive second sub-lens group G2*b*, in that order from the object side. The first sub-lens group G2*a* serves as a focusing lens group which moves in the optical axis direction (toward the image side) during a focusing operation. By appropriately determining the refractive power and lens arrangement of the first sub-lens group G2a, serving as a focusing lens group, aberration fluctuations from infinity through to a close distance can be suppressed, and a favorable optical quality can be achieved.

The first sub-lens group G2a is configured of a positive lens element 21 having a convex surface on the object side, and a cemented lens provided with a negative lens element 22 having a convex surface on the object side and a positive lens element 23, in that order from the object side. Due to a so-called "concentric" distribution of each side of the positive lens element 21 and the object side of the positive lens element 22 with respect to the diaphragm S, occurrence of abaxial aberrations such as coma and astigmatism can be suppressed. Furthermore, spherical aberration that occurs on the side closest to the object side of the first sub-lens group G2a can be corrected by the bonding surface, having a convex surface on the object side, that is formed by the negative lens element 22 and the positive lens element 23.

Conditions (10) and (11) specify the so-called "focusing sensitivity" which is determined by the lateral magnification of the first sub-lens group G2a, serving as a focusing lens group, and the combined lateral magnification of the lens groups behind of the first sub-lens group G2a (i.e., the second sub-lens group G2b, the third lens group G3 and the fourth lens group G4). By satisfying condition (10) or (11), an appropriate movement amount of the focusing lens group can be determined, and fluctuations in coma and chromatic aberration that occur during a focusing operation can be suppressed.

If the upper limit of condition (10) or (11) is exceeded, since the focusing sensitivity decreases, the movement amount of the focusing lens group during a focusing operation increases, which undesirably increases the burden on the autofocus mechanism thereof. Furthermore, since the difference in the movement amount of the focusing lens group between the short focal length extremity and the long focal length extremity when focusing on an object at a close distance is increased, fluctuation in the focal position, which occurs during zooming in close-distance photography, undesirably increases.

If the lower limit of condition (10) or (11) is exceeded, fluctuations in coma, axial chromatic aberration and lateral chromatic aberration, which occur due to the movement of the focusing lens group in the optical axis direction, increase, so that it becomes difficult to achieve a high optical quality.

By simultaneously satisfying conditions (10) and (11), the movement amount of the focusing lens group can be even more appropriately determined, and fluctuations in coma and chromatic aberration that occur during a focusing operation can be further suppressed. However, conditions (10) and (11) do not necessarily need to be simultaneously satisfied (conditions (10) and (11) are not integrally inseparable), a zoom lens system satisfying one of conditions (10) and (11) can also exhibit the same effect to a certain degree, and can be included in the technical scope of the zoom lens system according to the present invention.

As described above, in the second aspect of the present invention, the fourth lens group G4 is configured of the positive third sub-lens group G4a and the negative fourth sub-lens group G4b, in that order from the object side; the third sub-lens group G4a is formed as a cemented lens provided with a positive lens element 41 having a convex surface on the object side, a negative lens element 42, and a biconvex positive lens element 43, in that order from the object side.

A high optical quality can be achieved by favorably correcting axial chromatic aberration and lateral chromatic aberration, occurring in the first through third lens groups G1 through G3, using the fourth lens group G4. If a lens material exhibiting a low refractive index and a low dispersion is used for correcting chromatic aberration, although it becomes more difficult to correct spherical aberration and coma, etc., by forming the third sub-lens group G4a as a cemented lens having three lens elements 41, 42 and 43 as in the second aspect of the present invention, the freedom in the correction of chromatic aberration and the correction of high-order spherical aberration and coma via the bonding surfaces of the cemented lens can be increased.

Condition (12) specifies the difference between the average value of the Abbe numbers with respect to the d-line of the positive lens elements 41 and 43 that are provided in the third sub-lens group G4a, and the Abbe number with respect to the d-line of the negative lens element 42 that is provided in the third sub-lens group G4a. By satisfying condition (12), axial chromatic aberration and lateral chromatic aberration can be favorably corrected.

If either of the upper or lower limits of condition (12) is exceeded, it becomes difficult to suppress fluctuations in the chromatic aberration that occur during zooming.

Conditions (13) and (14) specify the ratio of the lateral magnification of the second lens group G2 to the lateral magnification of the fourth lens group G4. By satisfying condition (13) or (14), fluctuations in field curvature that occur during zooming are suppressed so that a favorable optical quality can be achieved.

If the upper limit of condition (13) or (14) is exceeded, it becomes difficult to correct field curvature fluctuations that occur during zooming. Furthermore, the overall length of the zoom lens system is increased, so that in order to collect a sufficient quantity of light, the effective diameter and weight of the first lens group G1 is increased, which undesirably causes an increase in manufacturing costs.

If the lower limit of condition (13) or (14) is exceeded, although advantageous for reducing the overall length of the zoom lens system, it becomes difficult to correct fluctuations in field curvature that occur during zooming.

By simultaneously satisfying conditions (13) and (14), the fluctuations in field curvature that occur during zooming can be further suppressed. However, conditions (13) and (14) do not necessarily need to be simultaneously satisfied (conditions (13) and (14) are not integrally inseparable), a zoom lens system satisfying one of conditions (13) and (14) can also exhibit the same effect to a certain degree, and can be included in the technical scope of the zoom lens system according to the present invention.

As described above, in the zoom lens system according to the second aspect of the present invention, the first lens group G1 is configured of the negative lens element 11 having a convex surface on the object side, the negative lens element 12 having a convex surface on the object side, the biconcave negative lens element 13 and the positive lens element 14 having a convex surface on the object side, in that order from the object side.

In the zoom lens system according to the second aspect of the present invention, favorably correcting distortion and lateral chromatic aberration that occur in the first lens group G1 is effective for the correction of distortion and lateral chromatic aberration in the entire zoom lens system. By forming a convex surface on the object side of each of the negative lens element 11 and the negative lens element 12, occurrence of distortion can be suppressed. The spherical aberration, axial chromatic aberration, lateral chromatic aberration and field curvature that occur in the first through third lens groups G1 through G3 can be corrected by the positive lens element 14.

Condition (15) specifies the partial dispersion ratio at the g-line and at the F-line of the positive lens element 14 that is provided closest to the image side within the first lens group G1. By satisfying condition (15), axial chromatic aberration and lateral chromatic aberration, especially in the secondary spectrum, can be favorably corrected.

If the upper limit of condition (15) is exceeded, the lateral chromatic aberration becomes overcorrected, and axial chromatic aberration at the long focal length extremity in particular remains insufficiently corrected.

If the lower limit of condition (15) is exceeded, the lateral chromatic aberration at the long focal length extremity becomes overcorrected.

Specific first through fifteenth numerical embodiments will be herein discussed. In the various aberration diagrams, lateral aberration diagrams and the tables, the d-line, g-line and C-line show aberrations at their respective wavelengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν(d) designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12}$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

Figure 1:
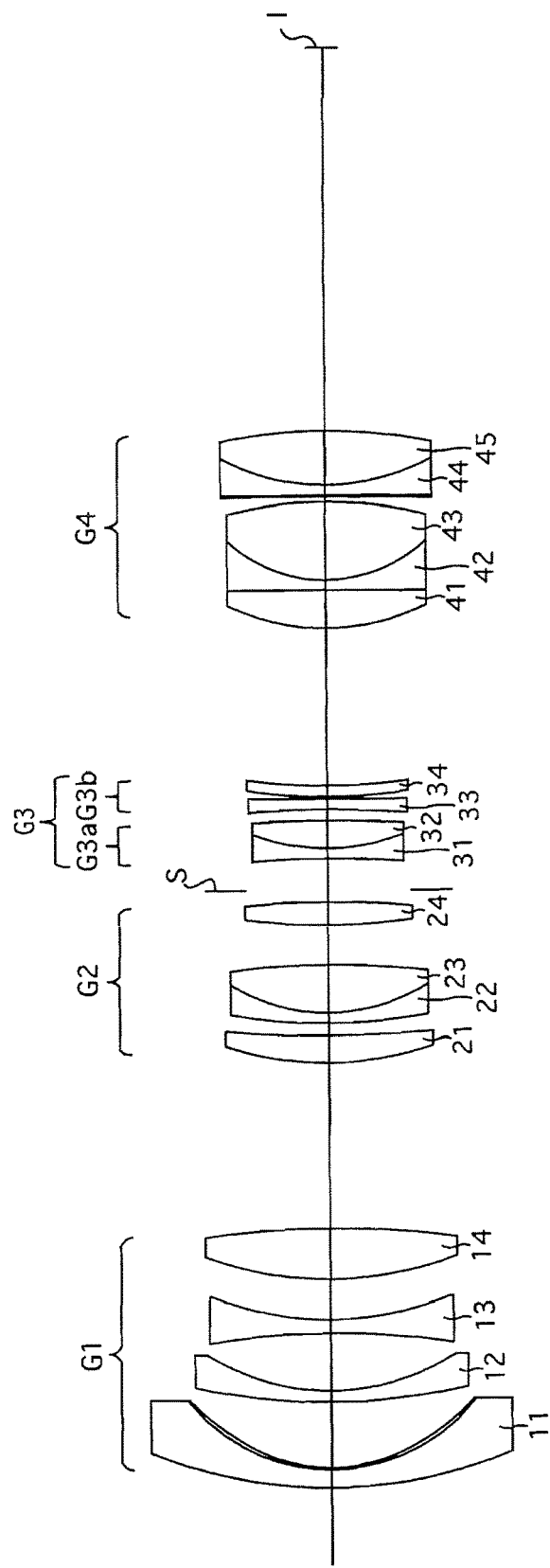
FIG. 1 shows a lens arrangement of a first numerical embodiment of a zoom lens system, according to the present invention, at the short focal length extremity when focused on an object at infinity.
Figure 2A:
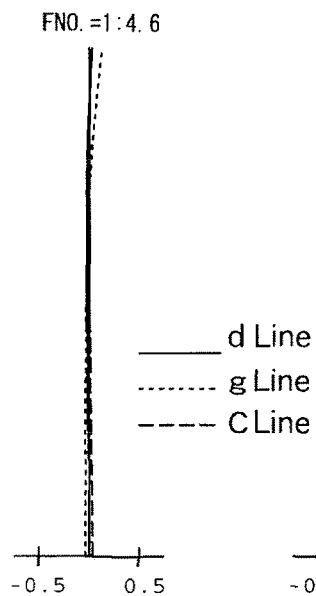
FIGS. 2A, 2B, 2C and 2D show various aberrations that occurred in the lens arrangement shown in FIG. 1, at the short focal length extremity when focused on an object at infinity.
Figure 2B:
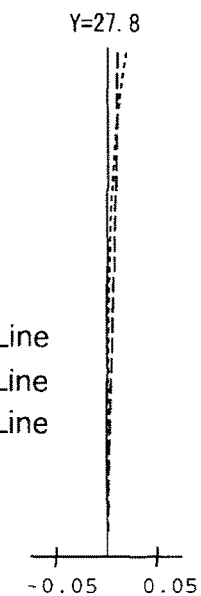
Figure 2C:
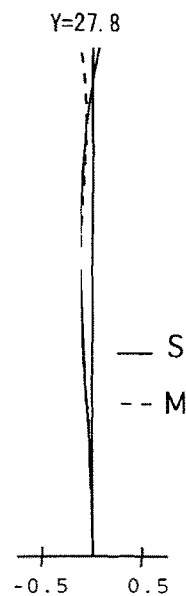
Figure 2D:
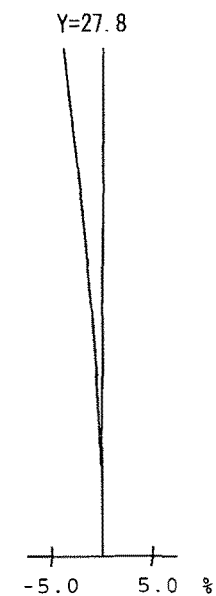
Figure 3A:
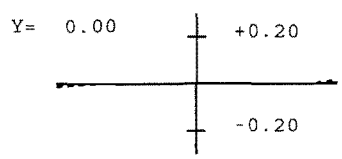
FIGS. 3A, 3B and 3C show lateral aberrations that occurred in the lens arrangement shown in FIG. 1, at the short focal length extremity when focused on an object at infinity.
Figure 3B:
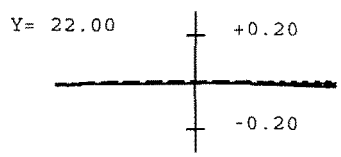
Figure 3C:
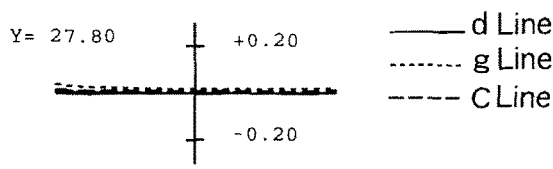
Figures 4A, 4B, 4C, 4D:
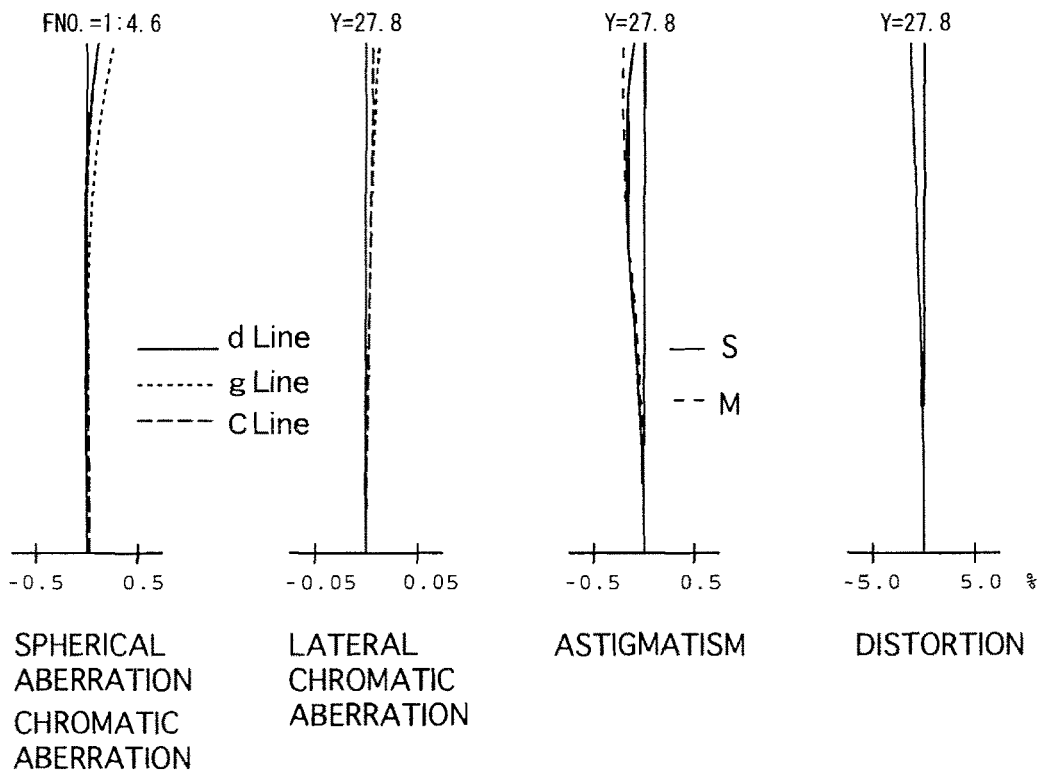
FIGS. 4A, 4B, 4C and 4D show various aberrations that occurred in the lens arrangement shown in FIG. 1, at an intermediate focal length when focused on an object at infinity.
Figure 5A:
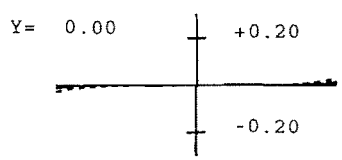
FIGS. 5A, 5B and 5C show lateral aberrations that occurred in the lens arrangement shown in FIG. 1, at an intermediate focal length when focused on an object at infinity.
Figure 5B:
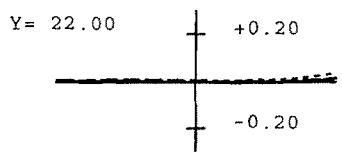
Figure 5C:
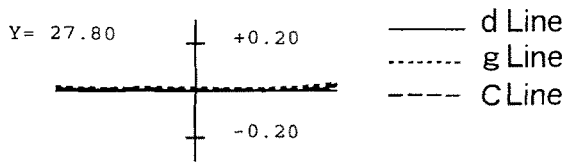
Figures 6A, 6B, 6C, 6D:
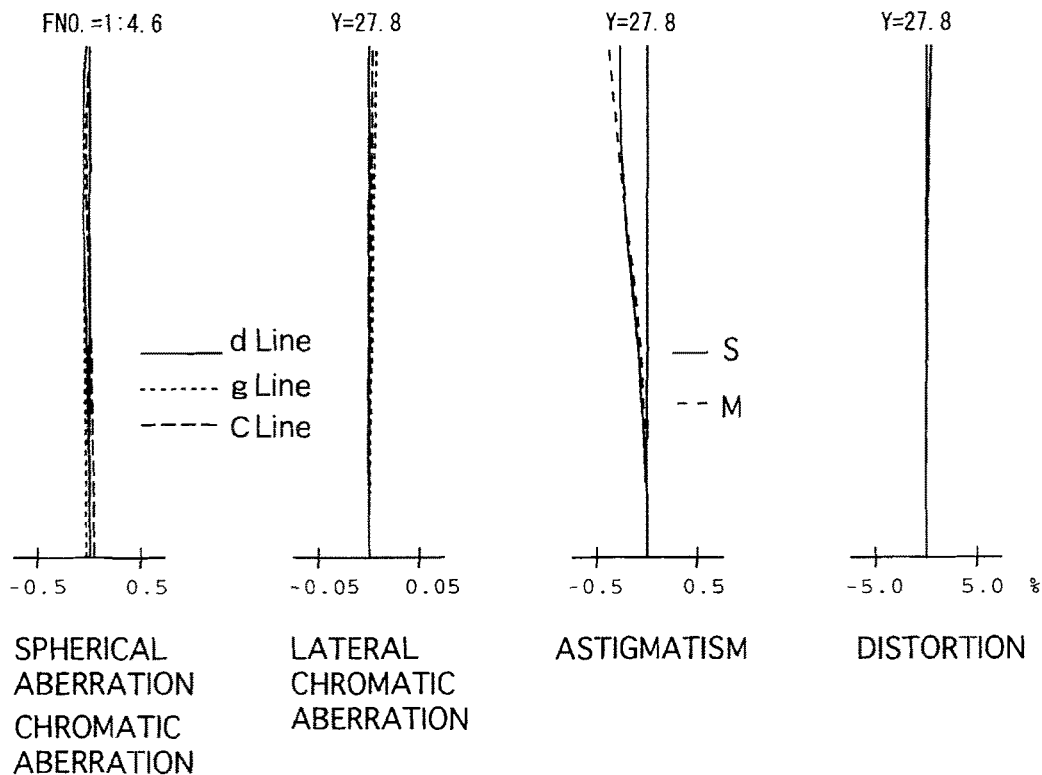
FIGS. 6A, 6B, 6C and 6D show various aberrations that occurred in the lens arrangement shown in FIG. 1, at the long focal length extremity when focused on an object at infinity.
Figure 7A:
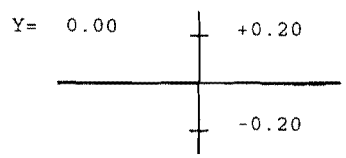
FIGS. 7A, 7B and 7C show lateral aberrations that occurred in the lens arrangement shown in FIG. 1, at the long focal length extremity when focused on an object at infinity.
Figure 7B:
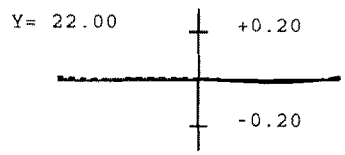
Figure 7C:
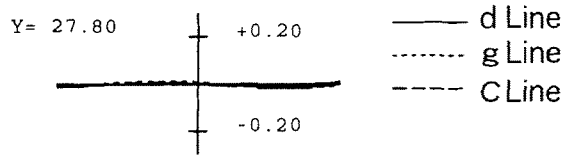
Figure 8A:
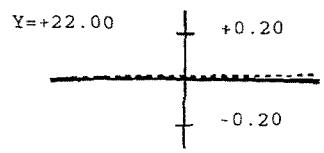
FIGS. 8A, 8B and 8C show lateral aberrations that occurred in the lens arrangement shown in FIG. 1 when the image-stabilizing lens group is decentered, at the short focal length extremity when focused on an object at infinity.
Figure 8B:
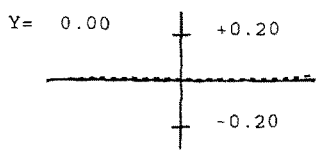
Figure 8C:
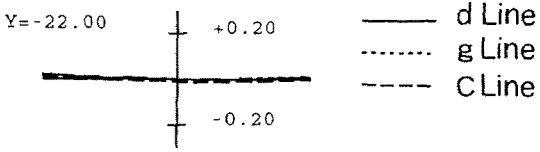
Figure 9A:
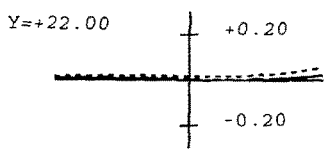
FIGS. 9A, 9B and 9C show lateral aberrations that occurred in the lens arrangement shown in FIG. 1 when the image-stabilizing lens group is decentered, at an intermediate focal length when focused on an object at infinity.
Figure 9B:
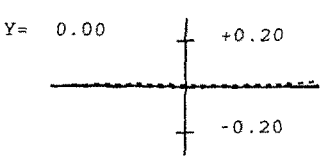
Figure 9C:
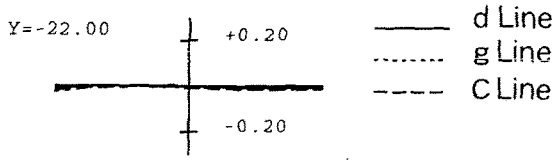
Figure 10A:
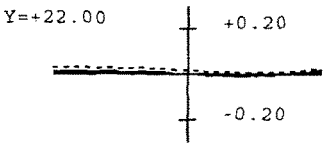
FIGS. 10A, 10B and 10C show lateral aberrations that occurred in the lens arrangement shown in FIG. 1 when the image-stabilizing lens group is decentered, at the long focal length extremity when focused on an object at infinity.
Figure 10B:
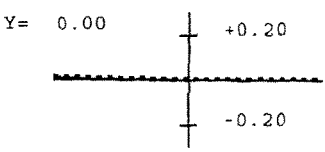
Figure 10C:
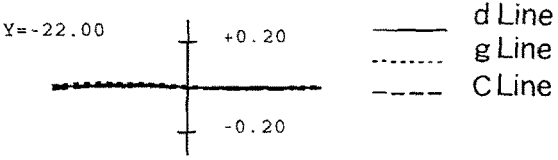

FIGS. 1 through 10C and Tables 1 through 5 show a first numerical embodiment of the zoom lens system according to the present invention. FIG. 1 shows a lens arrangement of the first numerical embodiment of the zoom lens system, at the short focal length extremity when focused on an object at infinity. FIGS. 2A, 2B, 2C and 2D show various aberrations that occurred in the lens arrangement shown in FIG. 1, at the short focal length extremity when focused on an object at infinity. FIGS. 3A, 3B and 3C show lateral aberrations that occurred in the lens arrangement shown in FIG. 1, at the short focal length extremity when focused on an object at infinity. FIGS. 4A, 4B, 4C and 4D show various aberrations that occurred in the lens arrangement shown in FIG. 1, at an intermediate focal length when focused on an object at infinity. FIGS. 5A, 5B and 5C show lateral aberrations that occurred in the lens arrangement shown in FIG. 1, at an intermediate focal length when focused on an object at infinity. FIGS. 6A, 6B, 6C and 6D show various aberrations that occurred in the lens arrangement shown in FIG. 1, at the long focal length extremity when focused on an object at infinity. FIGS. 7A, 7B and 7C show lateral aberrations that occurred in the lens arrangement shown in FIG. 1, at the long focal length extremity when focused on an object at infinity. FIGS. 8A, 8B and 8C show lateral aberrations that occurred in the lens arrangement shown in FIG. 1 when the image-stabilizing lens group is decentered (during an image-stabilizing drive operation), at the short focal length extremity when focused on an object at infinity. FIGS. 9A, 9B and 9C show lateral aberrations that occurred in the lens arrangement shown in FIG. 1 when the image-stabilizing lens group is decentered (during an image-stabilizing drive operation), at an intermediate focal length when focused on an object at infinity. FIGS. 10A, 10B and 10C show lateral aberrations that occurred in the lens arrangement shown in FIG. 1 when the image-stabilizing lens group is decentered (during an image-stabilizing drive operation), at the long focal length extremity when focused on an object at infinity. Table 1 shows the lens surface data, Table 2 shows the aspherical surface data, Table 3 shows various lens-system data, Table 4 shows image-stabilizing drive data, and Table 5 shows lens group data.

The zoom lens system of the first numerical embodiment is configured of a negative first lens group G1, a positive second lens group G2, a negative third lens group G3 and a positive fourth lens group G4, in that order from the object side. A diaphragm S is provided between the second lens group G2 and the third lens group G3, and the diaphragm S moves integrally with the second lens group G2.

The first lens group G1 is configured of a negative meniscus lens element 11 having a convex surface on the object side, a negative meniscus lens element 12 having a convex surface on the object side, a biconcave negative lens element 13, and a biconvex positive lens element 14, in that order from the object side. The negative meniscus lens element 11 is a hybrid lens formed by a glass lens element with an aspherical surface layer, formed from a synthetic resin material, adhered onto the image side thereof.

The second lens group G2 is configured of a positive meniscus lens element 21 having a convex surface on the object side, a cemented lens formed by a negative meniscus lens element 22 having a convex surface on the object side, and a biconvex positive lens element 23; and a biconvex positive lens element 24, in that order from the object side.

The third lens group G3 is configured of a negative first sub-lens group G3a and a negative second sub-lens group G3b, in that order from the object side.

The second sub-lens group G3b serves as an image-shake correction lens group (image-stabilizing lens group) which corrects image shake that is caused by hand shake/vibrations, etc., by moving (decentering) the image-shake correction lens group in a direction orthogonal to the optical axis to thereby change the imaging position.

The first sub-lens group G3a is configured of a cemented lens formed by a biconcave negative lens element 31 and a biconvex positive lens element 32, in that order from the object side.

The second sub-lens group G3b is configured of a biconcave negative lens element (a negative single lens element having a concave surface on the image side) 33 and a positive meniscus lens element 34 having convex surface on the object side (a positive single lens element having a convex surface on the object side), in that order from the object side, and an air lens having a meniscus shape with a convex surface on the object side is formed between the biconcave negative lens element 33 and the positive meniscus lens element 34.

The fourth lens group G4 is configured of a cemented lens provided with a biconvex positive lens element 41, a biconcave negative lens element 42 and a biconvex positive lens element 43; and a cemented lens provided with a biconcave negative lens element 44 and a biconvex positive lens element 45, in that order from the object side. The biconcave negative lens element 44 is a hybrid lens formed by a glass lens element with an aspherical surface layer, formed from a synthetic resin material, adhered onto the object side thereof.

TABLE 1

LENS SURFACE DATA

| Surf. No. | R | d | N(d) | ν(d) |
|---|---|---|---|---|
| 1 | 70.143 | 2.680 | 1.75500 | 52.3 |
| 2 | 27.200 | 0.280 | 1.52972 | 42.7 |
| 3* | 23.398 | 9.810 | | |
| 4 | 94.152 | 1.650 | 1.72916 | 54.7 |
| 5 | 33.886 | 8.630 | | |
| 6 | −111.219 | 2.000 | 1.61800 | 63.4 |
| 7 | 46.602 | 6.050 | | |
| 8 | 53.980 | 7.500 | 1.59551 | 39.2 |
| 9 | −137.448 | d9 | | |
| 10 | 49.645 | 3.980 | 1.57501 | 41.5 |
| 11 | 193.560 | 1.820 | | |
| 12 | 89.353 | 1.500 | 1.80610 | 33.3 |
| 13 | 28.082 | 7.080 | 1.51633 | 64.1 |
| 14 | −120.510 | 5.863 | | |
| 15 | 90.623 | 3.400 | 1.48749 | 70.2 |
| 16 | −144.997 | 1.730 | | |
| 17 (Diaphragm) | ∞ | d17 | | |
| 18 | −137.164 | 1.500 | 1.81600 | 46.6 |
| 19 | 32.237 | 4.120 | 1.68893 | 31.1 |
| 20 | −163.680 | 1.640 | | |
| 21 | −131.661 | 1.500 | 1.83400 | 37.2 |
| 22 | 713.414 | 0.300 | | |
| 23 | 77.167 | 1.670 | 1.54814 | 45.8 |
| 24 | 92.600 | d24 | | |
| 25 | 34.439 | 5.590 | 1.80000 | 29.9 |
| 26 | −5000.000 | 1.500 | 1.80100 | 35.0 |
| 27 | 21.950 | 11.540 | 1.49700 | 81.6 |
| 28 | −58.800 | 0.750 | | |
| 29* | −3241.071 | 0.200 | 1.52972 | 42.7 |
| 30 | −3241.071 | 1.500 | 1.83400 | 37.2 |
| 31 | 33.728 | 7.980 | 1.48749 | 70.2 |
| 32 | −77.015 | — | | |

The asterisk (*) designates an aspherical surface which is rotationally symmetrical with respect to the optical axis.

TABLE 2

ASPHERICAL SURFACE DATA

| Surf. No. | K | A4 | A6 | A8 | A10 |
|---|---|---|---|---|---|
| 3 | −1.000 | 0.3017E−05 | −0.1883E−09 | 0.1208E−11 | −0.3174E−14 |
| 29 | 0.000 | −0.3441E−05 | 0.1181E−08 | −0.3217E−11 | 0.3495E−13 |

TABLE 3

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 38.8 | 32.2 |
| Y | 27.80 | 27.80 | 27.80 |
| fB | 66.64 | 74.50 | 83.99 |
| L | 222.72 | 218.85 | 219.26 |
| d9 | 24.418 | 15.585 | 8.631 |
| d17 | 4.730 | 9.698 | 17.061 |
| d24 | 23.162 | 15.301 | 5.816 |

TABLE 4

IMAGE-STABILIZING DRIVE DATA

| | Short Focal Length Extremity |
|---|---|
| Lens Movement Amount | 0.30 |
| Image Movement Amount | −0.15 |
| Correction Angle | 0.30 |
| | Intermediate Focal Length |
| Lens Movement Amount | 0.33 |
| Image Movement Amount | −0.18 |
| Correction Angle | 0.30 |
| | Long Focal Length Extremity |
| Lens Movement Amount | 0.37 |
| Image Movement Amount | −0.23 |
| Correction Angle | 0.30 |

TABLE 5

LENS GROUP DATA

| Lens Group | 1st Surface | Focal Length |
|---|---|---|
| 1 | 1 | −29.26 |
| 2 | 10 | 53.52 |
| 3 | 18 | −82.15 |
| 4 | 25 | 71.59 |

Numerical Embodiment 2

Figure 11:
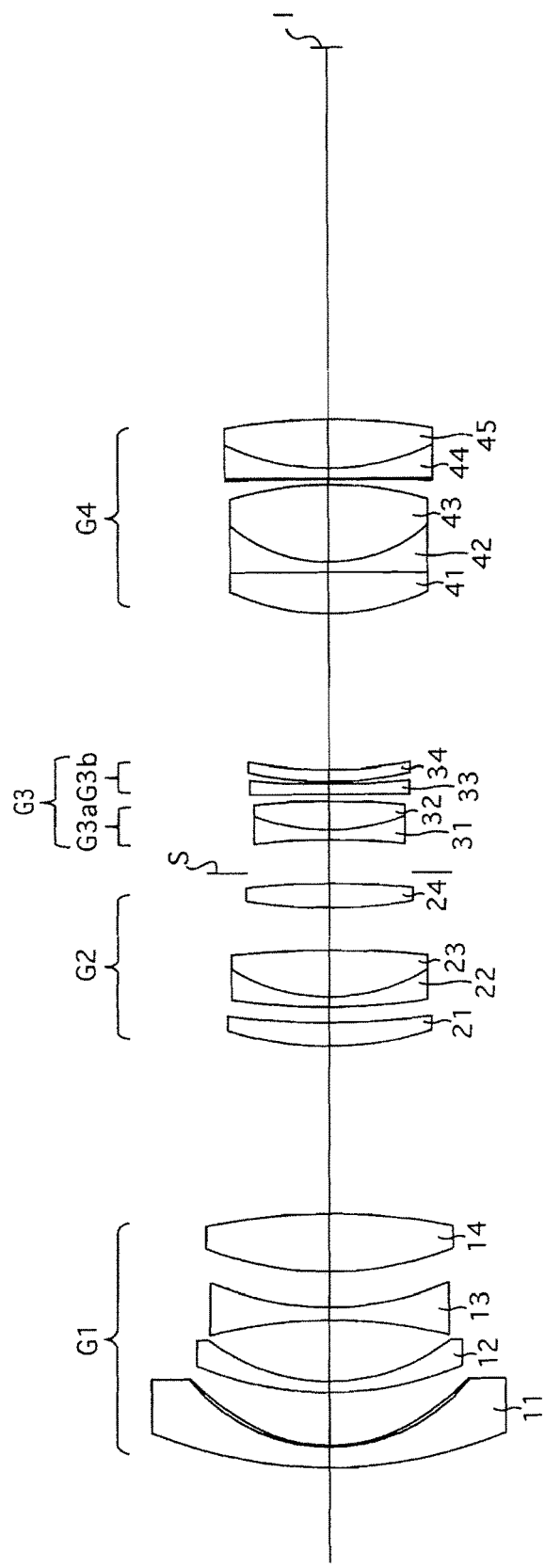
FIG. 11 shows a lens arrangement of a second numerical embodiment of a zoom lens system, according to the present invention, at the short focal length extremity when focused on an object at infinity.
Figures 12A, 12B, 12C, 12D:
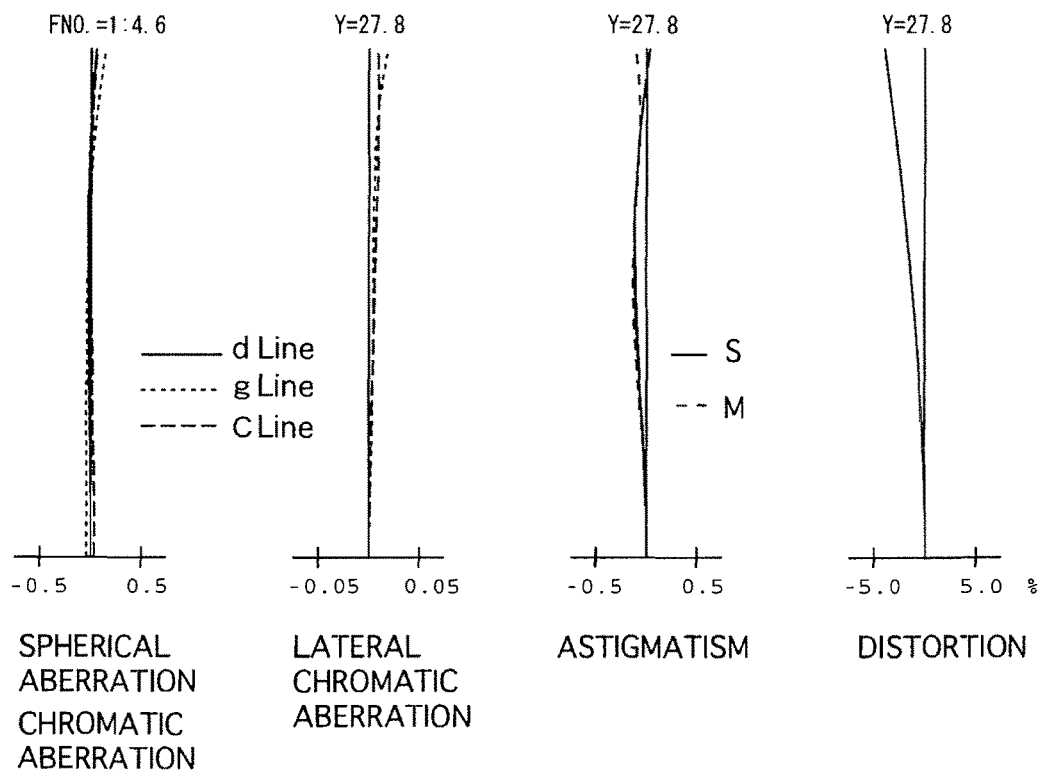
FIGS. 12A, 12B, 12C and 12D show various aberrations that occurred in the lens arrangement shown in FIG. 11, at the short focal length extremity when focused on an object at infinity.
Figure 13A:
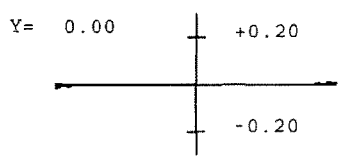
FIGS. 13A, 13B and 13C show lateral aberrations that occurred in the lens arrangement shown in FIG. 11, at the short focal length extremity when focused on an object at infinity.
Figure 13B:
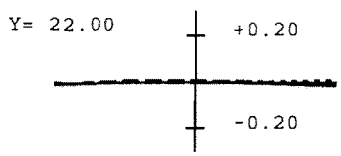
Figure 13C:
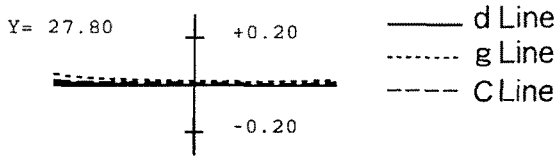
Figures 14A, 14B, 14C, 14D:
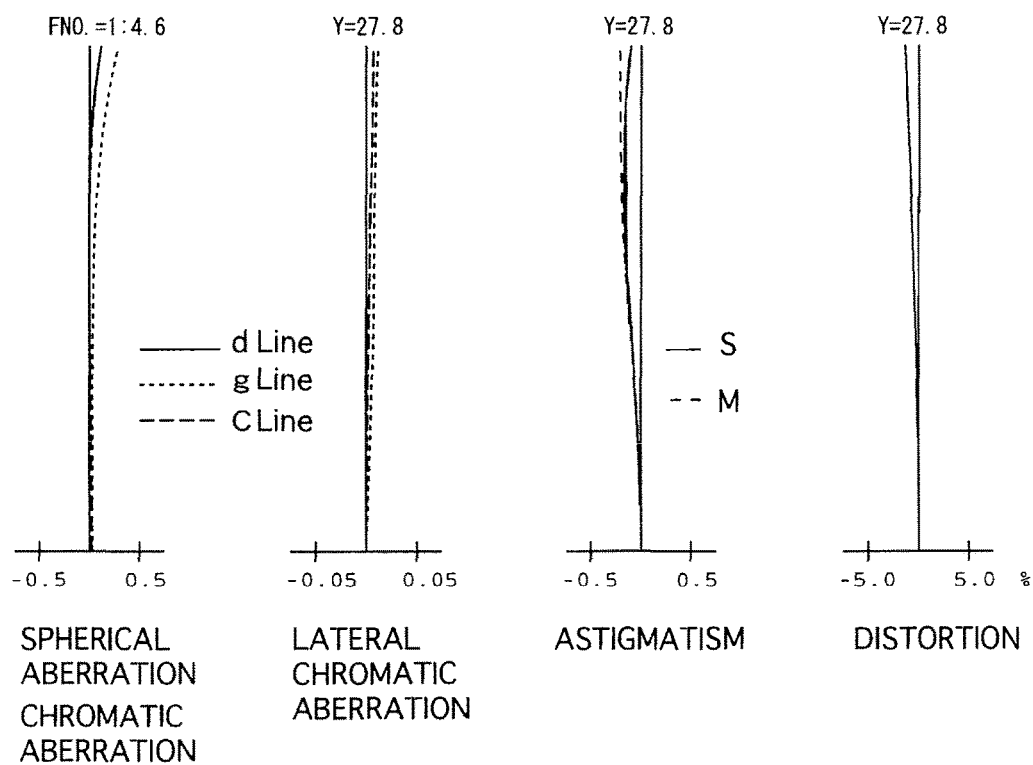
FIGS. 14A, 14B, 14C and 14D show various aberrations that occurred in the lens arrangement shown in FIG. 11, at an intermediate focal length when focused on an object at infinity.
Figure 15A:
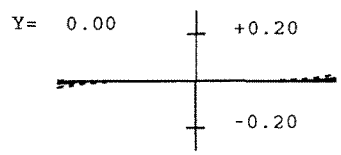
FIGS. 15A, 15B and 15C show lateral aberrations that occurred in the lens arrangement shown in FIG. 11, at an intermediate focal length when focused on an object at infinity.
Figure 15B:
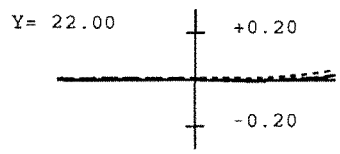
Figure 15C:
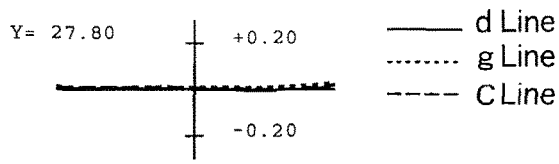
Figure 18A:
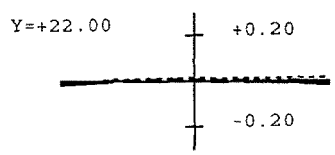
FIGS. 18A, 18B and 18C show lateral aberrations that occurred in the lens arrangement shown in FIG. 11 when the image-stabilizing lens group is decentered, at the short focal length extremity when focused on an object at infinity.
Figure 18B:
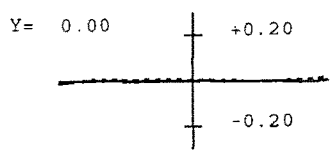
Figure 18C:
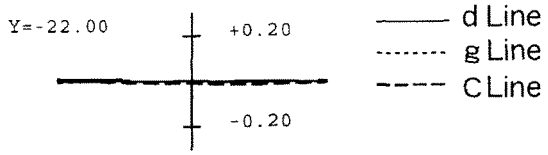
Figure 19A:
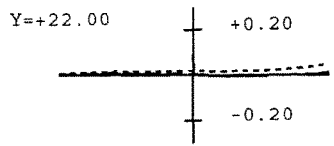
FIGS. 19A, 19B and 19C show lateral aberrations that occurred in the lens arrangement shown in FIG. 11 when the image-stabilizing lens group is decentered, at an intermediate focal length when focused on an object at infinity.
Figure 19B:
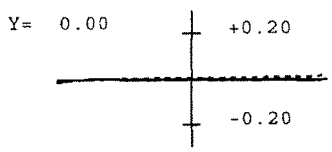
Figure 19C:
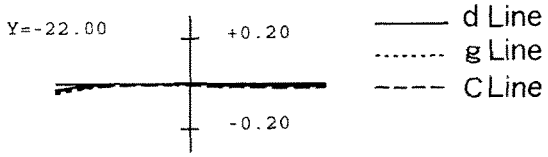
Figure 20A:
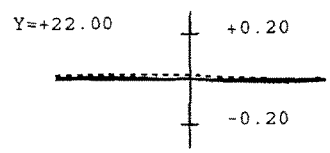
FIGS. 20A, 20B and 20C show lateral aberrations that occurred in the lens arrangement shown in FIG. 11 when the image-stabilizing lens group is decentered, at the long focal length extremity when focused on an object at infinity.
Figure 20B:
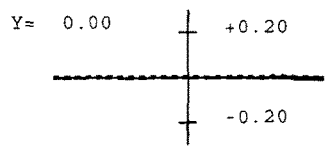
Figure 20C:
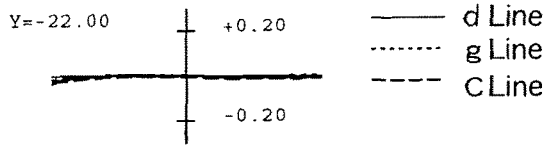

FIGS. 11 through 20C and Tables 6 through 10 show a second numerical embodiment of the zoom lens system according to the present invention. FIG. 11 shows a lens arrangement of the second numerical embodiment of the zoom lens system, at the short focal length extremity when focused on an object at infinity. FIGS. 12A, 12B, 12C and 12D show various aberrations that occurred in the lens arrangement shown in FIG. 11, at the short focal length extremity when focused on an object at infinity. FIGS. 13A, 13B and 13C show lateral aberrations that occurred in the lens arrangement shown in FIG. 11, at the short focal length extremity when focused on an object at infinity. FIGS. 14A, 14B, 14C and 14D show various aberrations that occurred in the lens arrangement shown in FIG. 11, at an intermediate focal length when focused on an object at infinity. FIGS. 15A, 15B and 15C show lateral aberrations that occurred in the lens arrangement shown in FIG. 11, at an intermediate focal length when focused on an object at infinity. FIGS. 16A, 16B, 16C and 16D show various aberrations that occurred in the lens arrangement shown in FIG. 11, at the long focal length extremity when focused on an object at infinity. FIGS. 17A, 17B and 17C show lateral aberrations that occurred in the lens arrangement shown in FIG. 11, at the long focal length extremity when focused on an object at infinity. FIGS. 18A, 18B and 18C show lateral aberrations that occurred in the lens arrangement shown in FIG. 11 when the image-stabilizing lens group is decentered (during an image-stabilizing drive operation), at the short focal length extremity when focused on an object at infinity. FIGS. 19A, 19B and 19C show lateral aberrations that occurred in the lens arrangement shown in FIG. 11 when the image-stabilizing lens group is decentered (during an image-stabilizing drive operation), at an intermediate focal length when focused on an object at infinity. FIGS. 20A, 20B and 20C show lateral aberrations that occurred in the lens arrangement shown in FIG. 11 when the image-stabilizing lens group is decentered (during an image-stabilizing drive operation), at the long focal length extremity when focused on an object at infinity. Table 6 shows the lens surface data, Table 7 shows the aspherical surface data, Table 8 shows various lens-system data, Table 9 shows image-stabilizing drive data, and Table 10 shows lens group data.

The fundamental lens arrangement of the second numerical embodiment is the same as that of the first numerical embodiment.

TABLE 6

LENS SURFACE DATA

| Surf. No. | R | d | N(d) | v(d) |
|---|---|---|---|---|
| 1 | 69.831 | 3.120 | 1.78590 | 44.2 |
| 2 | 27.200 | 0.200 | 1.52972 | 42.7 |
| 3* | 22.911 | 8.050 | | |
| 4 | 52.344 | 1.650 | 1.75500 | 52.3 |
| 5 | 29.769 | 9.280 | | |
| 6 | −72.757 | 2.000 | 1.61800 | 63.4 |
| 7 | 45.461 | 5.290 | | |
| 8 | 52.269 | 8.640 | 1.56732 | 42.8 |
| 9 | −95.077 | d9 | | |
| 10 | 53.398 | 3.400 | 1.54814 | 45.8 |
| 11 | 125.856 | 2.340 | | |
| 12 | 104.138 | 1.500 | 1.80000 | 29.9 |
| 13 | 28.684 | 6.980 | 1.58144 | 40.7 |
| 14 | −153.716 | 6.340 | | |
| 15 | 78.510 | 3.670 | 1.49700 | 81.6 |
| 16 | −125.616 | 1.610 | | |
| 17 (Diaphragm) | ∞ | d17 | | |
| 18 | −111.884 | 1.500 | 1.83481 | 42.7 |
| 19 | 32.327 | 4.290 | 1.68893 | 31.1 |

TABLE 6-continued

LENS SURFACE DATA

| Surf. No. | R | d | N(d) | v(d) |
|---|---|---|---|---|
| 20 | −124.154 | 1.080 | | |
| 21 | −1204.327 | 1.500 | 1.85026 | 32.3 |
| 22 | 139.318 | 0.370 | | |
| 23 | 56.411 | 1.770 | 1.80518 | 25.4 |
| 24 | 67.230 | d24 | | |
| 25 | 35.945 | 6.200 | 1.80100 | 35.0 |
| 26 | −1000.000 | 1.500 | 1.83400 | 37.2 |
| 27 | 23.047 | 11.480 | 1.49700 | 81.6 |
| 28 | −53.099 | 0.750 | | |
| 29* | −3272.914 | 0.200 | 1.52972 | 42.7 |
| 30 | −3272.914 | 1.500 | 1.83400 | 37.2 |
| 31 | 37.277 | 7.310 | 1.48749 | 70.2 |
| 32 | −94.390 | — | | |

The asterisk (*) designates an aspherical surface which is rotationally symmetrical with respect to the optical axis.

TABLE 7

ASPHERICAL SURFACE DATA

| Surf. No. | K | A4 | A6 | A8 | A10 |
|---|---|---|---|---|---|
| 3 | −1.000 | 0.2447E−05 | −0.3260E−09 | −0.1948E−12 | −0.1958E−14 |
| 29 | 0.000 | −0.3209E−05 | 0.2326E−09 | 0.2241E−12 | 0.2444E−13 |

TABLE 8

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 38.8 | 32.3 |
| Y | 27.80 | 27.80 | 27.80 |
| fB | 65.85 | 73.70 | 83.45 |
| L | 222.79 | 218.27 | 217.87 |
| d9 | 25.085 | 15.485 | 7.751 |
| d17 | 4.920 | 10.001 | 17.329 |
| d24 | 23.413 | 15.564 | 5.816 |

TABLE 9

IMAGE-STABILIZING DRIVE DATA

| | Short Focal Length Extremity |
|---|---|
| Lens Movement Amount | 0.42 |
| Image Movement Amount | −0.15 |
| Correction Angle | 0.30 |
| | Intermediate Focal Length |
| Lens Movement Amount | 0.47 |
| Image Movement Amount | −0.18 |
| Correction Angle | 0.30 |
| | Long Focal Length Extremity |
| Lens Movement Amount | 0.52 |
| Image Movement Amount | −0.23 |
| Correction Angle | 0.30 |

TABLE 10

LENS GROUP DATA

| Lens Group | 1st Surface | Focal Length |
|---|---|---|
| 1 | 1 | −29.97 |
| 2 | 10 | 54.37 |
| 3 | 18 | −91.34 |
| 4 | 25 | 76.53 |

Numerical Embodiment 3

Figure 21:
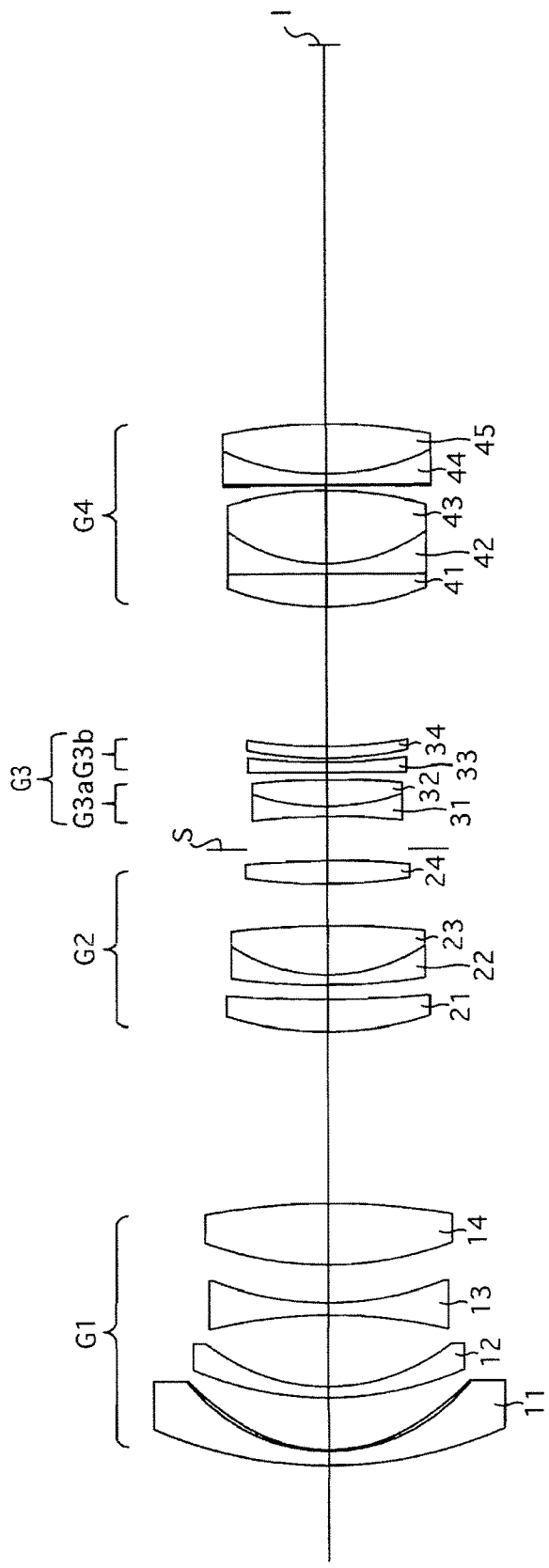
FIG. 21 shows a lens arrangement of a third numerical embodiment of a zoom lens system, according to the present invention, at the short focal length extremity when focused on an object at infinity.
Figures 22A, 22B, 22C, 22D:
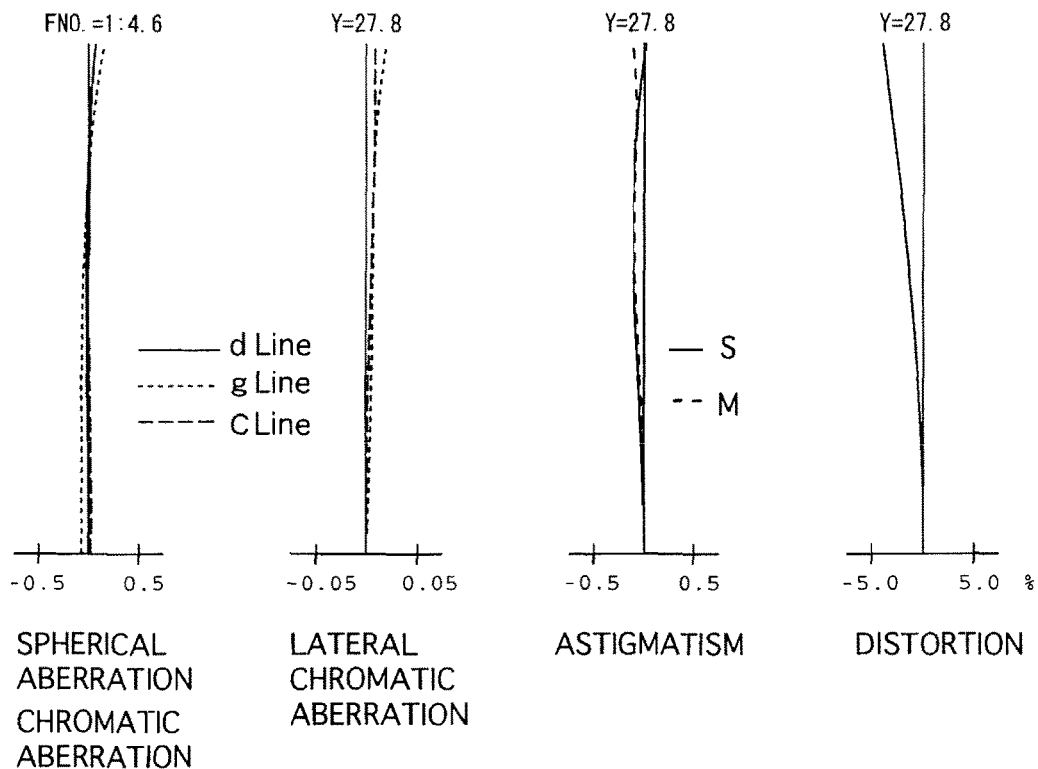
FIGS. 22A, 22B, 22C and 22D show various aberrations that occurred in the lens arrangement shown in FIG. 21, at the short focal length extremity when focused on an object at infinity.
Figure 23A:
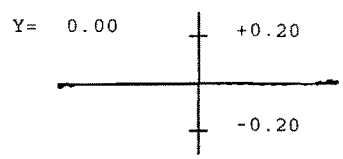
FIGS. 23A, 23B and 23C show lateral aberrations that occurred in the lens arrangement shown in FIG. 21, at the short focal length extremity when focused on an object at infinity.
Figure 23B:
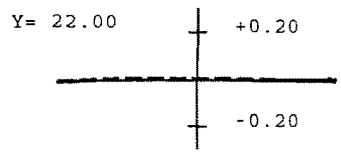
Figure 23C:
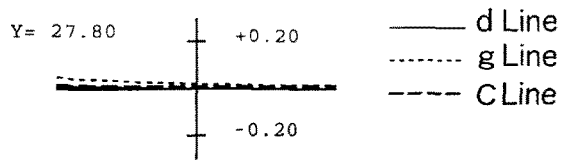
Figures 26A, 26B, 26C, 26D:
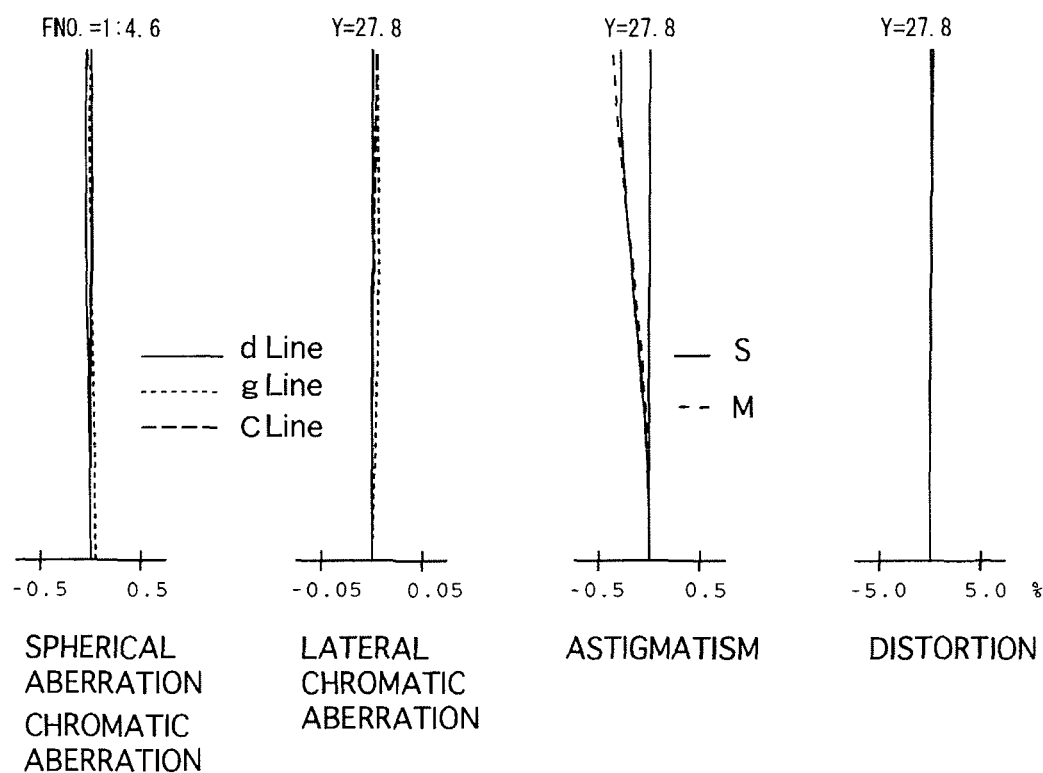
FIGS. 26A, 26B, 26C and 26D show various aberrations that occurred in the lens arrangement shown in FIG. 21, at the long focal length extremity when focused on an object at infinity.
Figure 27A:
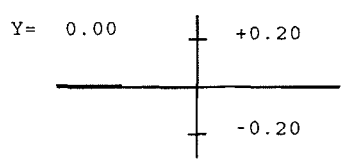
FIGS. 27A, 27B and 27C show lateral aberrations that occurred in the lens arrangement shown in FIG. 21, at the long focal length extremity when focused on an object at infinity.
Figure 27B:
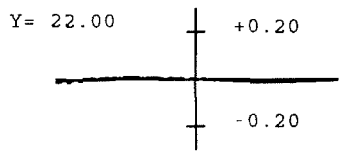
Figure 27C:
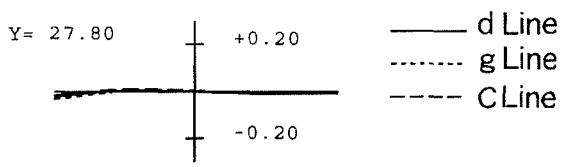
Figure 28A:
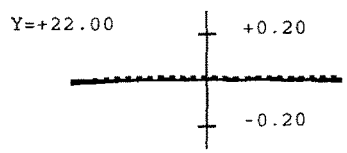
FIGS. 28A, 28B and 28C show lateral aberrations that occurred in the lens arrangement shown in FIG. 21 when the image-stabilizing lens group is decentered, at the short focal length extremity when focused on an object at infinity.
Figure 28B:
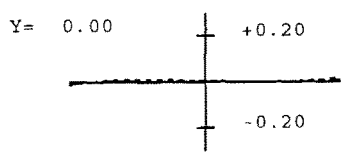
Figure 28C:
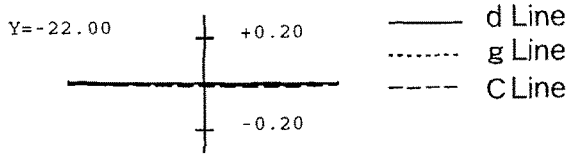
Figure 29A:
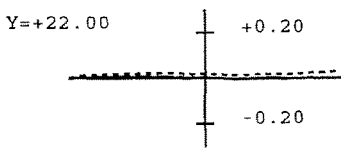
FIGS. 29A, 29B and 29C show lateral aberrations that occurred in the lens arrangement shown in FIG. 21 when the image-stabilizing lens group is decentered, at an intermediate focal length when focused on an object at infinity.
Figure 29B:
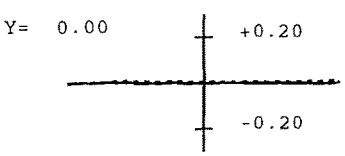
Figure 29C:
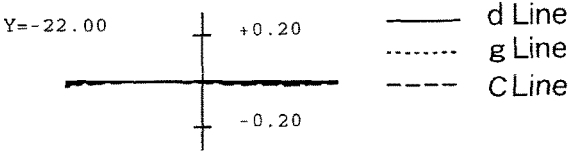
Figure 30A:
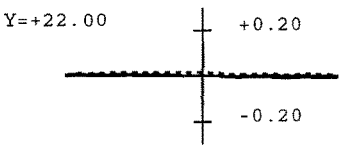
FIGS. 30A, 30B and 30C show lateral aberrations that occurred in the lens arrangement shown in FIG. 21 when the image-stabilizing lens group is decentered, at the long focal length extremity when focused on an object at infinity.
Figure 30B:
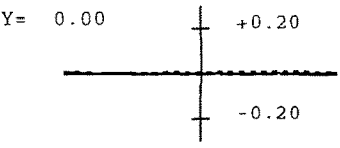
Figure 30C:
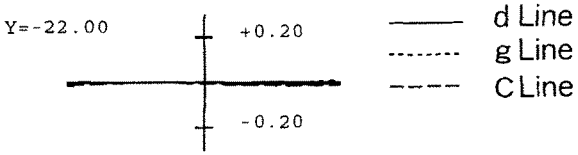

FIGS. 21 through 30C and Tables 11 through 15 show a third numerical embodiment of the zoom lens system according to the present invention. FIG. 21 shows a lens arrangement of the third numerical embodiment of the zoom lens system, at the short focal length extremity when focused on an object at infinity. FIGS. 22A, 22B, 22C and 22D show various aberrations that occurred in the lens arrangement shown in FIG. 21, at the short focal length extremity when focused on an object at infinity. FIGS. 23A, 23B and 23C show lateral aberrations that occurred in the lens arrangement shown in FIG. 21, at the short focal length extremity when focused on an object at infinity. FIGS. 24A, 24B, 24C and 24D show various aberrations that occurred in the lens arrangement shown in FIG. 21, at an intermediate focal length when focused on an object at infinity. FIGS. 25A, 25B and 25C show lateral aberrations that occurred in the lens arrangement shown in FIG. 21, at an intermediate focal length when focused on an object at infinity. FIGS. 26A, 26B, 26C and 26D show various aberrations that occurred in the lens arrangement shown in FIG. 21, at the long focal length extremity when focused on an object at infinity. FIGS. 27A, 27B and 27C show lateral aberrations that occurred in the lens arrangement shown in FIG. 21, at the long focal length extremity when focused on an object at infinity. FIGS. 28A, 28B and 28C show lateral aberrations that occurred in the lens arrangement shown in FIG. 21 when the image-stabilizing lens group is decentered (during an image-stabilizing drive operation), at the short focal length extremity when focused on an object at infinity. FIGS. 29A, 29B and 29C show lateral aberrations that occurred in the lens arrangement shown in FIG. 21 when the image-stabilizing lens group is decentered (during an image-stabilizing drive operation), at an intermediate focal length when focused on an object at infinity. FIGS. 30A, 30B and 30C show lateral aberrations that occurred in the lens arrangement shown in FIG. 21 when the image-stabilizing lens group is decentered (during an image-stabilizing drive operation), at the long focal length extremity when focused on an object at infinity. Table 11 shows the lens surface data, Table 12 shows the aspherical surface data, Table 13 shows various lens-system data, Table 14 shows image-stabilizing drive data, and Table 15 shows lens group data.

The fundamental lens arrangement of the third numerical embodiment is the same as that of the first numerical embodiment except for the following feature:

(1) The negative single lens element (negative single lens element having a concave surface on the image side) 33 of the second sub-lens group G3b is a negative meniscus lens element having a convex surface on the object side.

TABLE 11

LENS SURFACE DATA

| Surf. No. | R | d | N (d) | ν (d) |
|---|---|---|---|---|
| 1 | 65.846 | 2.160 | 1.80610 | 40.9 |
| 2 | 27.341 | 0.200 | 1.52972 | 42.7 |
| 3* | 23.079 | 7.840 | | |
| 4 | 52.160 | 1.650 | 1.74100 | 52.7 |
| 5 | 29.806 | 10.810 | | |
| 6 | −77.937 | 1.900 | 1.64000 | 60.1 |
| 7 | 48.710 | 5.650 | | |
| 8 | 55.331 | 9.120 | 1.59551 | 39.2 |
| 9 | −109.115 | d9 | | |
| 10 | 51.629 | 4.770 | 1.53172 | 48.9 |
| 11 | 182.790 | 2.150 | | |
| 12 | 101.662 | 1.500 | 1.80000 | 29.9 |
| 13 | 27.218 | 7.340 | 1.58144 | 40.7 |
| 14 | −137.754 | 6.226 | | |
| 15 | 86.979 | 3.440 | 1.49700 | 81.6 |
| 16 | −148.336 | 1.740 | | |
| 17 (Diaphragm) | ∞ | d17 | | |
| 18 | −96.136 | 1.500 | 1.83481 | 42.7 |
| 19 | 36.406 | 3.980 | 1.69895 | 30.1 |
| 20 | −128.522 | 1.080 | | |
| 21 | 4320.238 | 1.500 | 1.83400 | 37.2 |
| 22 | 114.364 | 0.580 | | |
| 23 | 63.061 | 1.770 | 1.79504 | 28.7 |
| 24 | 81.995 | d24 | | |
| 25 | 42.173 | 5.000 | 1.80440 | 39.6 |
| 26 | −1000.000 | 1.500 | 1.80610 | 40.9 |
| 27 | 26.070 | 10.840 | 1.49700 | 81.6 |
| 28 | −54.507 | 0.750 | | |
| 29* | −1623.804 | 0.200 | 1.52972 | 42.7 |
| 30 | −1623.804 | 1.500 | 1.83400 | 37.2 |
| 31 | 37.653 | 7.430 | 1.49700 | 81.6 |
| 32 | −83.132 | — | | |

The asterisk (*) designates an aspherical surface which is rotationally symmetrical with respect to the optical axis.

TABLE 12

ASPHERICAL SURFACE DATA

| Surf. No. | K | A4 | A6 | A8 | A10 |
|---|---|---|---|---|---|
| 3 | −1.000 | 0.2674E−05 | −0.4322E−09 | 0.7364E−12 | −0.2496E−14 |
| 29 | 0.000 | −0.2701E−05 | 0.5859E−09 | −0.4420E−12 | 0.1221E−13 |

TABLE 13

VARIOUS LENS-SYSTEM DATA
Zoom Ratio: 1.56

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 44.66 |
| W | 45.3 | 38.8 | 31.8 |
| Y | 27.80 | 27.80 | 27.80 |
| fB | 66.13 | 73.78 | 86.00 |
| L | 221.68 | 217.39 | 217.96 |

TABLE 13-continued

VARIOUS LENS-SYSTEM DATA
Zoom Ratio: 1.56

|  | Short Focal Length Extremity | Intermediate Focal Length | Long Focal Length Extremity |
|---|---|---|---|
| d9 | 25.639 | 15.262 | 5.791 |
| d17 | 4.920 | 10.014 | 16.224 |
| d24 | 20.866 | 14.202 | 5.816 |

TABLE 14

IMAGE-STABILIZING DRIVE DATA

| | Short Focal Length Extremity |
|---|---|
| Lens Movement Amount | 0.45 |
| Image Movement Amount | −0.15 |
| Correction Angle | 0.30 |
| | Intermediate Focal Length |
| Lens Movement Amount | 0.51 |
| Image Movement Amount | −0.18 |
| Correction Angle | 0.30 |
| | Long Focal Length Extremity |
| Lens Movement Amount | 0.58 |
| Image Movement Amount | −0.23 |
| Correction Angle | 0.30 |

TABLE 15

LENS GROUP DATA

| Lens Group | 1st Surface | Focal Length |
|---|---|---|
| 1 | 1 | −30.51 |
| 2 | 10 | 53.49 |
| 3 | 18 | −89.40 |
| 4 | 25 | 78.14 |

Numerical Embodiment 4

Figure 31:
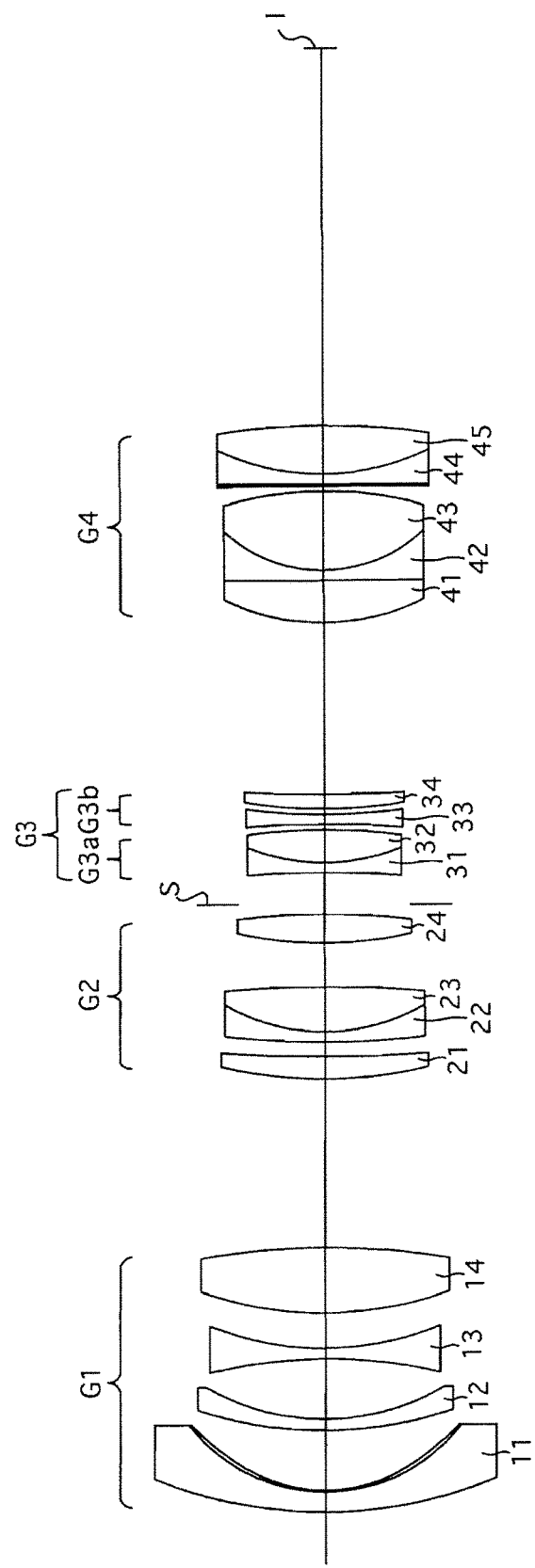
FIG. 31 shows a lens arrangement of a fourth numerical embodiment of a zoom lens system, according to the present invention, at the short focal length extremity when focused on an object at infinity.
Figure 38A:
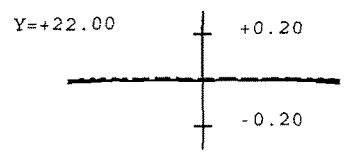
FIGS. 38A, 38B and 38C show lateral aberrations that occurred in the lens arrangement shown in FIG. 31 when the image-stabilizing lens group is decentered, at the short focal length extremity when focused on an object at infinity.
Figure 38B:
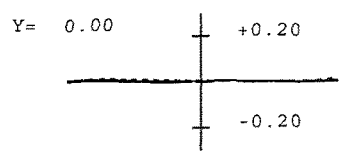
Figure 38C:
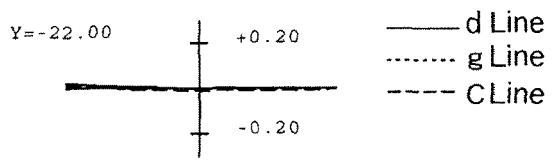
Figure 39A:
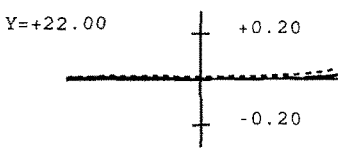
FIGS. 39A, 39B and 39C show lateral aberrations that occurred in the lens arrangement shown in FIG. 31 when the image-stabilizing lens group is decentered, at an intermediate focal length when focused on an object at infinity.
Figure 39B:
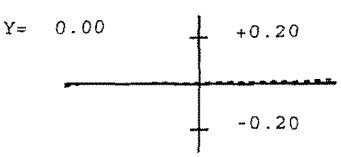
Figure 39C:
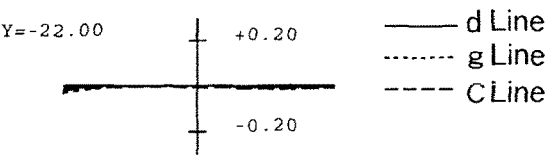
Figure 40A:
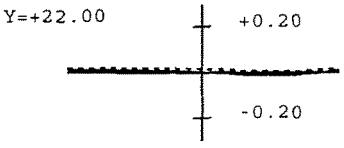
FIGS. 40A, 40B and 40C show lateral aberrations that occurred in the lens arrangement shown in FIG. 31 when the image-stabilizing lens group is decentered, at the long focal length extremity when focused on an object at infinity.
Figure 40B:
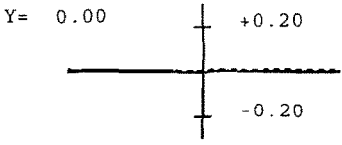
Figure 40C:
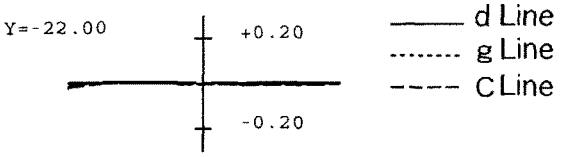
Figures 42A, 42B, 42C, 42D:
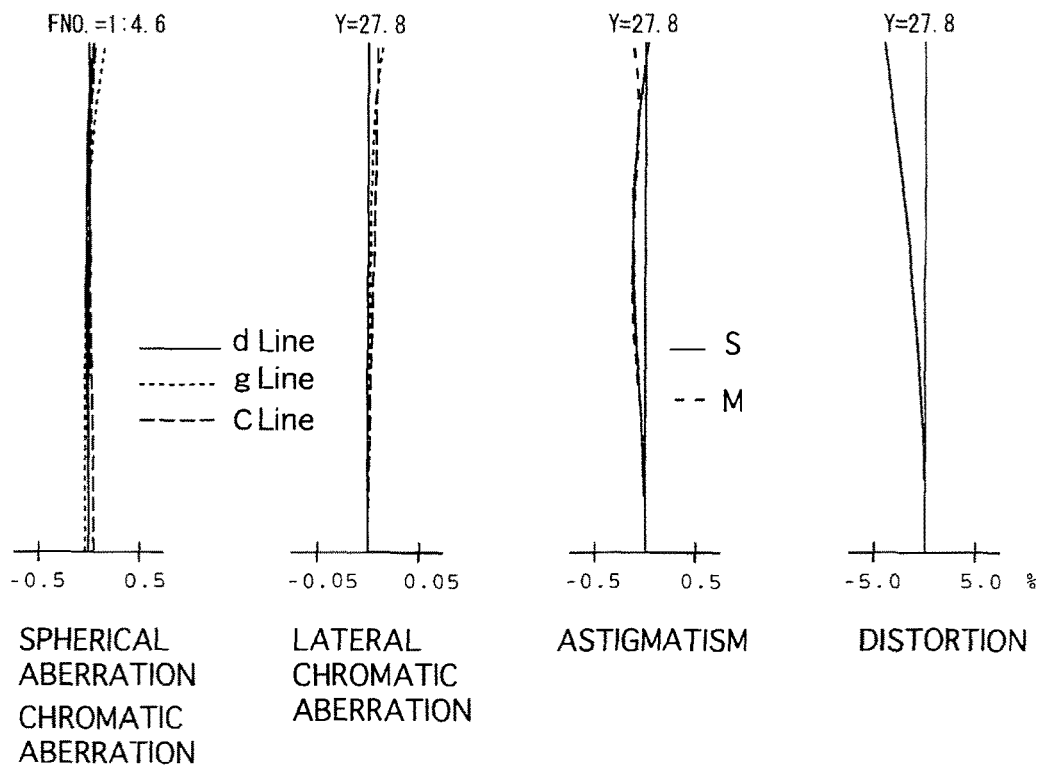
FIGS. 42A, 42B, 42C and 42D show various aberrations that occurred in the lens arrangement shown in FIG. 41, at the short focal length extremity when focused on an object at infinity.
Figure 43A:
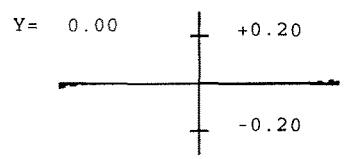
FIGS. 43A, 43B and 43C show lateral aberrations that occurred in the lens arrangement shown in FIG. 41, at the short focal length extremity when focused on an object at infinity.
Figure 43B:
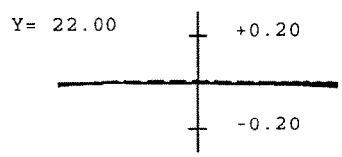
Figure 43C:
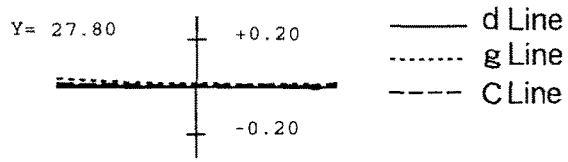
Figures 44A, 44B, 44C, 44D:
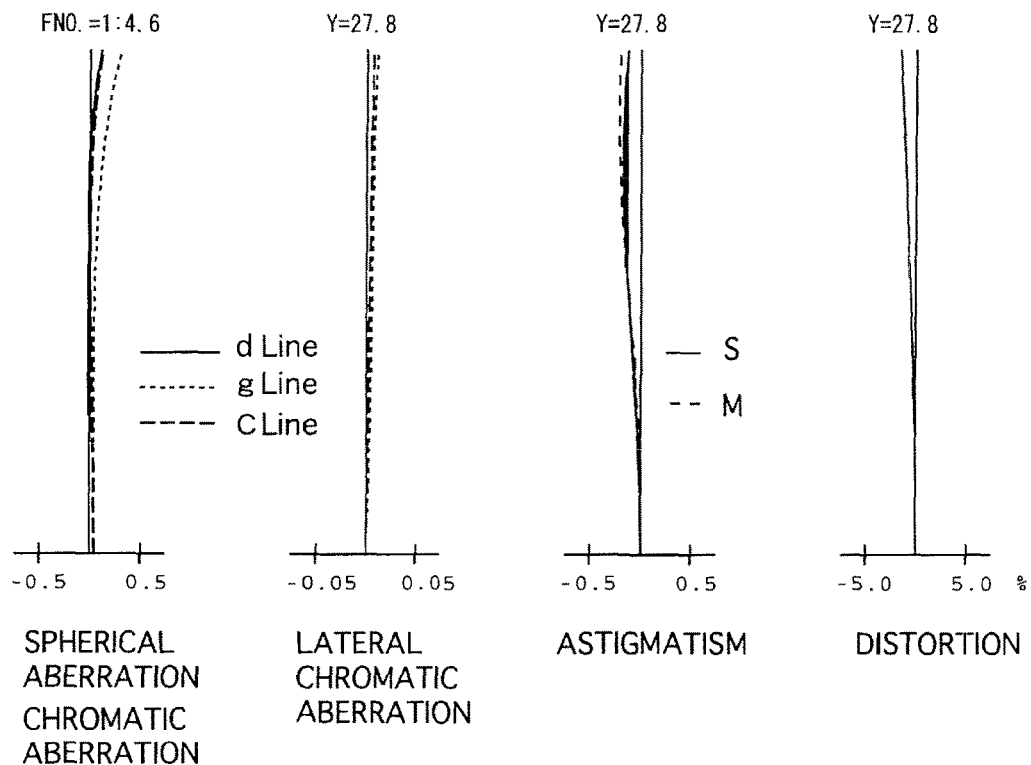
FIGS. 44A, 44B, 44C and 44D show various aberrations that occurred in the lens arrangement shown in FIG. 41, at an intermediate focal length when focused on an object at infinity.
Figure 45A:
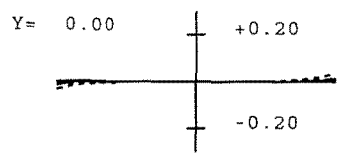
FIGS. 45A, 45B and 45C show lateral aberrations that occurred in the lens arrangement shown in FIG. 41, at an intermediate focal length when focused on an object at infinity.
Figure 45B:
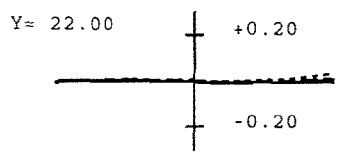
Figure 45C:
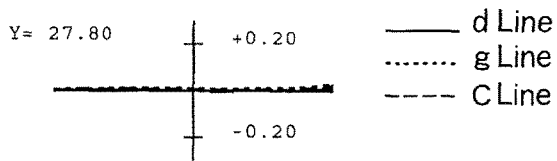
Figures 46A, 46B, 46C, 46D:
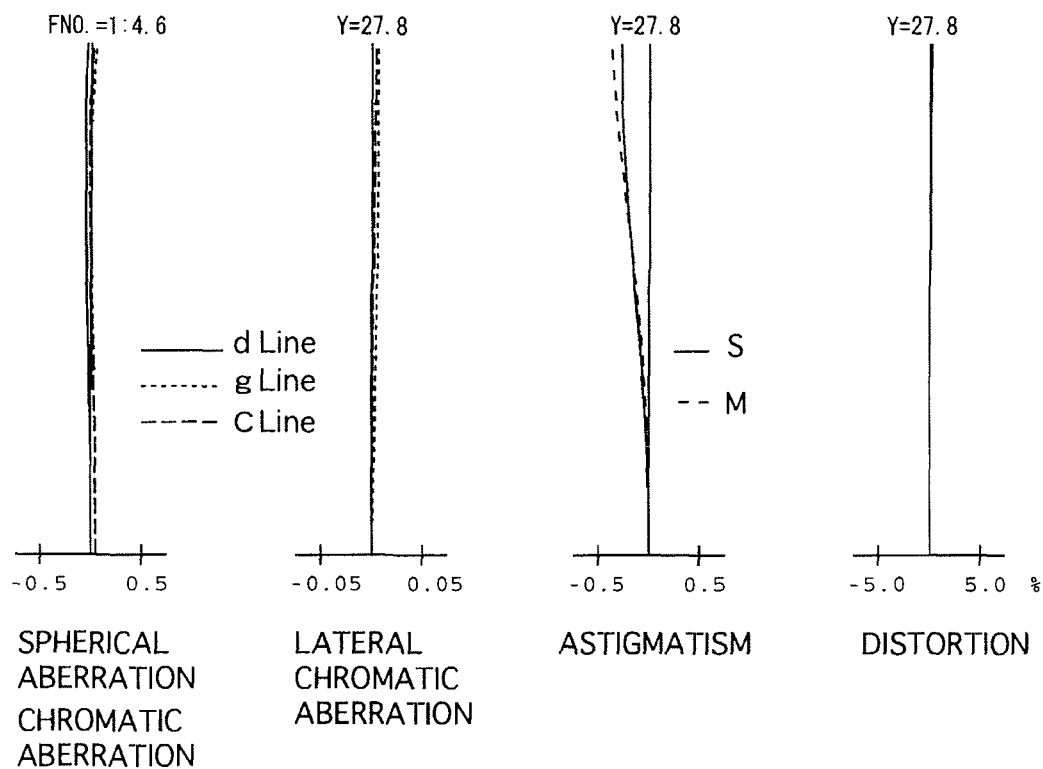
FIGS. 46A, 46B, 46C and 46D show various aberrations that occurred in the lens arrangement shown in FIG. 41, at the long focal length extremity when focused on an object at infinity.
Figure 47A:
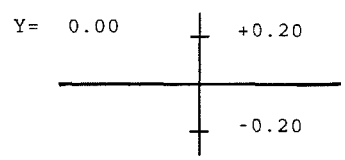
FIGS. 47A, 47B and 47C show lateral aberrations that occurred in the lens arrangement shown in FIG. 41, at the long focal length extremity when focused on an object at infinity.
Figure 47B:
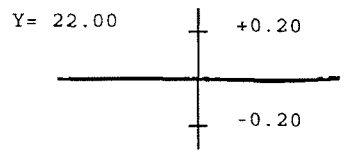
Figure 47C:
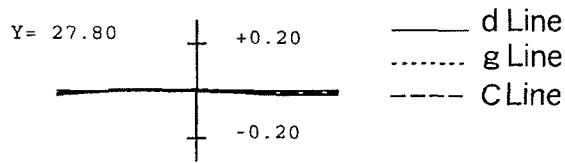
Figure 48A:
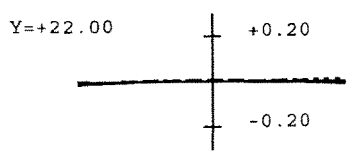
FIGS. 48A, 48B and 48C show lateral aberrations that occurred in the lens arrangement shown in FIG. 41 when the image-stabilizing lens group is decentered, at the short focal length extremity when focused on an object at infinity.
Figure 48B:
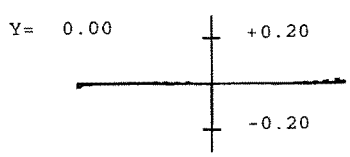
Figure 48C:
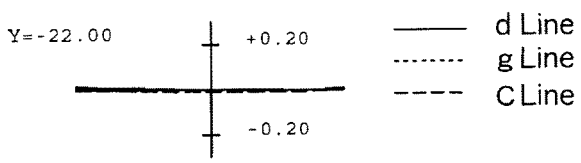
Figure 49A:
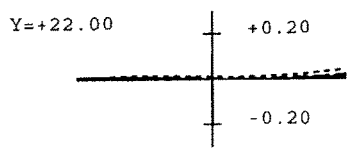
FIGS. 49A, 49B and 49C show lateral aberrations that occurred in the lens arrangement shown in FIG. 41 when the image-stabilizing lens group is decentered, at an intermediate focal length when focused on an object at infinity.
Figure 49B:
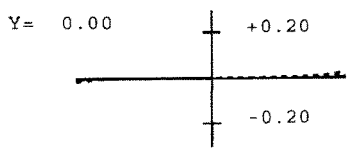
Figure 49C:
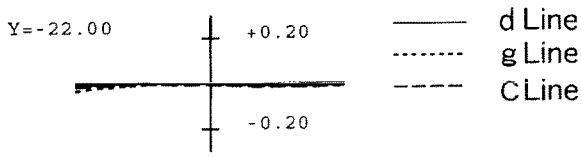

FIGS. 31 through 40C and Tables 16 through 20 show a fourth numerical embodiment of the zoom lens system according to the present invention. FIG. 31 shows a lens arrangement of the fourth numerical embodiment of the zoom lens system, at the short focal length extremity when focused on an object at infinity. FIGS. 32A, 32B, 32C and 32D show various aberrations that occurred in the lens arrangement shown in FIG. 31, at the short focal length extremity when focused on an object at infinity. FIGS. 33A, 33B and 33C show lateral aberrations that occurred in the lens arrangement shown in FIG. 31, at the short focal length extremity when focused on an object at infinity. FIGS. 34A, 34B, 34C and 34D show various aberrations that occurred in the lens arrangement shown in FIG. 31, at an intermediate focal length when focused on an object at infinity. FIGS. 35A, 35B and 35C show lateral aberrations that occurred in the lens arrangement shown in FIG. 31, at an intermediate focal length when focused on an object at infinity. FIGS. 36A, 36B, 36C and 36D show various aberrations that occurred in the lens arrangement shown in FIG. 31, at the long focal length extremity when focused on an object at infinity. FIGS. 37A, 37B and 37C show lateral aberrations that occurred in the lens arrangement shown in FIG. 31, at the long focal length extremity when focused on an object at infinity. FIGS. 38A, 38B and 38C show lateral aberrations that occurred in the lens arrangement shown in FIG. 31 when the image-stabilizing lens group is decentered (during an image-stabilizing drive operation), at the short focal length extremity when focused on an object at infinity. FIGS. 39A, 39B and 39C show lateral aberrations that occurred in the lens arrangement shown in FIG. 31 when the image-stabilizing lens group is decentered (during an image-stabilizing drive operation), at an intermediate focal length when focused on an object at infinity. FIGS. 40A, 40B and 40C show lateral aberrations that occurred in the lens arrangement shown in FIG. 31 when the image-stabilizing lens group is decentered (during an image-stabilizing drive operation), at the long focal length extremity when focused on an object at infinity. Table 16 shows the lens surface data, Table 17 shows the aspherical surface data, Table 18 shows various lens-system data, Table 19 shows image-stabilizing drive data, and Table 20 shows lens group data.

The fundamental lens arrangement of the fourth numerical embodiment is the same as that of the first numerical embodiment except for the following feature:

(1) In the fourth lens group G4, the positive lens element 41 is a planoconvex positive lens element having a convex surface on the object side, and the negative lens element 42 is a planoconcave lens element having a concave surface on the image side.

TABLE 16

LENS SURFACE DATA

| Surf. No. | R | d | N (d) | ν (d) |
|---|---|---|---|---|
| 1 | 67.231 | 3.000 | 1.81600 | 46.6 |
| 2 | 25.667 | 0.200 | 1.52972 | 42.7 |
| 3* | 21.526 | 9.050 | | |
| 4 | 61.714 | 1.650 | 1.72916 | 54.7 |
| 5 | 35.265 | 9.010 | | |
| 6 | −73.925 | 1.650 | 1.61800 | 63.4 |
| 7 | 45.555 | 5.350 | | |
| 8 | 55.892 | 9.670 | 1.61340 | 44.3 |
| 9 | −107.223 | d9 | | |
| 10 | 67.588 | 3.290 | 1.59270 | 35.3 |
| 11 | 210.129 | 2.180 | | |
| 12 | 133.613 | 1.500 | 1.80000 | 29.9 |
| 13 | 30.653 | 6.610 | 1.59551 | 39.2 |
| 14 | −170.797 | 6.487 | | |
| 15 | 60.717 | 4.200 | 1.43875 | 95.0 |
| 16 | −113.763 | 1.450 | | |
| 17 (Diaphragm) | ∞ | d17 | | |
| 18 | −153.492 | 1.500 | 1.81600 | 46.6 |
| 19 | 30.409 | 4.840 | 1.65412 | 39.7 |
| 20 | −85.686 | 0.830 | | |
| 21 | −146.449 | 1.500 | 1.83400 | 37.2 |
| 22 | 88.637 | 0.840 | | |
| 23 | 72.008 | 2.180 | 1.80518 | 25.4 |
| 24 | 218.003 | d24 | | |
| 25 | 33.784 | 6.300 | 1.76200 | 40.1 |
| 26 | ∞ | 1.500 | 1.83481 | 42.7 |
| 27 | 22.070 | 11.680 | 1.49700 | 81.6 |
| 28 | −54.280 | 0.750 | | |
| 29* | −4942.873 | 0.300 | 1.52972 | 42.7 |
| 30 | −4942.873 | 1.500 | 1.83400 | 37.2 |
| 31 | 37.317 | 7.170 | 1.48749 | 70.2 |
| 32 | −102.018 | — | | |

The asterisk (*) designates an aspherical surface which is rotationally symmetrical with respect to the optical axis.

TABLE 17

ASPHERICAL SURFACE DATA

| Surf. No. | K | A4 | A6 | A8 | A10 |
|---|---|---|---|---|---|
| 3 | −1.000 | 0.3705E−05 | −0.3363E−09 | 0.2667E−11 | −0.5605E−14 |
| 29 | 0.000 | −0.3038E−05 | 0.1496E−08 | −0.4796E−11 | 0.4379E−13 |

TABLE 18

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 39.0 | 32.4 |
| Y | 27.80 | 27.80 | 27.80 |
| fB | 67.86 | 76.60 | 87.13 |
| L | 229.34 | 223.75 | 222.47 |
| d9 | 25.017 | 15.078 | 7.178 |
| d17 | 4.760 | 9.110 | 15.727 |
| d24 | 25.512 | 16.772 | 6.242 |

TABLE 19

IMAGE-STABILIZING DRIVE DATA

| | Short Focal Length Extremity |
|---|---|
| Lens Movement Amount | 0.24 |
| Image Movement Amount | −0.15 |
| Correction Angle | 0.30 |
| | Intermediate Focal Length |
| Lens Movement Amount | 0.26 |
| Image Movement Amount | −0.18 |
| Correction Angle | 0.30 |
| | Long Focal Length Extremity |
| Lens Movement Amount | 0.30 |
| Image Movement Amount | −0.23 |
| Correction Angle | 0.30 |

TABLE 15

LENS GROUP DATA

| Lens Group | 1st Surface | Focal Length |
|---|---|---|
| 1 | 1 | −29.66 |
| 2 | 10 | 54.78 |
| 3 | 18 | −94.44 |
| 4 | 25 | 80.48 |

Numerical Embodiment 5

Figure 50A:
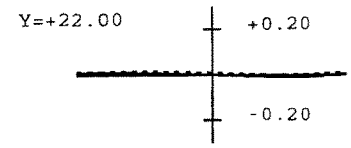
FIGS. 50A, 50B and 50C show lateral aberrations that occurred in the lens arrangement shown in FIG. 41 when the image-stabilizing lens group is decentered, at the long focal length extremity when focused on an object at infinity.
Figure 50B:
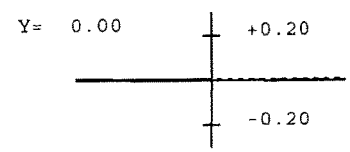
Figure 50C:
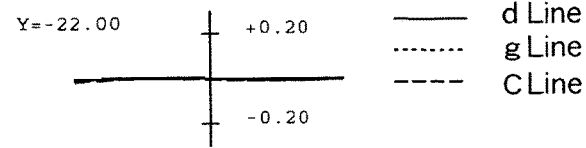

FIGS. 41 through 50C and Tables 21 through 25 show a fifth numerical embodiment of the zoom lens system according to the present invention. FIG. 41 shows a lens arrangement of the fifth numerical embodiment of the zoom lens system, at the short focal length extremity when focused on an object at infinity. FIGS. 42A, 42B, 42C and 42D show various aberrations that occurred in the lens arrangement shown in FIG. 41, at the short focal length extremity when focused on an object at infinity. FIGS. 43A, 43B and 43C show lateral aberrations that occurred in the lens arrangement shown in FIG. 41, at the short focal length extremity when focused on an object at infinity. FIGS. 44A, 44B, 44C and 44D show various aberrations that occurred in the lens arrangement shown in FIG. 41, at an intermediate focal length when focused on an object at infinity. FIGS. 45A, 45B and 45C show lateral aberrations that occurred in the lens arrangement shown in FIG. 41, at an intermediate focal length when focused on an object at infinity. FIGS. 46A, 46B, 46C and 46D show various aberrations that occurred in the lens arrangement shown in FIG. 41, at the long focal length extremity when focused on an object at infinity. FIGS. 47A, 47B and 47C show lateral aberrations that occurred in the lens arrangement shown in FIG. 41, at the long focal length extremity when focused on an object at infinity. FIGS. 48A, 48B and 48C show lateral aberrations that occurred in the lens arrangement shown in FIG. 41 when the image-stabilizing lens group is decentered (during an image-stabilizing drive operation), at the short focal length extremity when focused on an object at infinity. FIGS. 49A, 49B and 49C show lateral aberrations that occurred in the lens arrangement shown in FIG. 41 when the image-stabilizing lens group is decentered (during an image-stabilizing drive operation), at an intermediate focal length when focused on an object at infinity. FIGS. 50A, 50B and 50C show lateral aberrations that occurred in the lens arrangement shown in FIG. 41 when the image-stabilizing lens group is decentered (during an image-stabilizing drive operation), at the long focal length extremity when focused on an object at infinity. Table 21 shows the lens surface data, Table 22 shows the aspherical surface data, Table 23 shows various lens-system data, Table 24 shows image-stabilizing drive data, and Table 25 shows lens group data.

The fundamental lens arrangement of the fifth numerical embodiment is the same as that of the fourth numerical embodiment.

TABLE 21

LENS SURFACE DATA

| Surf. No. | R | d | N (d) | ν (d) |
|---|---|---|---|---|
| 1 | 69.640 | 2.050 | 1.77250 | 49.6 |
| 2 | 27.201 | 0.200 | 1.52972 | 42.7 |
| 3* | 23.035 | 9.700 | | |
| 4 | 66.845 | 1.950 | 1.72916 | 54.7 |
| 5 | 32.191 | 8.670 | | |
| 6 | −87.917 | 2.330 | 1.61800 | 63.4 |
| 7 | 46.539 | 5.240 | | |
| 8 | 53.814 | 8.950 | 1.61340 | 44.3 |
| 9 | −122.685 | d9 | | |
| 10 | 56.394 | 3.480 | 1.58144 | 40.7 |
| 11 | 177.940 | 2.360 | | |
| 12 | 140.867 | 1.500 | 1.80000 | 29.9 |
| 13 | 28.694 | 6.660 | 1.59551 | 39.2 |
| 14 | −173.644 | 6.545 | | |
| 15 | 72.548 | 3.820 | 1.49700 | 81.6 |
| 16 | −116.078 | 1.570 | | |
| 17 (Diaphragm) | ∞ | d17 | | |
| 18 | −84.818 | 1.500 | 1.81600 | 46.6 |
| 19 | 35.711 | 4.600 | 1.65412 | 39.7 |
| 20 | −67.461 | 0.960 | | |
| 21 | −159.881 | 1.500 | 1.83400 | 37.2 |

TABLE 21-continued

LENS SURFACE DATA

| Surf. No. | R | d | N (d) | ν (d) |
|---|---|---|---|---|
| 22 | 71.757 | 0.940 | | |
| 23 | 66.173 | 2.360 | 1.80518 | 25.4 |
| 24 | 387.509 | d24 | | |
| 25 | 34.203 | 5.600 | 1.80610 | 40.9 |
| 26 | ∞ | 1.530 | 1.83481 | 42.7 |
| 27 | 22.017 | 11.650 | 1.49700 | 81.6 |
| 28 | −55.216 | 1.210 | | |
| 29* | −3234.831 | 0.300 | 1.52972 | 42.7 |
| 30 | −3234.831 | 2.550 | 1.83400 | 37.2 |
| 31 | 34.948 | 7.350 | 1.48749 | 70.2 |
| 32 | −100.886 | — | | |

The asterisk (*) designates an aspherical surface which is rotationally symmetrical with respect to the optical axis.

TABLE 22

ASPHERICAL SURFACE DATA

| Surf. No. | K | A4 | A6 | A8 | A10 |
|---|---|---|---|---|---|
| 3 | −1.000 | 0.2965E−05 | −0.1833E−09 | 0.9625E−12 | −0.2739E−14 |
| 29 | 0.000 | −0.3186E−05 | 0.1201E−08 | −0.2848E−11 | 0.3902E−13 |

TABLE 23

VARIOUS LENS-SYSTEM DATA

Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.88 |
| W | 45.3 | 38.9 | 32.3 |
| Y | 27.80 | 27.80 | 27.80 |
| fB | 66.07 | 74.13 | 84.10 |
| L | 226.87 | 221.82 | 220.84 |
| d9 | 24.743 | 14.965 | 7.088 |
| d17 | 5.032 | 9.756 | 16.650 |
| d24 | 23.954 | 15.895 | 5.930 |

TABLE 24

IMAGE-STABILIZING DRIVE DATA

| | Short Focal Length Extremity |
|---|---|
| Lens Movement Amount | 0.27 |
| Image Movement Amount | −0.15 |
| Correction Angle | 0.30 |
| | Intermediate Focal Length |
| Lens Movement Amount | 0.31 |
| Image Movement Amount | −0.18 |
| Correction Angle | 0.30 |
| | Long Focal Length Extremity |
| Lens Movement Amount | 0.34 |
| Image Movement Amount | −0.23 |
| Correction Angle | 0.30 |

TABLE 25

LENS GROUP DATA

| Lens Group | 1st Surface | Focal Length |
|---|---|---|
| 1 | 1 | −30.04 |
| 2 | 10 | 54.15 |
| 3 | 18 | −91.26 |
| 4 | 25 | 78.60 |

Numerical Embodiment 6

Figure 51:
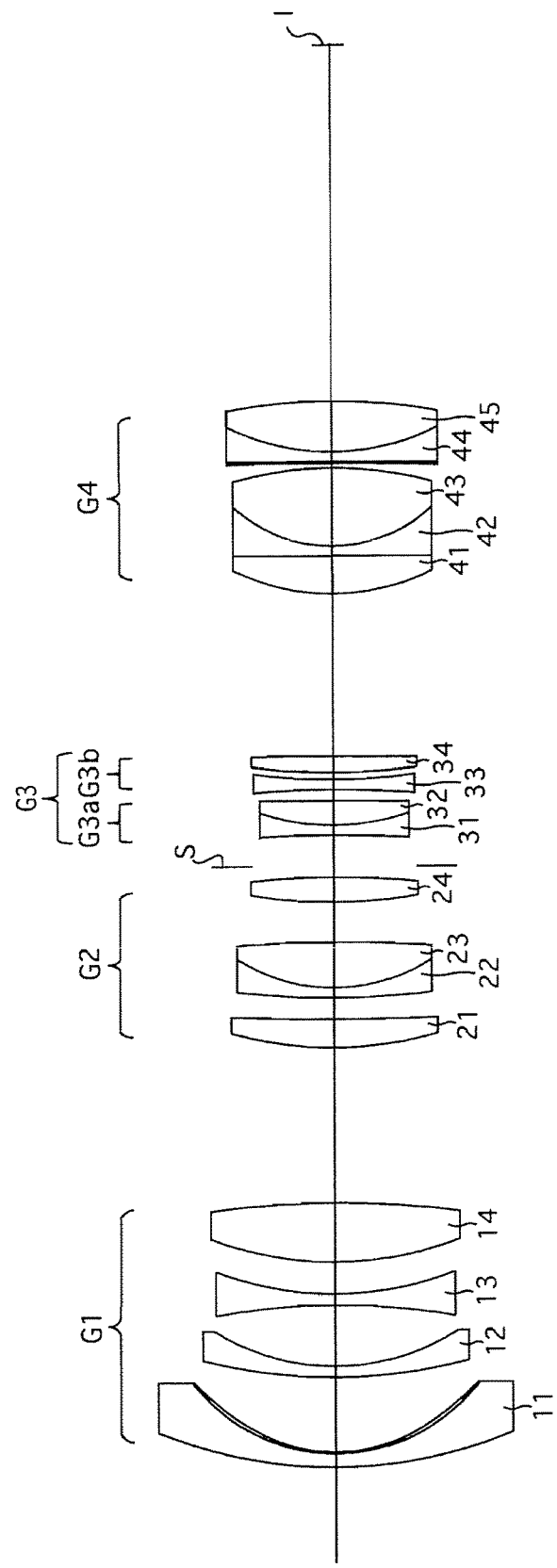
FIG. 51 shows a lens arrangement of a sixth numerical embodiment of a zoom lens system, according to the present invention, at the short focal length extremity when focused on an object at infinity.
Figures 52A, 52B, 52C, 52D:
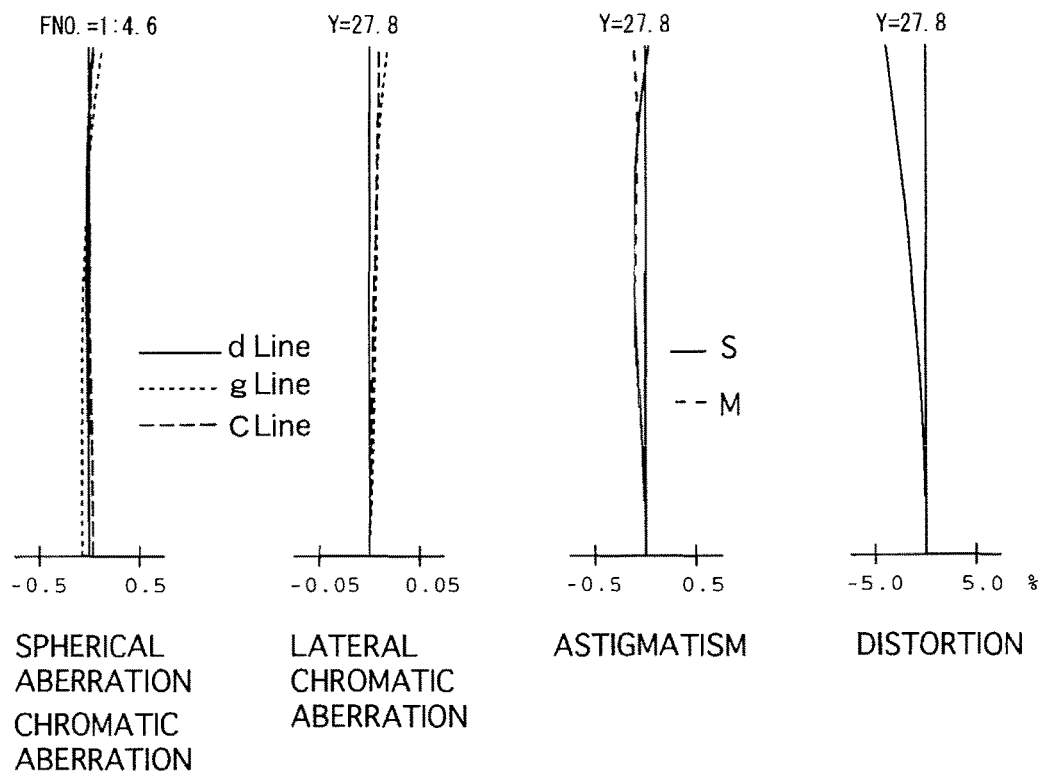
FIGS. 52A, 52B, 52C and 52D show various aberrations that occurred in the lens arrangement shown in FIG. 51, at the short focal length extremity when focused on an object at infinity.
Figure 53A:
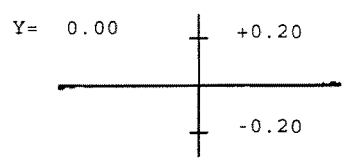
FIGS. 53A, 53B and 53C show lateral aberrations that occurred in the lens arrangement shown in FIG. 51, at the short focal length extremity when focused on an object at infinity.
Figure 53B:
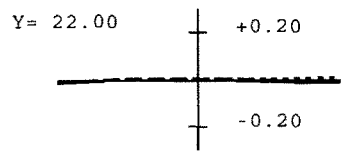
Figure 53C:
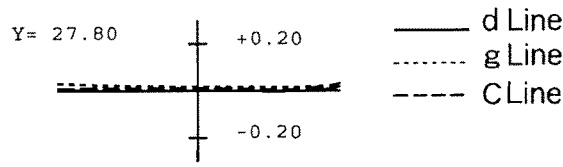
Figures 54A, 54B, 54C, 54D:
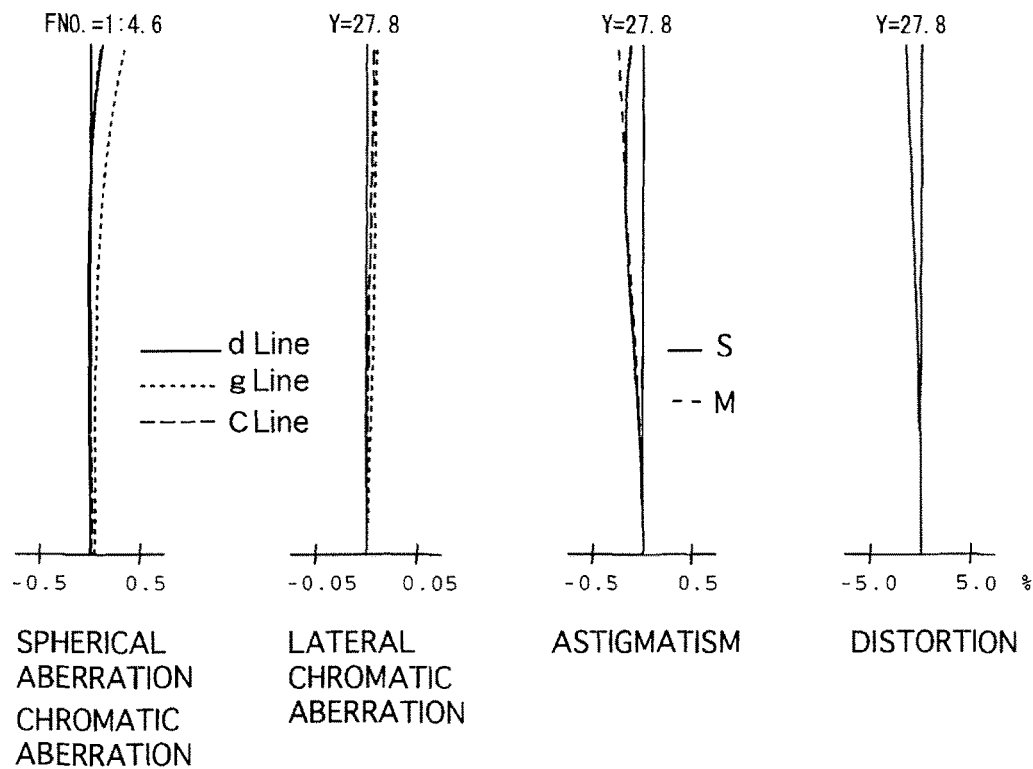
FIGS. 54A, 54B, 54C and 54D show various aberrations that occurred in the lens arrangement shown in FIG. 51, at an intermediate focal length when focused on an object at infinity.
Figure 55A:
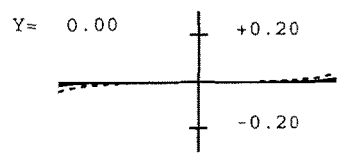
FIGS. 55A, 55B and 55C show lateral aberrations that occurred in the lens arrangement shown in FIG. 51, at an intermediate focal length when focused on an object at infinity.
Figure 55B:
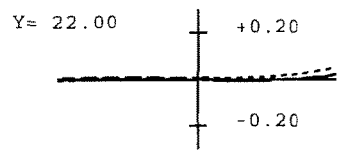
Figure 55C:
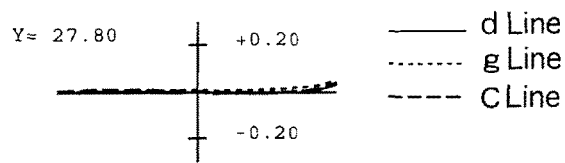
Figure 58A:
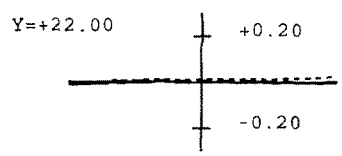
FIGS. 58A, 58B and 58C show lateral aberrations that occurred in the lens arrangement shown in FIG. 51 when the image-stabilizing lens group is decentered, at the short focal length extremity when focused on an object at infinity.
Figure 58B:
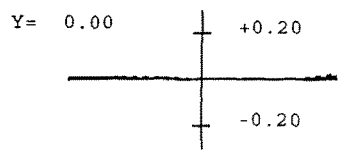
Figure 58C:
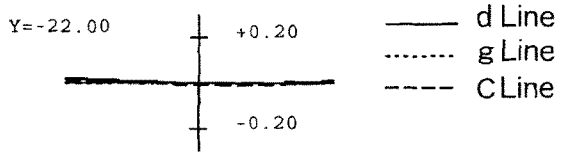
Figure 59A:
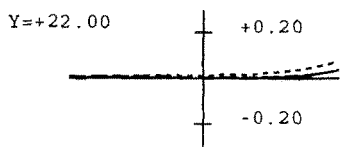
FIGS. 59A, 59B and 59C show lateral aberrations that occurred in the lens arrangement shown in FIG. 51 when the image-stabilizing lens group is decentered, at an intermediate focal length when focused on an object at infinity.
Figure 59B:
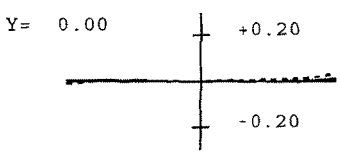
Figure 59C:
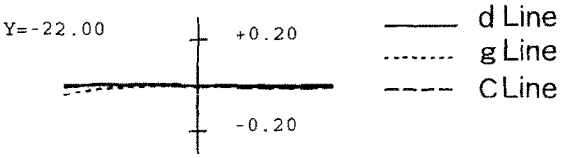
Figure 60A:
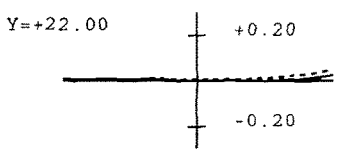
FIGS. 60A, 60B and 60C show lateral aberrations that occurred in the lens arrangement shown in FIG. 51 when the image-stabilizing lens group is decentered, at the long focal length extremity when focused on an object at infinity.
Figure 60B:
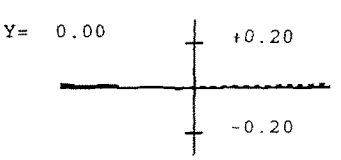
Figure 60C:
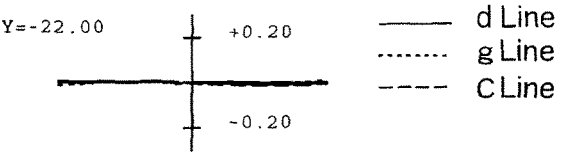

FIGS. 51 through 60C and Tables 26 through 30 show a sixth numerical embodiment of the zoom lens system according to the present invention. FIG. 51 shows a lens arrangement of the sixth numerical embodiment of the zoom lens system, at the short focal length extremity when focused on an object at infinity. FIGS. 52A, 52B, 52C and 52D show various aberrations that occurred in the lens arrangement shown in FIG. 51, at the short focal length extremity when focused on an object at infinity. FIGS. 53A, 53B and 53C show lateral aberrations that occurred in the lens arrangement shown in FIG. 51, at the short focal length extremity when focused on an object at infinity. FIGS. 54A, 54B, 54C and 54D show various aberrations that occurred in the lens arrangement shown in FIG. 51, at an intermediate focal length when focused on an object at infinity. FIGS. 55A, 55B and 55C show lateral aberrations that occurred in the lens arrangement shown in FIG. 51, at an intermediate focal length when focused on an object at infinity. FIGS. 56A, 56B, 56C and 56D show various aberrations that occurred in the lens arrangement shown in FIG. 51, at the long focal length extremity when focused on an object at infinity. FIGS. 57A, 57B and 57C show lateral aberrations that occurred in the lens arrangement shown in FIG. 51, at the long focal length extremity when focused on an object at infinity. FIGS. 58A, 58B and 58C show lateral aberrations that occurred in the lens arrangement shown in FIG. 51 when the image-stabilizing lens group is decentered (during an image-stabilizing drive operation), at the short focal length extremity when focused on an object at infinity. FIGS. 59A, 59B and 59C show lateral aberrations that occurred in the lens arrangement shown in FIG. 51 when the image-stabilizing lens group is decentered (during an image-stabilizing drive operation), at an intermediate focal length when focused on an object at infinity. FIGS. 60A, 60B and 60C show lateral aberrations that occurred in the lens arrangement shown in FIG. 51 when the image-stabilizing lens group is decentered (during an image-stabilizing drive operation), at the long focal length extremity when focused on an object at infinity. Table 26 shows the lens surface data, Table 27 shows the aspherical surface data, Table 28 shows various lens-system data, Table 29 shows image-stabilizing drive data, and Table 30 shows lens group data.

The fundamental lens arrangement of the sixth numerical embodiment is the same as that of the first numerical embodiment except for the following features:

(1) The positive single lens element (a positive single lens element having a convex surface on the object side) 34 of the second sub-lens group G3*b* is a biconvex positive lens element.

(2) In the fourth lens group G4, the positive lens element 41 is a planoconvex positive lens element having a convex surface on the object side, and the negative lens element 42 is a planoconcave negative lens element having a concave surface on the image side.

TABLE 26

LENS SURFACE DATA

| Surf. No. | R | d | N(d) | ν(d) |
|---|---|---|---|---|
| 1 | 69.709 | 2.050 | 1.81600 | 46.6 |
| 2 | 27.200 | 0.200 | 1.52972 | 42.7 |
| 3* | 23.155 | 11.240 | | |
| 4 | 80.081 | 1.650 | 1.72916 | 54.7 |
| 5 | 34.215 | 9.200 | | |
| 6 | −98.912 | 1.650 | 1.61800 | 63.4 |
| 7 | 50.268 | 4.760 | | |
| 8 | 53.858 | 8.750 | 1.61340 | 44.3 |
| 9 | −139.418 | d9 | | |
| 10 | 56.720 | 4.150 | 1.54814 | 45.8 |
| 11 | 416.325 | 3.230 | | |
| 12 | 125.462 | 1.500 | 1.80000 | 29.9 |
| 13 | 27.385 | 6.790 | 1.60342 | 38.0 |
| 14 | −198.527 | 5.968 | | |
| 15 | 77.525 | 3.680 | 1.49700 | 81.6 |
| 16 | −124.041 | 1.640 | | |
| 17 (Diaphragm) | ∞ | d17 | | |
| 18 | −184.268 | 1.500 | 1.83481 | 42.7 |
| 19 | 35.239 | 3.640 | 1.68893 | 31.1 |
| 20 | −726.166 | 1.670 | | |
| 21 | −140.451 | 1.500 | 1.73800 | 32.3 |
| 22 | 92.902 | 1.050 | | |
| 23 | 99.582 | 2.410 | 1.80518 | 25.4 |
| 24 | −571.932 | d24 | | |
| 25 | 33.853 | 5.620 | 1.79952 | 42.2 |
| 26 | ∞ | 1.500 | 1.83481 | 42.7 |
| 27 | 21.985 | 11.550 | 1.49700 | 81.6 |
| 28 | −56.304 | 0.750 | | |
| 29* | −1045.712 | 0.200 | 1.52972 | 42.7 |
| 30 | −1045.712 | 1.500 | 1.83400 | 37.2 |
| 31 | 35.798 | 7.540 | 1.48749 | 70.2 |
| 32 | −86.473 | — | | |

The asterisk (*) designates an aspherical surface which is rotationally symmetrical with respect to the optical axis.

TABLE 27

ASPHERICAL SURFACE DATA

| Surf. No. | K | A4 | A6 | A8 | A10 |
|---|---|---|---|---|---|
| 3 | −1.000 | 0.2945E−05 | 0.5941E−09 | −0.7814E−13 | −0.1062E−14 |
| 29 | 0.000 | −0.3313E−05 | 0.8377E−09 | 0.6548E−12 | 0.2894E−13 |

TABLE 28

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 38.9 | 32.3 |
| Y | 27.80 | 27.80 | 27.80 |
| fB | 65.85 | 74.18 | 84.16 |
| L | 224.65 | 219.91 | 219.49 |
| d9 | 23.113 | 13.673 | 6.142 |

TABLE 28-continued

VARIOUS LENS-SYSTEM DATA
Zoom Ratio: 1.53

| | Short Focal Length Extremity | Intermediate Focal Length | Long Focal Length Extremity |
|---|---|---|---|
| d17 | 4.670 | 9.374 | 16.484 |
| d24 | 24.124 | 15.796 | 5.820 |

TABLE 29

IMAGE-STABILIZING DRIVE DATA

| | Short Focal Length Extremity |
|---|---|
| Lens Movement Amount | 0.52 |
| Image Movement Amount | −0.15 |
| Correction Angle | 0.30 |
| | Intermediate Focal Length |
| Lens Movement Amount | 0.59 |
| Image Movement Amount | −0.18 |
| Correction Angle | 0.30 |
| | Long Focal Length Extremity |
| Lens Movement Amount | 0.66 |
| Image Movement Amount | −0.23 |
| Correction Angle | 0.30 |

TABLE 30

LENS GROUP DATA

| Lens Group | 1$^{st}$ Surface | Focal Length |
|---|---|---|
| 1 | 1 | −28.94 |
| 2 | 10 | 52.51 |
| 3 | 18 | −88.53 |
| 4 | 25 | 77.64 |

Numerical Embodiment 7

Figure 61:
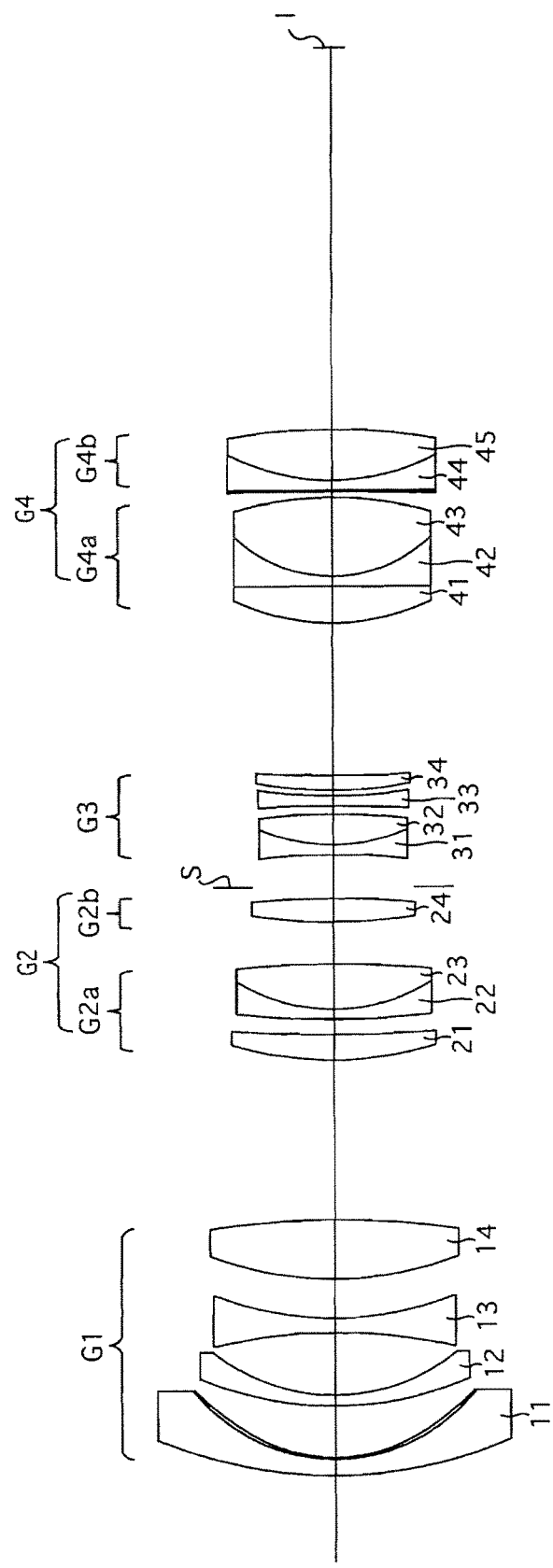
FIG. 61 shows a lens arrangement of a seventh numerical embodiment of a zoom lens system, according to the present invention, at the short focal length extremity when focused on an object at infinity.
Figures 62A, 62B, 62C, 62D:
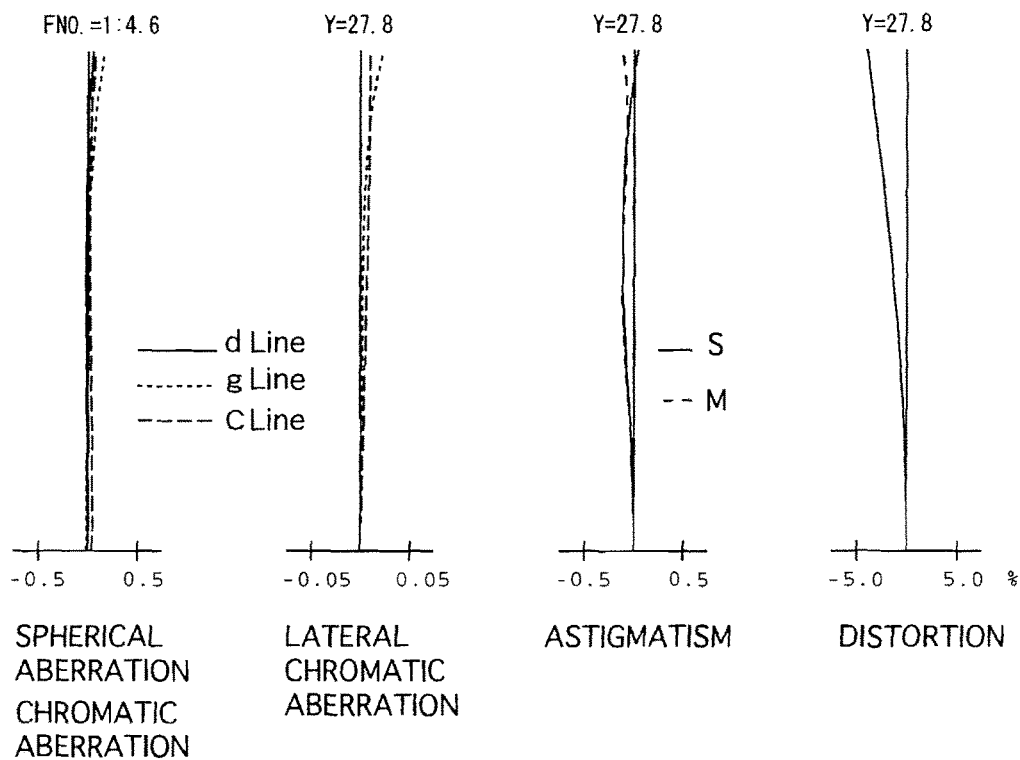
FIGS. 62A, 62B, 62C and 62D show various aberrations that occurred in the lens arrangement shown in FIG. 61, at the short focal length extremity when focused on an object at infinity.
Figure 63A:
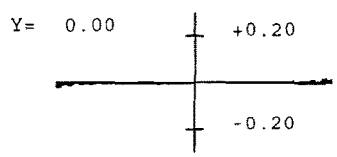
FIGS. 63A, 63B and 63C show lateral aberrations that occurred in the lens arrangement shown in FIG. 61, at the short focal length extremity when focused on an object at infinity.
Figure 63B:
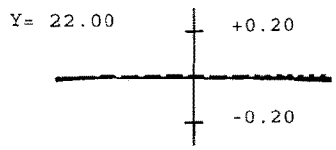
Figure 63C:
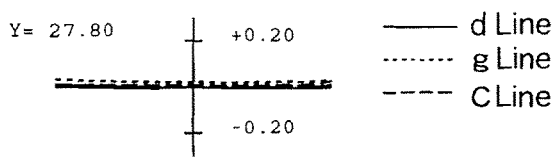
Figures 64A, 64B, 64C, 64D:
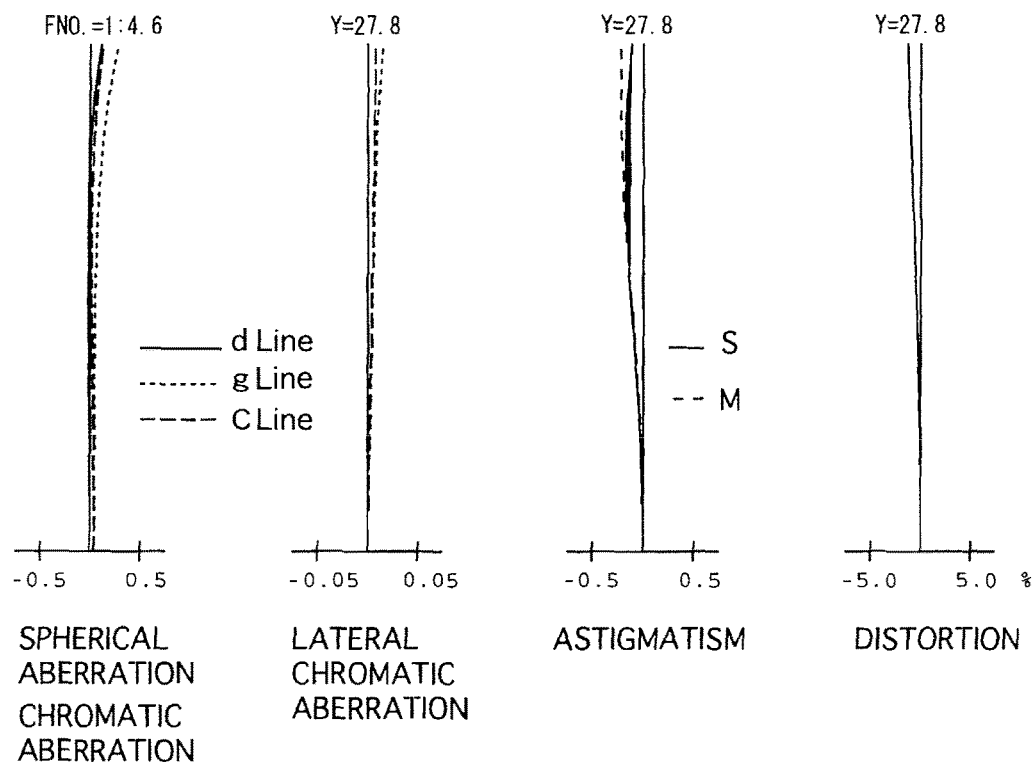
FIGS. 64A, 64B, 64C and 64D show various aberrations that occurred in the lens arrangement shown in FIG. 61, at an intermediate focal length when focused on an object at infinity.
Figure 65A:
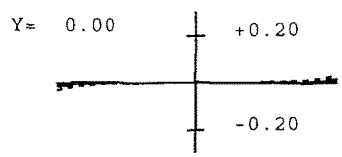
FIGS. 65A, 65B and 65C show lateral aberrations that occurred in the lens arrangement shown in FIG. 61, at an intermediate focal length when focused on an object at infinity.
Figure 65B:
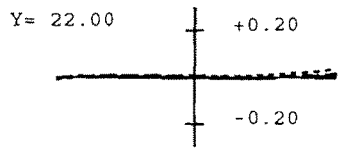
Figure 65C:
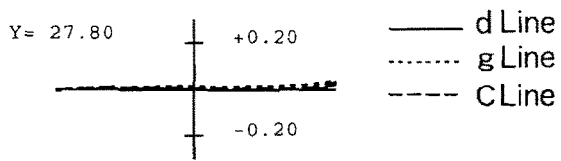

FIGS. 61 through 67C and Tables 31 through 34 show a seventh numerical embodiment of the zoom lens system according to the present invention. FIG. 61 shows a lens arrangement of the seventh numerical embodiment of the zoom lens system, at the short focal length extremity when focused on an object at infinity. FIGS. 62A, 62B, 62C and 62D show various aberrations that occurred in the lens arrangement shown in FIG. 61, at the short focal length extremity when focused on an object at infinity. FIGS. 63A, 63B and 63C show lateral aberrations that occurred in the lens arrangement shown in FIG. 61, at the short focal length extremity when focused on an object at infinity. FIGS. 64A, 64B, 64C and 64D show various aberrations that occurred in the lens arrangement shown in FIG. 61, at an intermediate focal length when focused on an object at infinity. FIGS. 65A, 65B and 65C show lateral aberrations that occurred in the lens arrangement shown in FIG. 61, at an intermediate focal length when focused on an object at infinity. FIGS. 66A, 66B, 66C and 66D show various aberrations that occurred in the lens arrangement shown in FIG. 61, at the long focal length extremity when focused on an object at infinity. FIGS. 67A, 67B and 67C show lateral aberrations that occurred in the lens arrangement shown in FIG. 61, at the long focal length extremity when focused on an object at infinity. Table 31 shows the lens surface data, Table 32 shows the aspherical surface data, Table 33 shows various lens-system data, and Table 34 shows lens group data.

The zoom lens system of the seventh numerical embodiment is configured of a negative first lens group G1, a positive second lens group G2, a negative third lens group G3, and a positive fourth lens group G4, in that order from the object side. A diaphragm S is provided in between the second lens group G2 and the third lens group G3. The diaphragm S moves integrally with the second lens group G2.

The first lens group G1 is configured of a negative meniscus lens element 11 having a convex surface on the object side (a negative lens element having a convex surface on the object side), a negative meniscus lens element 12 having a convex surface on the object side (a negative lens element having a convex surface on the object side), a biconcave negative lens element 13 and a biconvex positive lens element (a positive lens element having a convex surface on the object side) 14, in that order from the object side. The negative meniscus lens element 11 is a hybrid lens formed by a glass lens element with an aspherical surface layer, formed from a synthetic resin material, adhered onto the image side thereof.

The second lens group G2 is configured of a positive first sub-lens group G2a and a positive second sub-lens group G2b, in that order from the object side. The first sub-lens group G2a is a focusing lens group which moves in the optical axis direction (toward the image side) during a focusing operation.

The first sub-lens group G2a is configured of a positive meniscus lens element (positive lens element having a convex surface on the object side) 21 having a convex surface on the object side, and a cemented lens provided with a negative meniscus lens element 22 having a convex surface on the object side (a negative lens element having a convex surface on the object side), and a biconvex positive lens element 23, in that order from the object side.

The second sub-lens group G2b is configured of a biconvex positive lens element 24.

The third lens group G3 is configured of a cemented lens provided with a biconcave negative lens element 31 and a biconvex positive lens element 32; a biconcave negative lens element 33 and a positive meniscus lens element 34 having a convex surface on the object side, in that order from the object side.

The fourth lens group G4 is configured of a positive third sub-lens group G4a and a negative fourth sub-lens group G4b, in that order from the object side.

The third sub-lens group G4a is configured of a cemented lens provided with a biconvex positive lens element (a positive lens element having a convex surface on the object side) 41, a biconcave negative lens element 42 and a biconvex positive lens element 43, in that order from the object side.

The fourth sub-lens group G4b is configured of a cemented lens having a biconcave negative lens element 44 and a biconvex positive lens element 45, in that order from the object side. The biconcave negative lens element 44 is a hybrid lens formed by a glass lens element with an aspherical surface layer, formed from a synthetic resin material, adhered onto the object side thereof.

TABLE 31

LENS SURFACE DATA

| Surf. No. | R | d | N(d) | ν(d) |
|---|---|---|---|---|
| 1 | 67.727 | 2.450 | 1.77250 | 49.6 |
| 2 | 27.200 | 0.220 | 1.52972 | 42.7 |
| 3* | 23.089 | 7.830 | | |
| 4 | 51.924 | 1.650 | 1.78800 | 47.4 |
| 5 | 29.458 | 9.410 | | |
| 6 | −81.490 | 2.200 | 1.60300 | 65.5 |
| 7 | 48.108 | 5.890 | | |
| 8 | 53.263 | 8.830 | 1.56732 | 42.8 |
| 9 | −124.700 | d9 | | |
| 10 | 53.667 | 3.820 | 1.56732 | 42.8 |
| 11 | 233.446 | 2.180 | | |
| 12 | 136.379 | 1.500 | 1.80000 | 29.9 |
| 13 | 28.377 | 6.770 | 1.58144 | 40.7 |
| 14 | −144.954 | 6.288 | | |
| 15 | 80.815 | 3.550 | 1.49700 | 81.6 |
| 16 | −129.303 | 1.680 | | |
| 17 (Diaphragm) | ∞ | d17 | | |
| 18 | −105.215 | 1.500 | 1.83481 | 42.7 |
| 19 | 29.032 | 4.520 | 1.72047 | 34.7 |
| 20 | −104.092 | 1.270 | | |
| 21 | −185.193 | 1.500 | 1.83400 | 37.2 |
| 22 | 79.688 | 0.830 | | |
| 23 | 65.796 | 2.170 | 1.80518 | 25.4 |
| 24 | 191.711 | d24 | | |
| 25 | 35.493 | 5.480 | 1.83400 | 37.2 |
| 26 | −5000.000 | 1.500 | 1.80440 | 39.6 |
| 27 | 21.950 | 11.710 | 1.49700 | 81.6 |
| 28 | −55.545 | 0.860 | | |
| 29* | −3241.954 | 0.200 | 1.52972 | 42.7 |
| 30 | −3241.954 | 1.500 | 1.83400 | 37.2 |
| 31 | 34.353 | 7.590 | 1.48749 | 70.2 |
| 32 | −95.291 | — | | |

The asterisk (*) designates an aspherical surface which is rotationally symmetrical with respect to the optical axis.

TABLE 32

ASPHERICAL SURFACE DATA

| Surf. No. | K | A4 | A6 | A8 | A10 |
|---|---|---|---|---|---|
| 3 | −1.000 | 0.2782E−05 | −0.1128E−09 | 0.2056E−12 | −0.1990E−14 |
| 29 | 0.000 | −0.3454E−05 | 0.9235E−09 | −0.1297E−11 | 0.3435E−13 |

TABLE 33

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |

TABLE 33-continued

VARIOUS LENS-SYSTEM DATA
Zoom Ratio: 1.53

|     | Short Focal Length Extremity | Intermediate Focal Length | Long Focal Length Extremity |
|-----|---|---|---|
| W   | 45.2   | 38.8   | 32.2   |
| Y   | 27.80  | 27.80  | 27.80  |
| fB  | 65.91  | 73.50  | 82.88  |
| L   | 222.37 | 218.13 | 217.99 |
| d9  | 23.915 | 14.684 | 7.308  |
| d17 | 4.860  | 9.856  | 17.084 |
| d24 | 22.782 | 15.198 | 5.820  |

TABLE 34

LENS GROUP DATA

| Lens Group | 1st Surface | Focal Length |
|---|---|---|
| 1 | 1  | -30.12 |
| 2 | 10 | 53.78  |
| 3 | 18 | -84.25 |
| 4 | 25 | 72.81  |

Numerical Embodiment 8

Figure 68:
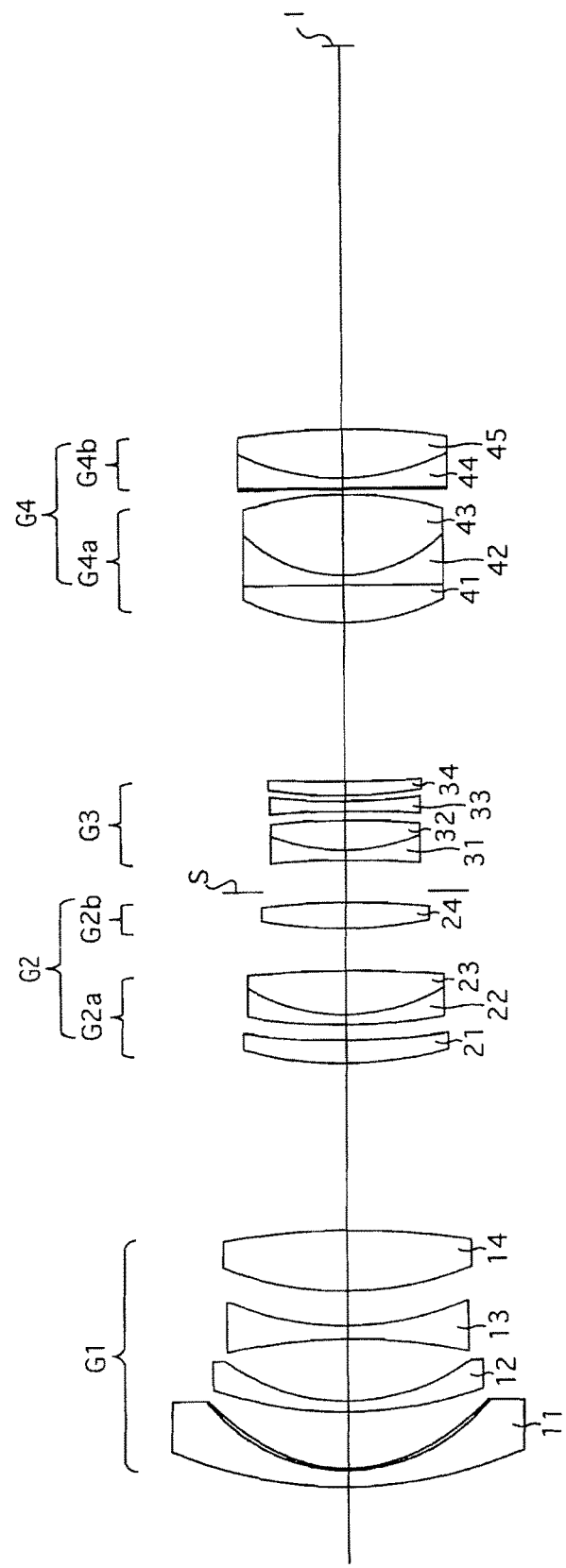
FIG. 68 shows a lens arrangement of an eighth numerical embodiment of a zoom lens system, according to the present invention, at the short focal length extremity when focused on an object at infinity.
Figures 71A, 71B, 71C, 71D:
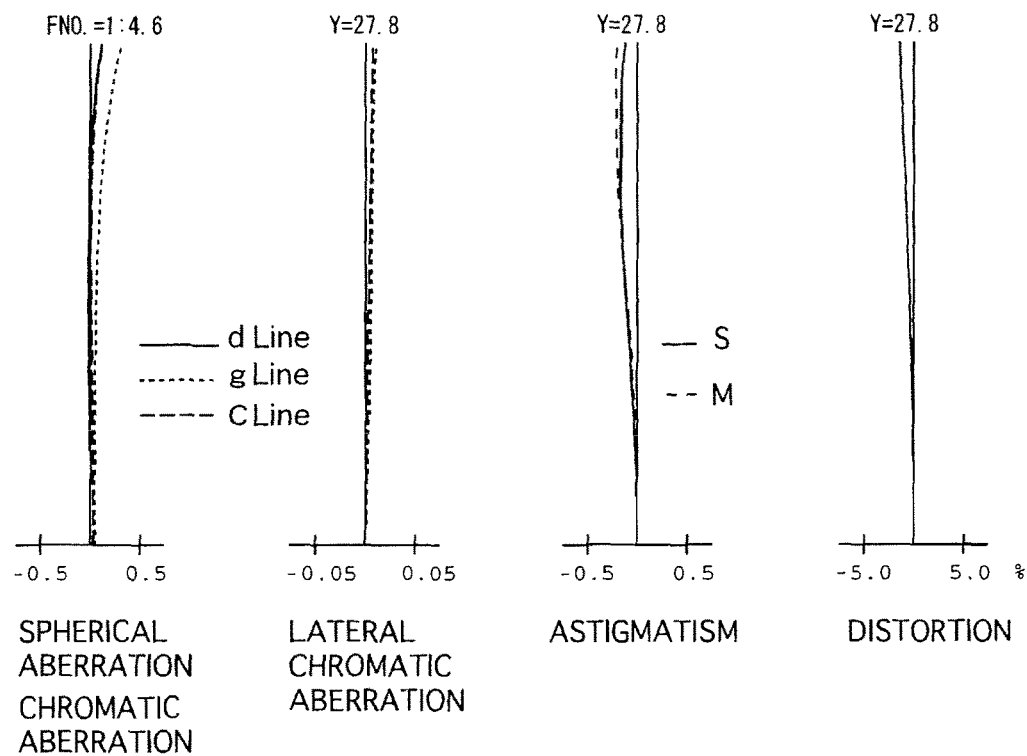
FIGS. 71A, 71B, 71C and 71D show various aberrations that occurred in the lens arrangement shown in FIG. 68, at an intermediate focal length when focused on an object at infinity.
Figure 72A:
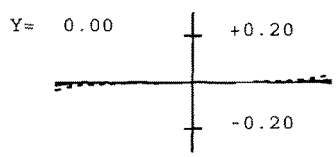
FIGS. 72A, 72B and 72C show lateral aberrations that occurred in the lens arrangement shown in FIG. 68, at an intermediate focal length when focused on an object at infinity.
Figure 72B:
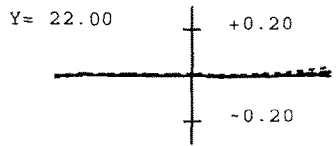
Figure 72C:
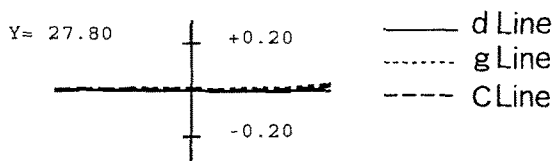
Figures 73A, 73B, 73C, 73D:
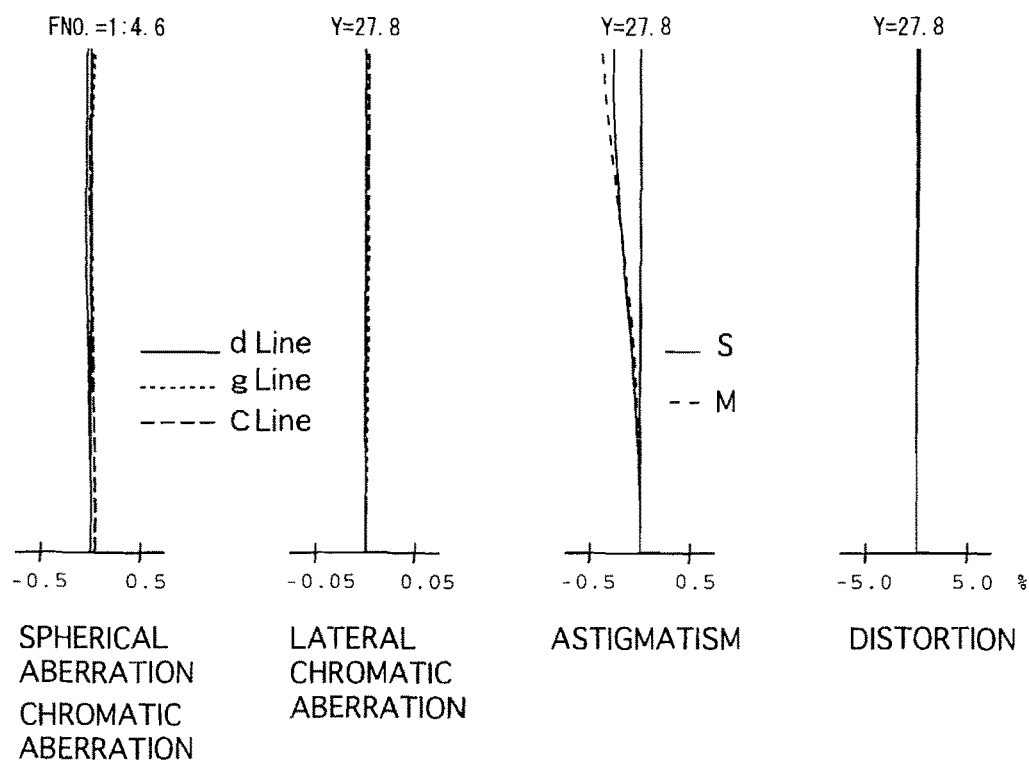
FIGS. 73A, 73B, 73C and 73D show various aberrations that occurred in the lens arrangement shown in FIG. 68, at the long focal length extremity when focused on an object at infinity.
Figure 74A:
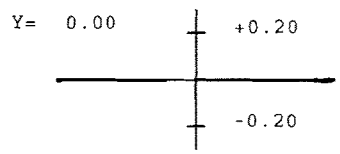
FIGS. 74A, 74B and 74C show lateral aberrations that occurred in the lens arrangement shown in FIG. 68, at the long focal length extremity when focused on an object at infinity.
Figure 74B:
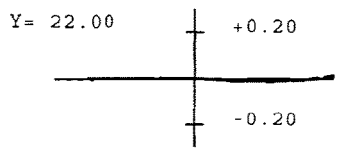
Figure 74C:
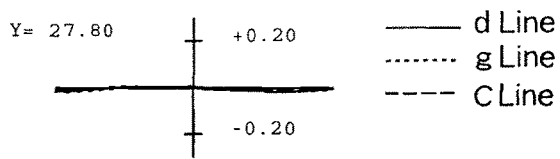

FIGS. 68 through 74C and Tables 35 through 38 show an eighth numerical embodiment of the zoom lens system according to the present invention. FIG. 68 shows a lens arrangement of the eighth numerical embodiment of the zoom lens system, at the short focal length extremity when focused on an object at infinity. FIGS. 69A, 69B, 69C and 69D show various aberrations that occurred in the lens arrangement shown in FIG. 68, at the short focal length extremity when focused on an object at infinity. FIGS. 70A, 70B and 70C show lateral aberrations that occurred in the lens arrangement shown in FIG. 68, at the short focal length extremity when focused on an object at infinity. FIGS. 71A, 71B, 71C and 71D show various aberrations that occurred in the lens arrangement shown in FIG. 68, at an intermediate focal length when focused on an object at infinity. FIGS. 72A, 72B and 72C show lateral aberrations that occurred in the lens arrangement shown in FIG. 68, at an intermediate focal length when focused on an object at infinity. FIGS. 73A, 73B, 73C and 73D show various aberrations that occurred in the lens arrangement shown in FIG. 68, at the long focal length extremity when focused on an object at infinity. FIGS. 74A, 74B and 74C show lateral aberrations that occurred in the lens arrangement shown in FIG. 68, at the long focal length extremity when focused on an object at infinity. Table 35 shows the lens surface data, Table 36 shows the aspherical surface data, Table 37 shows various lens-system data, and Table 38 shows lens group data.

The fundamental lens arrangement of the eighth numerical embodiment is the same as that of the seventh numerical embodiment.

TABLE 35

LENS SURFACE DATA

| Surf. No. | R | d | N(d) | ν(d) |
|---|---|---|---|---|
| 1  | 67.355    | 2.500  | 1.81600 | 46.6 |
| 2  | 27.200    | 0.280  | 1.52972 | 42.7 |
| 3* | 23.051    | 8.470  |         |      |
| 4  | 62.399    | 1.650  | 1.67790 | 55.3 |
| 5  | 31.542    | 9.360  |         |      |
| 6  | -84.472   | 2.000  | 1.61800 | 63.4 |
| 7  | 45.529    | 5.190  |         |      |
| 8  | 52.133    | 9.020  | 1.56732 | 42.8 |
| 9  | -114.250  | d9     |         |      |
| 10 | 60.175    | 3.410  | 1.72047 | 34.7 |
| 11 | 117.772   | 2.270  |         |      |
| 12 | 93.013    | 1.500  | 1.80000 | 29.9 |
| 13 | 29.802    | 6.540  | 1.54814 | 45.8 |
| 14 | -171.675  | 6.333  |         |      |
| 15 | 70.653    | 3.890  | 1.48749 | 70.2 |
| 16 | -113.044  | 1.550  |         |      |
| 17 (Diaphragm) | ∞ | d17 |     |      |
| 18 | -135.180  | 1.500  | 1.83400 | 37.2 |
| 19 | 30.999    | 4.430  | 1.69895 | 30.1 |
| 20 | -111.532  | 1.350  |         |      |
| 21 | -161.160  | 1.500  | 1.83400 | 37.2 |
| 22 | 105.416   | 0.850  |         |      |
| 23 | 81.455    | 2.050  | 1.80518 | 25.4 |
| 24 | 225.817   | d24    |         |      |
| 25 | 34.900    | 5.590  | 1.69680 | 55.5 |
| 26 | -3000.000 | 1.500  | 1.75500 | 52.3 |
| 27 | 21.950    | 11.980 | 1.49700 | 81.6 |
| 28 | -52.568   | 0.750  |         |      |
| 29*| -4804.554 | 0.200  | 1.52972 | 42.7 |
| 30 | -4804.554 | 1.500  | 1.83400 | 37.2 |
| 31 | 36.559    | 7.270  | 1.48749 | 70.2 |
| 32 | -105.169  | —      |         |      |

The asterisk (*) designates an aspherical surface which is rotationally symmetrical with respect to the optical axis.

TABLE 36

ASPHERICAL SURFACE DATA

| Surf. No. | K | A4 | A6 | A8 | A10 |
|---|---|---|---|---|---|
| 3  | -1.000 | 0.2577E-05  | -0.4243E-09 | 0.7278E-12  | -0.2727E-14 |
| 29 | 0.000  | -0.3493E-05 | 0.1287E-08  | -0.4405E-11 | 0.4233E-13  |

TABLE 37

VARIOUS LENS-SYSTEM DATA
Zoom Ratio: 1.53

|     | Short Focal Length Extremity | Intermediate Focal Length | Long Focal Length Extremity |
|-----|---|---|---|
| FNO.| 4.6    | 4.6    | 4.6    |
| f   | 28.70  | 35.00  | 43.87  |
| W   | 45.3   | 38.9   | 32.3   |
| Y   | 27.80  | 27.80  | 27.80  |
| fB  | 66.85  | 74.86  | 84.74  |
| L   | 224.70 | 220.21 | 219.82 |
| d9  | 24.943 | 15.416 | 7.739  |
| d17 | 4.760  | 9.800  | 17.090 |
| d24 | 23.709 | 15.706 | 5.820  |

TABLE 38

LENS GROUP DATA

| Lens Group | 1st Surface | Focal Length |
|---|---|---|
| 1 | 1 | −29.38 |
| 2 | 10 | 53.37 |
| 3 | 18 | −90.51 |
| 4 | 25 | 77.86 |

Numerical Embodiment 9

Figure 75:
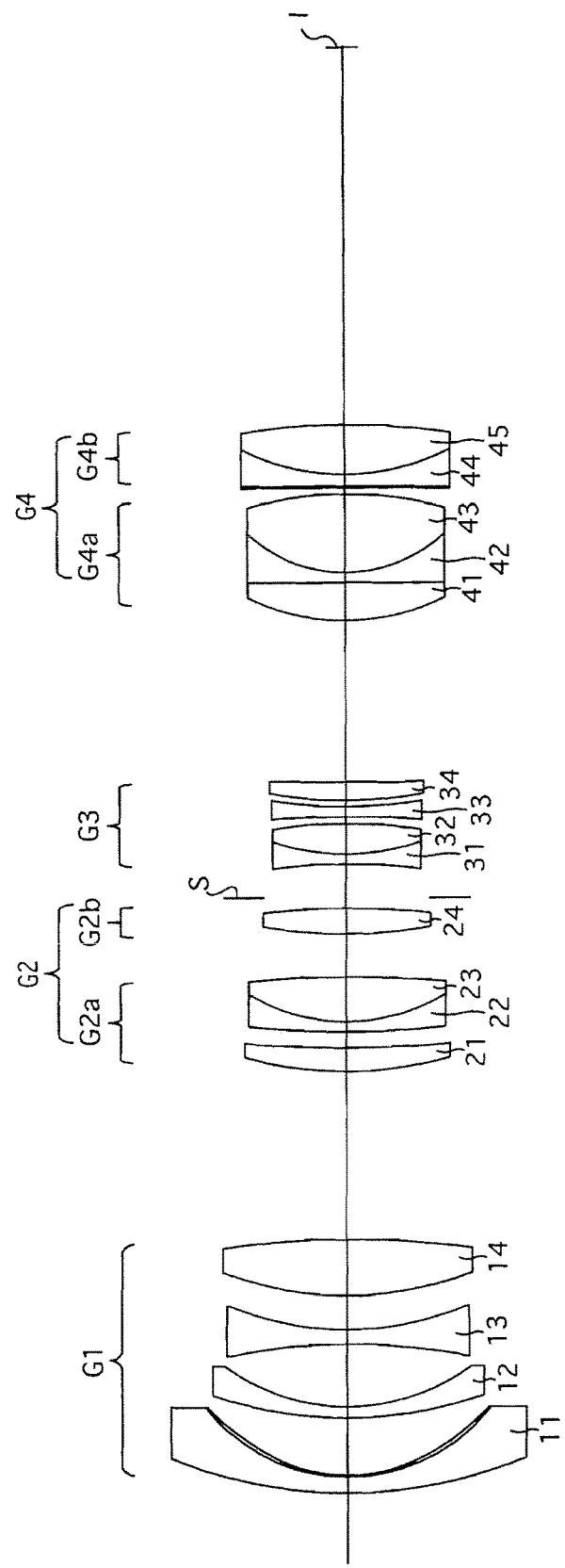
FIG. 75 shows a lens arrangement of a ninth numerical embodiment of a zoom lens system, according to the present invention, at the short focal length extremity when focused on an object at infinity.
Figures 78A, 78B, 78C, 78D:
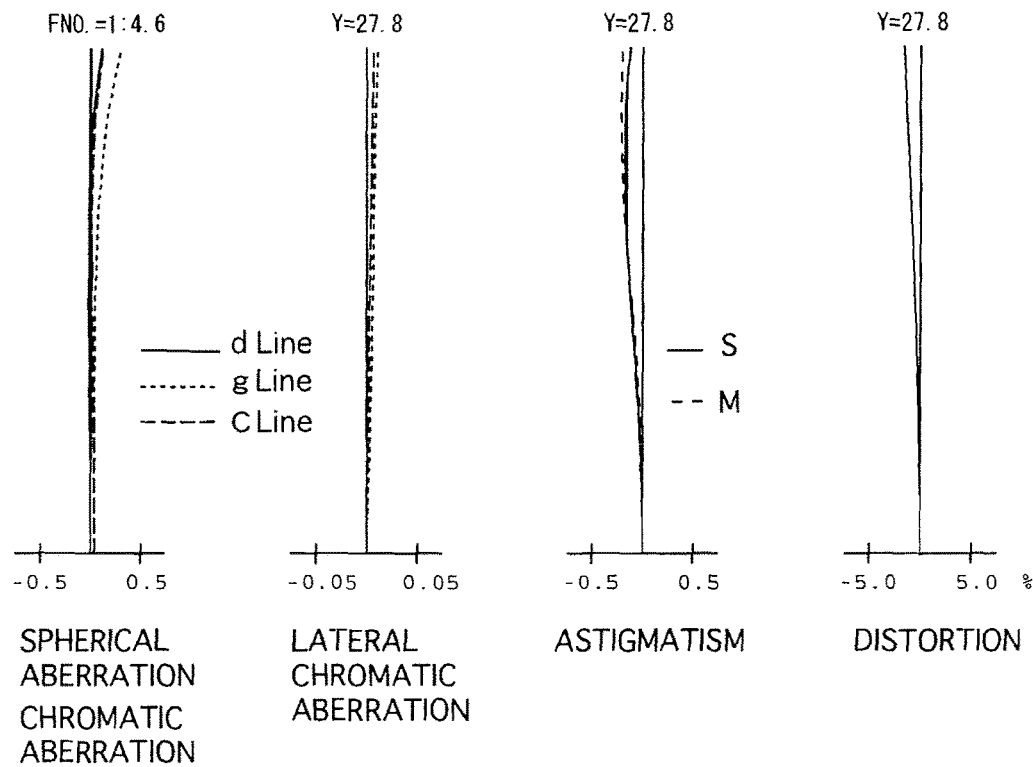
FIGS. 78A, 78B, 78C and 78D show various aberrations that occurred in the lens arrangement shown in FIG. 75, at an intermediate focal length when focused on an object at infinity.
Figure 79A:
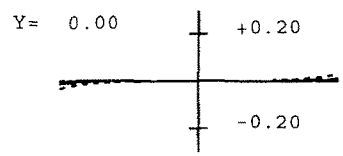
FIGS. 79A, 79B and 79C show lateral aberrations that occurred in the lens arrangement shown in FIG. 75, at an intermediate focal length when focused on an object at infinity.
Figure 79B:
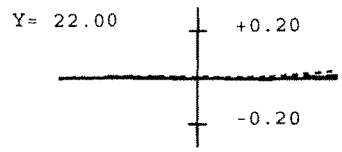
Figure 79C:
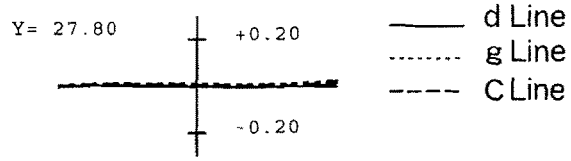
Figures 80A, 80B, 80C, 80D:
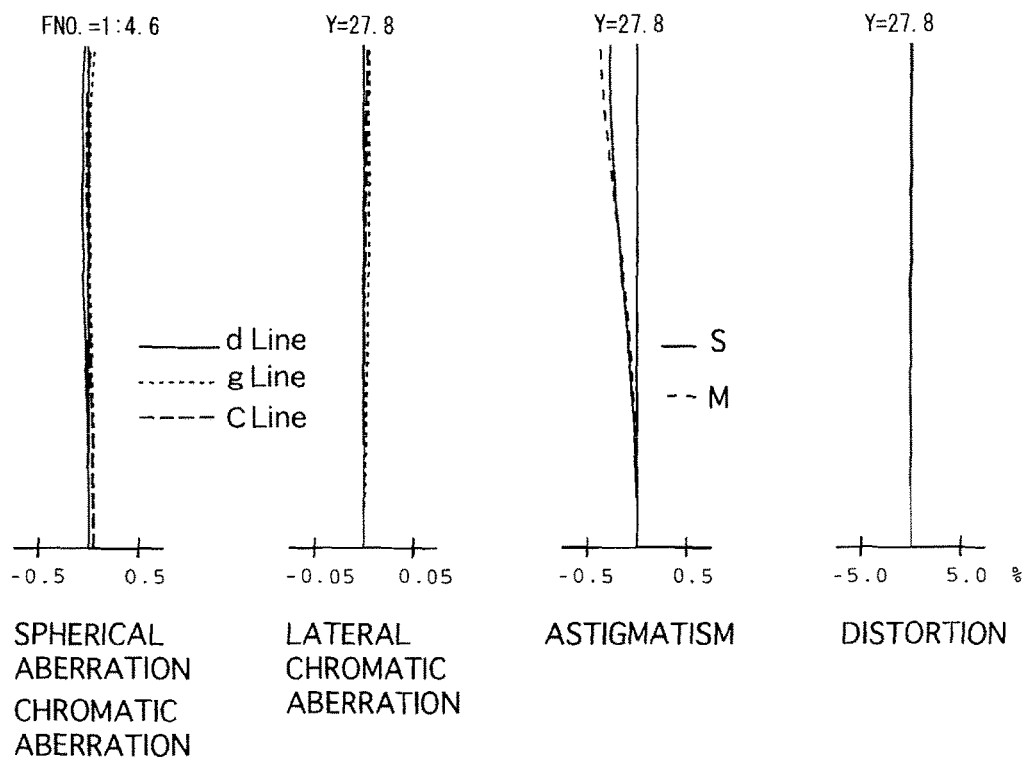
FIGS. 80A, 80B, 80C and 80D show various aberrations that occurred in the lens arrangement shown in FIG. 75, at the long focal length extremity when focused on an object at infinity.
Figure 81A:
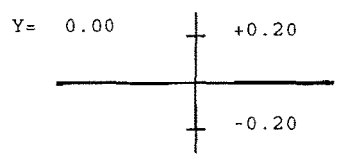
FIGS. 81A, 81B and 81C show lateral aberrations that occurred in the lens arrangement shown in FIG. 75, at the long focal length extremity when focused on an object at infinity.
Figure 81B:
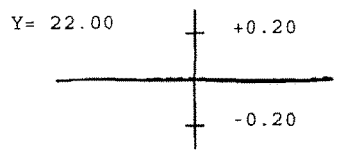
Figure 81C:
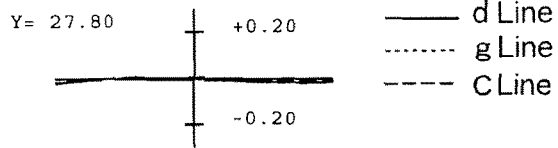
Figures 85A, 85B, 85C, 85D:
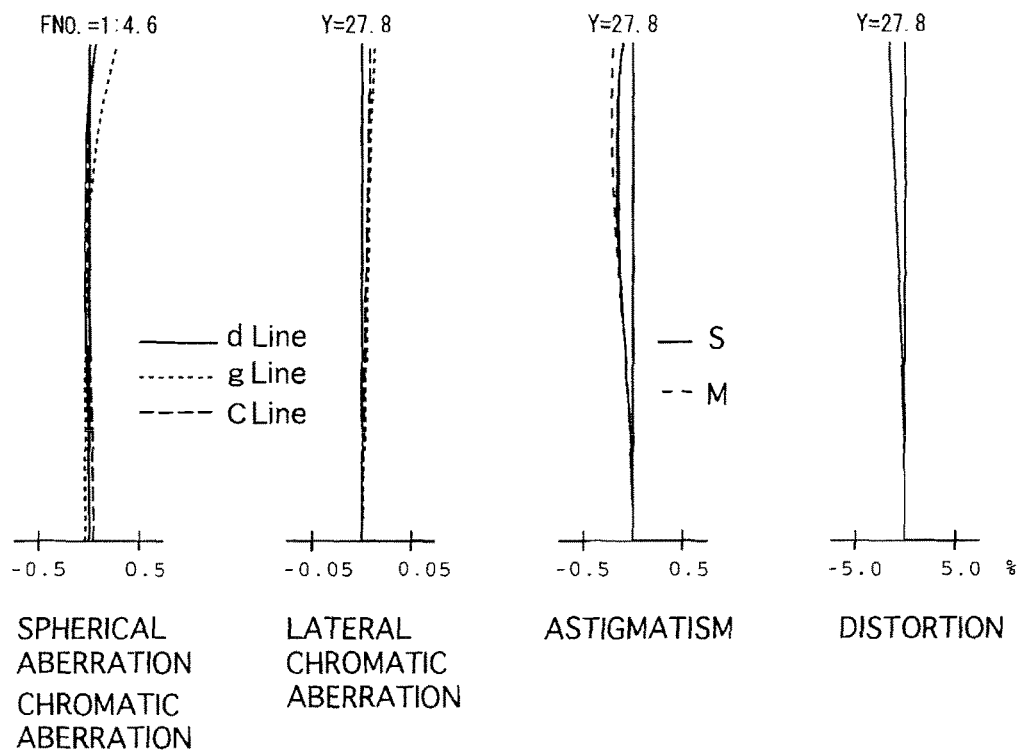
FIGS. 85A, 85B, 85C and 85D show various aberrations that occurred in the lens arrangement shown in FIG. 82, at an intermediate focal length when focused on an object at infinity.
Figure 86A:
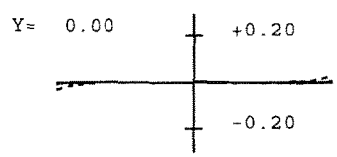
FIGS. 86A, 86B and 86C show lateral aberrations that occurred in the lens arrangement shown in FIG. 82, at an intermediate focal length when focused on an object at infinity.
Figure 86B:
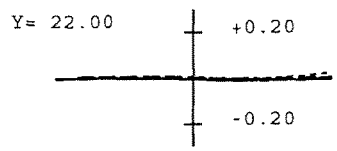
Figure 86C:
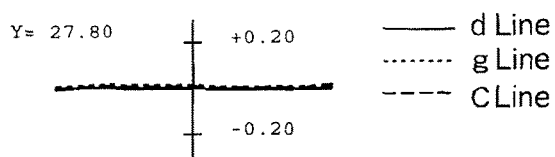
Figures 87A, 87B, 87C, 87D:
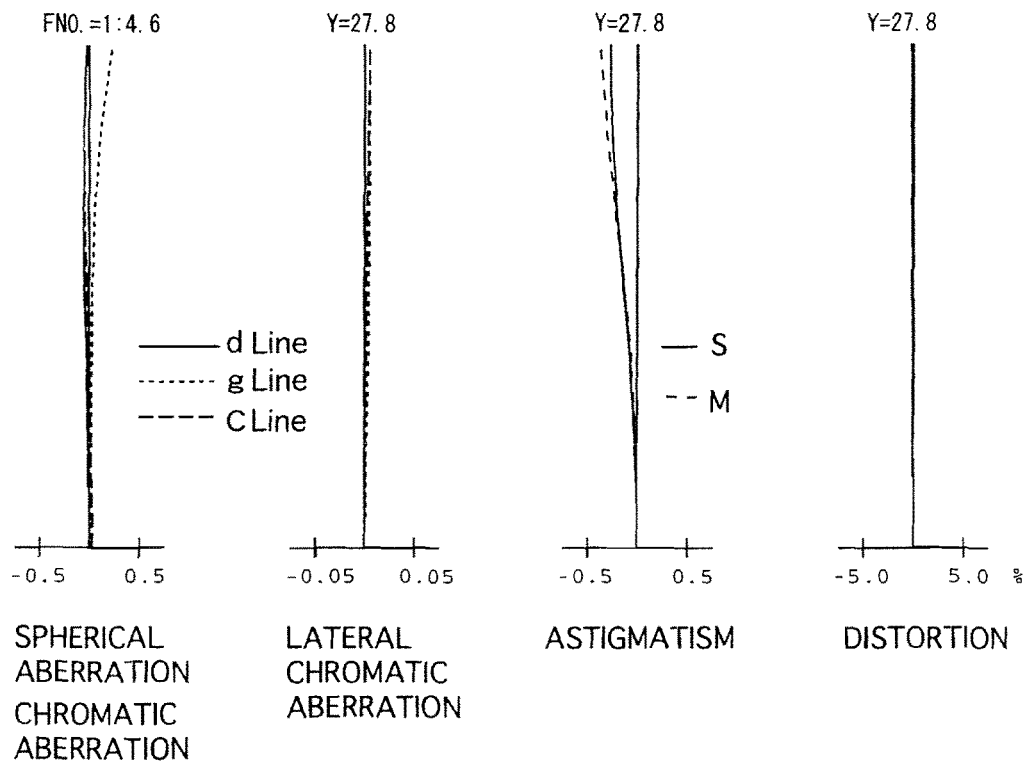
FIGS. 87A, 87B, 87C and 87D show various aberrations that occurred in the lens arrangement shown in FIG. 82, at the long focal length extremity when focused on an object at infinity.

FIGS. 75 through 81C and Tables 39 through 42 show a ninth numerical embodiment of the zoom lens system according to the present invention. FIG. 75 shows a lens arrangement of the ninth numerical embodiment of the zoom lens system, at the short focal length extremity when focused on an object at infinity. FIGS. 76A, 76B, 76C and 76D show various aberrations that occurred in the lens arrangement shown in FIG. 75, at the short focal length extremity when focused on an object at infinity. FIGS. 77A, 77B and 77C show lateral aberrations that occurred in the lens arrangement shown in FIG. 75, at the short focal length extremity when focused on an object at infinity. FIGS. 78A, 78B, 78C and 78D show various aberrations that occurred in the lens arrangement shown in FIG. 75, at an intermediate focal length when focused on an object at infinity. FIGS. 79A, 79B and 79C show lateral aberrations that occurred in the lens arrangement shown in FIG. 75, at an intermediate focal length when focused on an object at infinity. FIGS. 80A, 80B, 80C and 80D show various aberrations that occurred in the lens arrangement shown in FIG. 75, at the long focal length extremity when focused on an object at infinity. FIGS. 81A, 81B and 81C show lateral aberrations that occurred in the lens arrangement shown in FIG. 75, at the long focal length extremity when focused on an object at infinity. Table 39 shows the lens surface data, Table 40 shows the aspherical surface data, Table 41 shows various lens-system data, and Table 42 shows lens group data.

The fundamental lens arrangement of the ninth numerical embodiment is the same as that of the seventh and eighth numerical embodiments except for the following feature:

(1) In the third sub-lens group G4a, the positive lens element 41 is a planoconvex positive lens element having a convex surface on the object side (a positive lens element having a convex surface on the object side), and the negative lens element 42 is a planoconcave negative lens element having a concave surface on the image side.

TABLE 39

LENS SURFACE DATA

| Surf. No. | R | d | N (d) | ν (d) |
|---|---|---|---|---|
| 1 | 69.638 | 2.410 | 1.77250 | 49.6 |
| 2 | 27.200 | 0.200 | 1.52972 | 42.7 |
| 3* | 22.964 | 8.690 | | |
| 4 | 63.383 | 1.650 | 1.72916 | 54.7 |
| 5 | 31.189 | 9.410 | | |
| 6 | −91.673 | 2.200 | 1.61800 | 63.4 |
| 7 | 45.953 | 5.160 | | |
| 8 | 52.898 | 8.330 | 1.61340 | 44.3 |
| 9 | −134.937 | d9 | | |
| 10 | 57.220 | 3.520 | 1.58144 | 40.7 |
| 11 | 185.088 | 2.300 | | |
| 12 | 136.444 | 1.500 | 1.80000 | 29.9 |
| 13 | 28.661 | 6.670 | 1.59551 | 39.2 |
| 14 | −171.854 | 6.401 | | |
| 15 | 72.184 | 3.830 | 1.49700 | 81.6 |
| 16 | −115.495 | 1.570 | | |
| 17 (Diaphragm) | ∞ | d17 | | |
| 18 | −91.231 | 1.500 | 1.81600 | 46.6 |
| 19 | 35.110 | 4.540 | 1.65412 | 39.7 |
| 20 | −71.436 | 1.040 | | |
| 21 | −155.405 | 1.500 | 1.83400 | 37.2 |
| 22 | 71.692 | 0.940 | | |
| 23 | 66.334 | 2.680 | 1.80518 | 25.4 |
| 24 | 418.671 | d24 | | |
| 25 | 34.105 | 5.650 | 1.80610 | 40.9 |
| 26 | ∞ | 1.500 | 1.83481 | 42.7 |
| 27 | 21.976 | 11.610 | 1.49700 | 81.6 |
| 28 | −55.278 | 0.960 | | |
| 29* | −3249.477 | 0.200 | 1.52972 | 42.7 |
| 30 | −3249.477 | 1.760 | 1.83400 | 37.2 |
| 31 | 35.047 | 7.410 | 1.48749 | 70.2 |
| 32 | −100.056 | — | | |

The asterisk (*) designates an aspherical surface which is rotationally symmetrical with respect to the optical axis.

TABLE 40

ASPHERICAL SURFACE DATA

| Surf. No. | K | A4 | A6 | A8 | A10 |
|---|---|---|---|---|---|
| 3 | −1.000 | 0.2805E−05 | −0.3972E−09 | 0.7407E−12 | −0.2875E−14 |
| 29 | 0.000 | −0.3223E−05 | 0.1193E−08 | −0.2836E−11 | 0.3893E−13 |

TABLE 41

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 38.9 | 32.3 |
| Y | 27.80 | 27.80 | 27.80 |
| fB | 66.45 | 74.64 | 84.68 |
| L | 225.61 | 220.71 | 219.94 |
| d9 | 24.966 | 15.369 | 7.671 |
| d17 | 5.023 | 9.721 | 16.645 |
| d24 | 24.042 | 15.855 | 5.816 |

TABLE 42

LENS GROUP DATA

| Lens Group | 1st Surface | Focal Length |
|---|---|---|
| 1 | 1 | −29.60 |
| 2 | 10 | 53.52 |
| 3 | 18 | −91.20 |
| 4 | 25 | 78.43 |

Numerical Embodiment 10

Figure 88A:
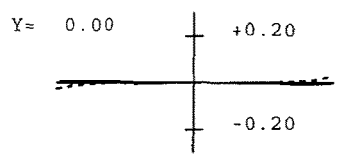
FIGS. 88A, 88B and 88C show lateral aberrations that occurred in the lens arrangement shown in FIG. 82, at the long focal length extremity when focused on an object at infinity.
Figure 88B:
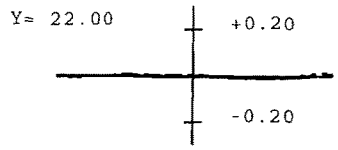
Figure 88C:
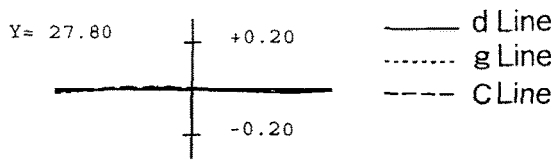

FIGS. 82 through 88C and Tables 43 through 46 show a tenth numerical embodiment of the zoom lens system according to the present invention. FIG. 82 shows a lens arrangement of the tenth numerical embodiment of the zoom lens system, at the short focal length extremity when focused on an object at infinity. FIGS. 83A, 83B, 83C and 83D show various aberrations that occurred in the lens arrangement shown in FIG. 82, at the short focal length extremity when focused on an object at infinity. FIGS. 84A, 84B and 84C show lateral aberrations that occurred in the lens arrangement shown in FIG. 82, at the short focal length extremity when focused on an object at infinity. FIGS. 85A, 85B, 85C and 85D show various aberrations that occurred in the lens arrangement shown in FIG. 82, at an intermediate focal length when focused on an object at infinity. FIGS. 86A, 86B and 86C show lateral aberrations that occurred in the lens arrangement shown in FIG. 82, at an intermediate focal length when focused on an object at infinity. FIGS. 87A, 87B, 87C and 87D show various aberrations that occurred in the lens arrangement shown in FIG. 82, at the long focal length extremity when focused on an object at infinity. FIGS. 88A, 88B and 88C show lateral aberrations that occurred in the lens arrangement shown in FIG. 82, at the long focal length extremity when focused on an object at infinity. Table 43 shows the lens surface data, Table 44 shows the aspherical surface data, Table 45 shows various lens-system data, and Table 46 shows lens group data.

The fundamental lens arrangement of the tenth numerical embodiment is the same as that of the ninth numerical embodiment.

TABLE 43

LENS SURFACE DATA

| Surf. No. | R | d | N (d) | ν (d) |
|---|---|---|---|---|
| 1 | 65.358 | 2.530 | 1.81600 | 46.6 |
| 2 | 27.200 | 0.200 | 1.52972 | 42.7 |
| 3* | 22.966 | 7.560 | | |
| 4 | 50.109 | 1.650 | 1.77250 | 49.6 |
| 5 | 28.613 | 10.500 | | |
| 6 | −79.656 | 2.500 | 1.64000 | 60.1 |
| 7 | 49.679 | 5.570 | | |
| 8 | 55.019 | 8.850 | 1.59551 | 39.2 |
| 9 | −121.594 | d9 | | |
| 10 | 63.182 | 4.000 | 1.62588 | 35.7 |
| 11 | 157.222 | 2.670 | | |
| 12 | 97.531 | 1.730 | 1.80518 | 25.4 |
| 13 | 28.966 | 6.850 | 1.60342 | 38.0 |
| 14 | −134.949 | 5.847 | | |
| 15 | 82.219 | 3.430 | 1.49700 | 81.6 |
| 16 | −165.107 | 1.730 | | |
| 17 (Diaphragm) | ∞ | d17 | | |
| 18 | −87.197 | 1.500 | 1.83481 | 42.7 |
| 19 | 38.016 | 4.540 | 1.63980 | 34.5 |
| 20 | −65.237 | 0.800 | | |
| 21 | −174.206 | 1.500 | 1.80100 | 35.0 |
| 22 | 74.279 | 0.890 | | |
| 23 | 65.982 | 2.190 | 1.80518 | 25.4 |
| 24 | 229.516 | d24 | | |
| 25 | 33.851 | 5.650 | 1.80610 | 33.3 |
| 26 | ∞ | 1.500 | 1.83400 | 37.2 |
| 27 | 22.014 | 11.520 | 1.49700 | 81.6 |
| 28 | −58.817 | 0.750 | | |
| 29* | −4773.318 | 0.200 | 1.52972 | 42.7 |
| 30 | −4773.318 | 1.500 | 1.83400 | 37.2 |
| 31 | 34.332 | 7.590 | 1.48749 | 70.2 |
| 32 | −87.843 | — | | |

The asterisk (*) designates an aspherical surface which is rotationally symmetrical with respect to the optical axis.

TABLE 44

ASPHERICAL SURFACE DATA

| Surf. No. | K | A4 | A6 | A8 | A10 |
|---|---|---|---|---|---|
| 3 | −1.000 | 0.2739E−05 | −0.5024E−09 | 0.8817E−13 | −0.2066E−14 |
| 29 | 0.000 | −0.2973E−05 | 0.6725E−09 | −0.1170E−11 | 0.3312E−13 |

TABLE 45

VARIOUS LENS-SYSTEM DATA
Zoom Ratio: 1.54

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 44.06 |
| W | 45.3 | 38.9 | 32.3 |
| Y | 27.80 | 27.80 | 27.80 |
| fB | 66.07 | 74.19 | 85.94 |
| L | 225.28 | 219.75 | 219.27 |
| d9 | 23.647 | 14.287 | 6.365 |
| d17 | 5.361 | 10.056 | 15.408 |
| d24 | 24.461 | 15.465 | 5.816 |

TABLE 46

LENS GROUP DATA

| Lens Group | 1st Surface | Focal Length |
|---|---|---|
| 1 | 1 | −29.12 |
| 2 | 10 | 52.61 |
| 3 | 18 | −87.85 |
| 4 | 25 | 77.37 |

Numerical Embodiment 11

Figure 89:
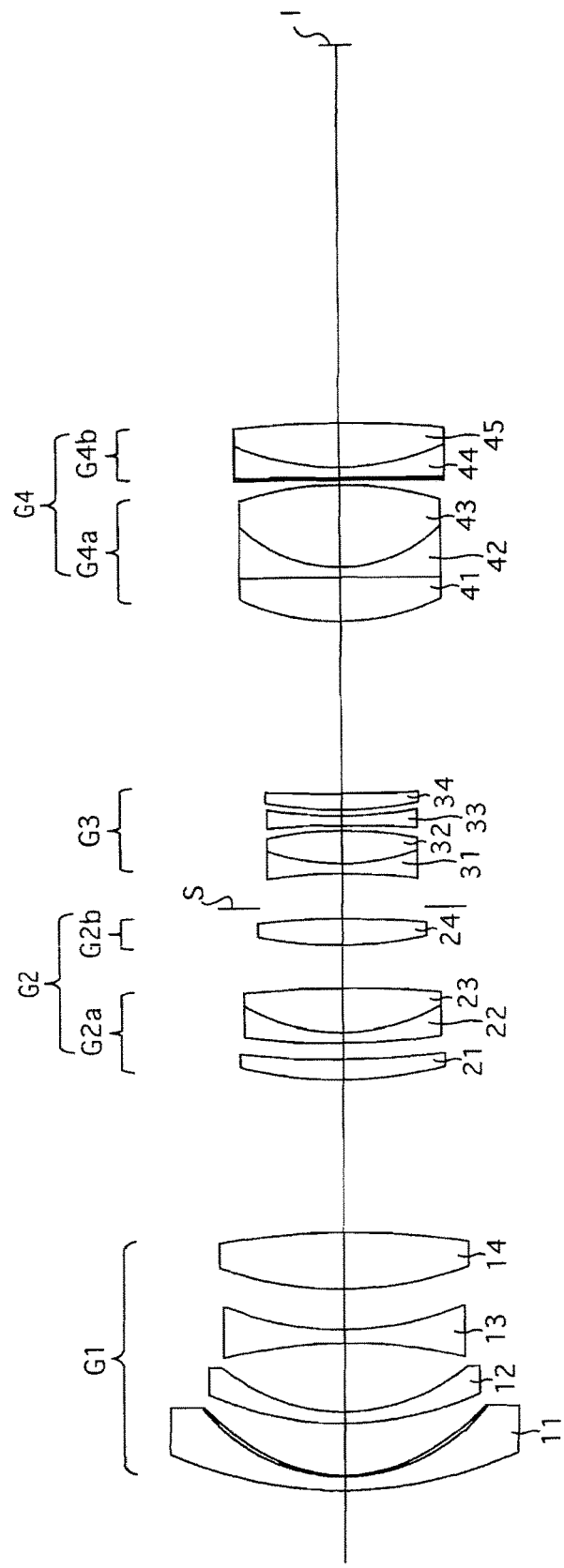
FIG. 89 shows a lens arrangement of an eleventh numerical embodiment of a zoom lens system, according to the present invention, at the short focal length extremity when focused on an object at infinity.

FIGS. 89 through 95C and Tables 47 through 50 show an eleventh numerical embodiment of the zoom lens system according to the present invention. FIG. 89 shows a lens arrangement of the eleventh numerical embodiment of the zoom lens system, at the short focal length extremity when focused on an object at infinity. FIGS. 90A, 90B, 90C and 90D show various aberrations that occurred in the lens arrangement shown in FIG. 89, at the short focal length extremity when focused on an object at infinity. FIGS. 91A, 91B and 91C show lateral aberrations that occurred in the lens arrangement shown in FIG. 89, at the short focal length extremity when focused on an object at infinity. FIGS. 92A, 92B, 92C and 92D show various aberrations that occurred in the lens arrangement shown in FIG. 89, at an intermediate focal length when focused on an object at infinity. FIGS. 93A, 93B and 93C show lateral aberrations that occurred in the lens arrangement shown in FIG. 89, at an intermediate focal length when focused on an object at infinity. FIGS. 94A, 94B, 94C and 94D show various aberrations that occurred in the lens arrangement shown in FIG. 89, at the long focal length extremity when focused on an object at infinity. FIGS. 95A, 95B and 95C show lateral aberrations that occurred in the lens arrangement shown in FIG. 89, at the long focal length extremity when focused on an object at infinity. Table 47 shows the lens surface data, Table 48 shows the aspherical surface data, Table 49 shows various lens-system data, and Table 50 shows lens group data.

The fundamental lens arrangement of the eleventh numerical embodiment is the same as that of the seventh and eighth numerical embodiments.

TABLE 47

LENS SURFACE DATA

| Surf. No. | R | d | N (d) | ν (d) |
|---|---|---|---|---|
| 1 | 64.035 | 2.050 | 1.81600 | 46.6 |
| 2 | 27.200 | 0.200 | 1.52972 | 42.7 |
| 3* | 22.725 | 7.810 | | |
| 4 | 50.349 | 1.690 | 1.69680 | 55.5 |
| 5 | 28.771 | 10.290 | | |
| 6 | −75.682 | 2.000 | 1.61800 | 63.4 |
| 7 | 47.104 | 6.030 | | |
| 8 | 55.387 | 8.410 | 1.56732 | 42.8 |
| 9 | −115.424 | d9 | | |
| 10 | 64.953 | 3.020 | 1.72825 | 28.5 |
| 11 | 137.231 | 2.450 | | |
| 12 | 125.689 | 1.500 | 1.80518 | 25.4 |
| 13 | 29.943 | 6.550 | 1.59270 | 35.3 |
| 14 | −157.141 | 6.380 | | |
| 15 | 63.925 | 3.940 | 1.49700 | 81.6 |
| 16 | −126.239 | 1.630 | | |
| 17 (Diaphragm) | ∞ | d17 | | |
| 18 | −81.989 | 1.500 | 1.83481 | 42.7 |
| 19 | 35.152 | 4.870 | 1.63980 | 34.5 |
| 20 | −56.288 | 0.730 | | |
| 21 | −173.240 | 1.500 | 1.80100 | 35.0 |
| 22 | 73.769 | 0.870 | | |
| 23 | 63.476 | 2.400 | 1.69895 | 30.1 |
| 24 | 317.385 | d24 | | |
| 25 | 35.772 | 6.550 | 1.65160 | 58.5 |
| 26 | −2500.000 | 1.530 | 1.72916 | 54.7 |
| 27 | 21.950 | 12.150 | 1.49700 | 81.6 |
| 28 | −50.109 | 0.750 | | |
| 29* | −4801.325 | 0.300 | 1.52972 | 42.7 |
| 30 | −4801.325 | 1.590 | 1.83400 | 37.2 |
| 31 | 40.334 | 6.600 | 1.48749 | 70.2 |
| 32 | −143.721 | — | | |

The asterisk (*) designates an aspherical surface which is rotationally symmetrical with respect to the optical axis.

TABLE 48

ASPHERICAL SURFACE DATA

| Surf. No. | K | A4 | A6 | A8 | A10 |
|---|---|---|---|---|---|
| 3 | −1.000 | 0.2545E−05 | −0.3779E−09 | −0.1557E−12 | −0.2334E−14 |
| 29 | 0.000 | −0.3479E−05 | 0.1487E−08 | −0.6826E−11 | 0.4835E−13 |

TABLE 49

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 39.0 | 32.4 |
| Y | 27.80 | 27.80 | 27.80 |
| fB | 67.50 | 76.44 | 87.16 |
| L | 226.00 | 220.46 | 219.14 |
| d9 | 22.663 | 12.979 | 5.314 |
| d17 | 5.070 | 9.214 | 15.555 |
| d24 | 25.477 | 16.534 | 5.820 |

TABLE 50

LENS GROUP DATA

| Lens Group | 1st Surface | Focal Length |
|---|---|---|
| 1 | 1 | −29.01 |
| 2 | 10 | 52.54 |
| 3 | 18 | −93.22 |
| 4 | 25 | 80.73 |

Numerical Embodiment 12

Figure 96:
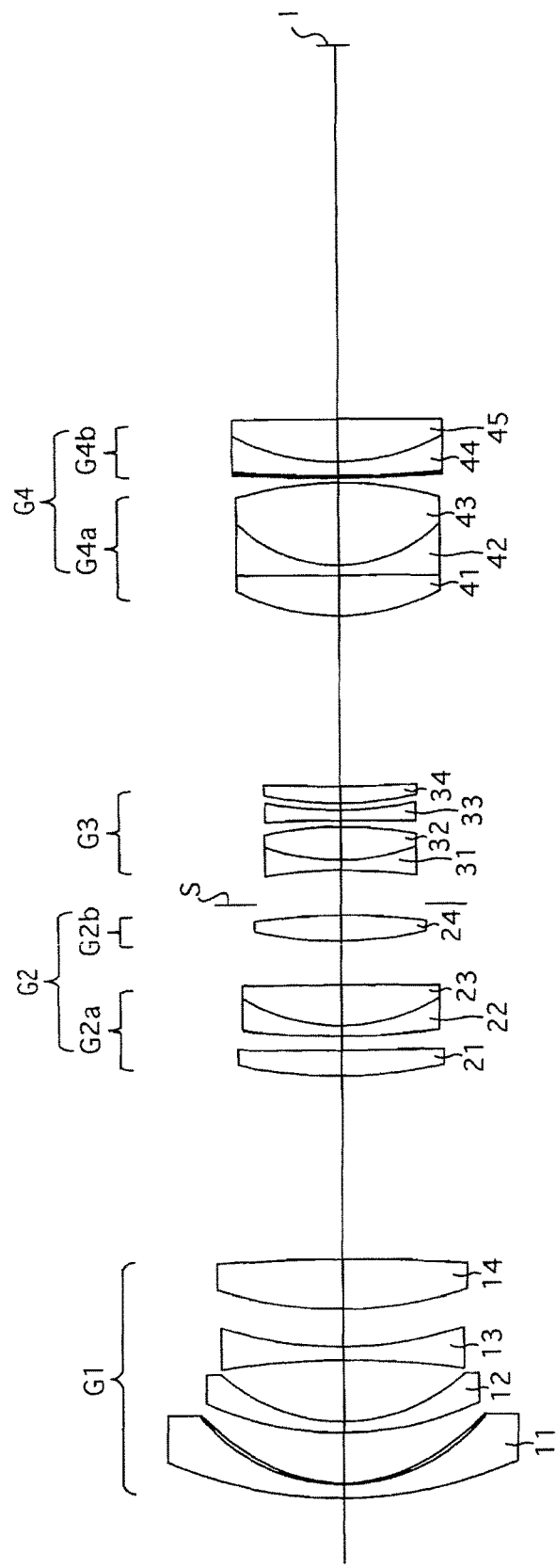
FIG. 96 shows a lens arrangement of a twelfth numerical embodiment of a zoom lens system, according to the present invention, at the short focal length extremity when focused on an object at infinity.
Figures 99A, 99B, 99C, 99D:
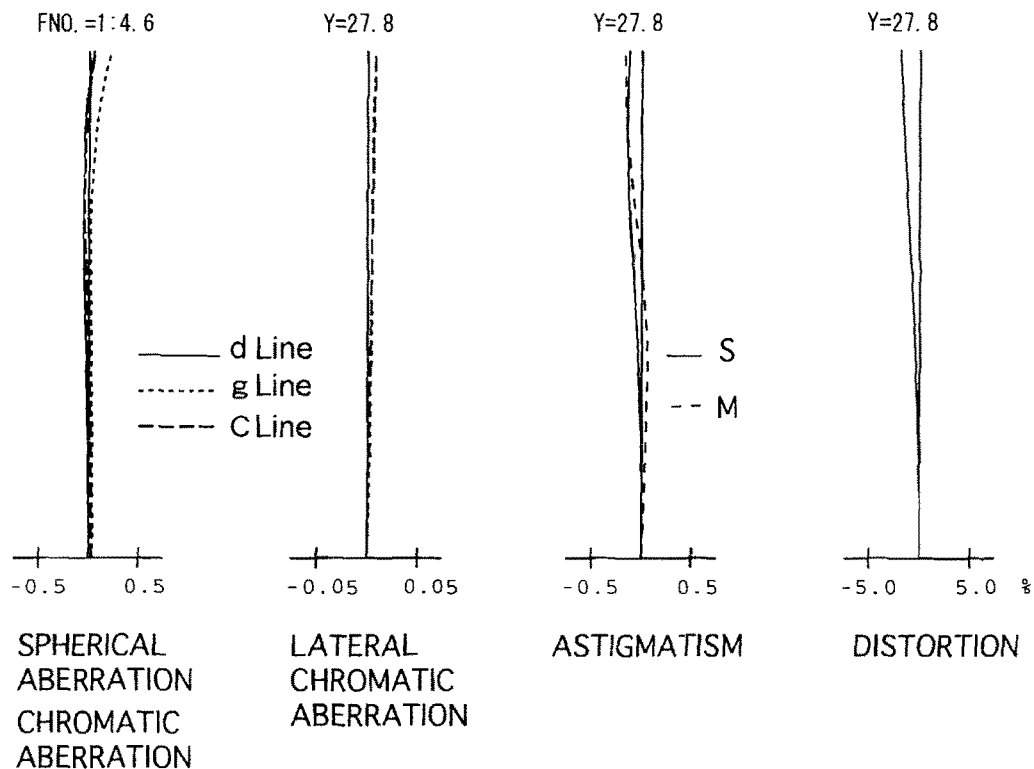
FIGS. 99A, 99B, 99C and 99D show various aberrations that occurred in the lens arrangement shown in FIG. 96, at an intermediate focal length when focused on an object at infinity.
Figure 100A:
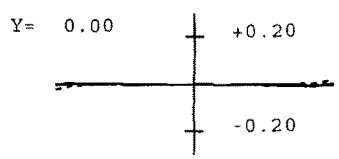
FIGS. 100A, 100B and 100C show lateral aberrations that occurred in the lens arrangement shown in FIG. 96, at an intermediate focal length when focused on an object at infinity.
Figure 100B:
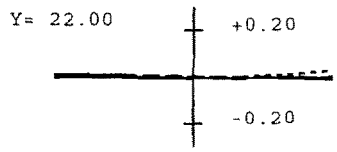
Figure 100C:
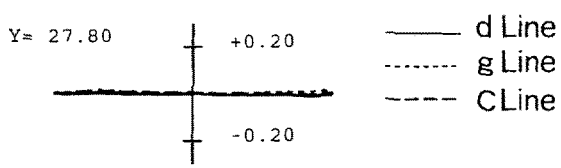

FIGS. 96 through 102C and Tables 51 through 54 show a twelfth numerical embodiment of the zoom lens system according to the present invention. FIG. 96 shows a lens arrangement of the twelfth numerical embodiment of the zoom lens system, at the short focal length extremity when focused on an object at infinity. FIGS. 97A, 97B, 97C and 97D show various aberrations that occurred in the lens arrangement shown in FIG. 96, at the short focal length extremity when focused on an object at infinity. FIGS. 98A, 98B and 98C show lateral aberrations that occurred in the lens arrangement shown in FIG. 96, at the short focal length extremity when focused on an object at infinity. FIGS. 99A, 99B, 99C and 99D show various aberrations that occurred in the lens arrangement shown in FIG. 96, at an intermediate focal length when focused on an object at infinity. FIGS. 100A, 100B and 100C show lateral aberrations that occurred in the lens arrangement shown in FIG. 96, at an intermediate focal length when focused on an object at infinity. FIGS. 101A, 101B, 101C and 101D show various aberrations that occurred in the lens arrangement shown in FIG. 96, at the long focal length extremity when focused on an object at infinity. FIGS. 102A, 102B and 102C show lateral aberrations that occurred in the lens arrangement shown in FIG. 96, at the long focal length extremity when focused on an object at infinity. Table 51 shows the lens surface data, Table 52 shows the aspherical surface data, Table 53 shows various lens-system data, and Table 54 shows lens group data.

The fundamental lens arrangement of the twelfth numerical embodiment is the same as that of the seventh and eighth numerical embodiments except for the following features:

(1) In the third sub-lens group G4a, the positive lens element 41 is a planoconvex positive lens element having a convex surface on the object side (a positive lens element having a convex surface on the object side), and the negative lens element 42 is a planoconcave negative lens element having a concave surface on the image side.

(2) In the fourth sub-lens group G4b, the negative lens element 44 is a negative meniscus lens element having a convex surface on the object side. The negative meniscus lens element 44 is a hybrid lens formed by a glass lens element with an aspherical surface layer, formed from a synthetic resin material, adhered onto the object side thereof.

TABLE 51

LENS SURFACE DATA

| Surf. No. | R | d | N (d) | ν (d) |
|---|---|---|---|---|
| 1 | 65.300 | 2.050 | 1.81600 | 46.6 |
| 2 | 27.500 | 0.200 | 1.52972 | 42.7 |
| 3* | 23.026 | 7.580 | | |
| 4 | 50.032 | 1.650 | 1.72916 | 54.7 |
| 5 | 27.123 | 9.230 | | |
| 6 | −119.300 | 2.000 | 1.72916 | 54.7 |
| 7 | 58.906 | 5.650 | | |
| 8 | 62.025 | 7.430 | 1.72047 | 34.7 |
| 9 | −247.562 | d9 | | |
| 10 | 74.635 | 3.800 | 1.61340 | 44.3 |
| 11 | 803.387 | 2.070 | | |
| 12 | 129.693 | 1.500 | 1.80000 | 29.9 |

TABLE 51-continued

LENS SURFACE DATA

| Surf. No. | R | d | N (d) | ν (d) |
|---|---|---|---|---|
| 13 | 28.740 | 6.080 | 1.60342 | 38.0 |
| 14 | −678.444 | 6.519 | | |
| 15 | 59.735 | 3.830 | 1.48749 | 70.2 |
| 16 | −95.576 | 1.580 | | |
| 17 (Diaphragm) | ∞ | d17 | | |
| 18 | −79.495 | 1.500 | 1.83481 | 42.7 |
| 19 | 33.950 | 4.950 | 1.65412 | 39.7 |
| 20 | −56.518 | 0.980 | | |
| 21 | −254.800 | 1.500 | 1.83400 | 37.2 |
| 22 | 56.444 | 1.030 | | |
| 23 | 53.174 | 2.520 | 1.80518 | 25.4 |
| 24 | 209.861 | d24 | | |
| 25 | 33.840 | 6.000 | 1.61800 | 63.4 |
| 26 | ∞ | 1.500 | 1.72916 | 54.7 |
| 97 | 21.950 | 12.160 | 1.49700 | 81.6 |
| 28 | −54.079 | 0.750 | | |
| 29* | 198.653 | 0.270 | 1.52972 | 42.7 |
| 30 | 198.653 | 2.100 | 1.83400 | 37.2 |
| 31 | 34.541 | 6.330 | 1.48749 | 70.2 |
| 32 | −1261.416 | — | | |

The asterisk (*) designates an aspherical surface which is rotationally symmetrical with respect to the optical axis.

TABLE 52

ASPHERICAL SURFACE DATA

| Surf. No. | K | A4 | A6 | A8 | A10 |
|---|---|---|---|---|---|
| 3 | −1.000 | 0.2736E−05 | −0.1235E−08 | 0.2360E−12 | −0.2427E−14 |
| 29 | 0.000 | −0.3584E−05 | 0.2059E−08 | −0.1162E−10 | 0.4874E−13 |

TABLE 53

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 34.99 | 43.87 |
| W | 45.3 | 39.0 | 32.5 |
| Y | 27.80 | 27.80 | 27.80 |
| fB | 66.01 | 74.88 | 85.57 |
| L | 226.55 | 220.92 | 219.35 |
| d9 | 27.248 | 17.502 | 9.675 |
| d17 | 5.110 | 9.233 | 15.476 |
| d24 | 25.420 | 16.550 | 5.870 |

TABLE 54

LENS GROUP DATA

| Lens Group | 1st Surface | Focal Length |
|---|---|---|
| 1 | 1 | −28.86 |
| 2 | 10 | 52.18 |
| 3 | 18 | −94.52 |
| 4 | 25 | 83.11 |

Numerical Embodiment 13

Figure 103:
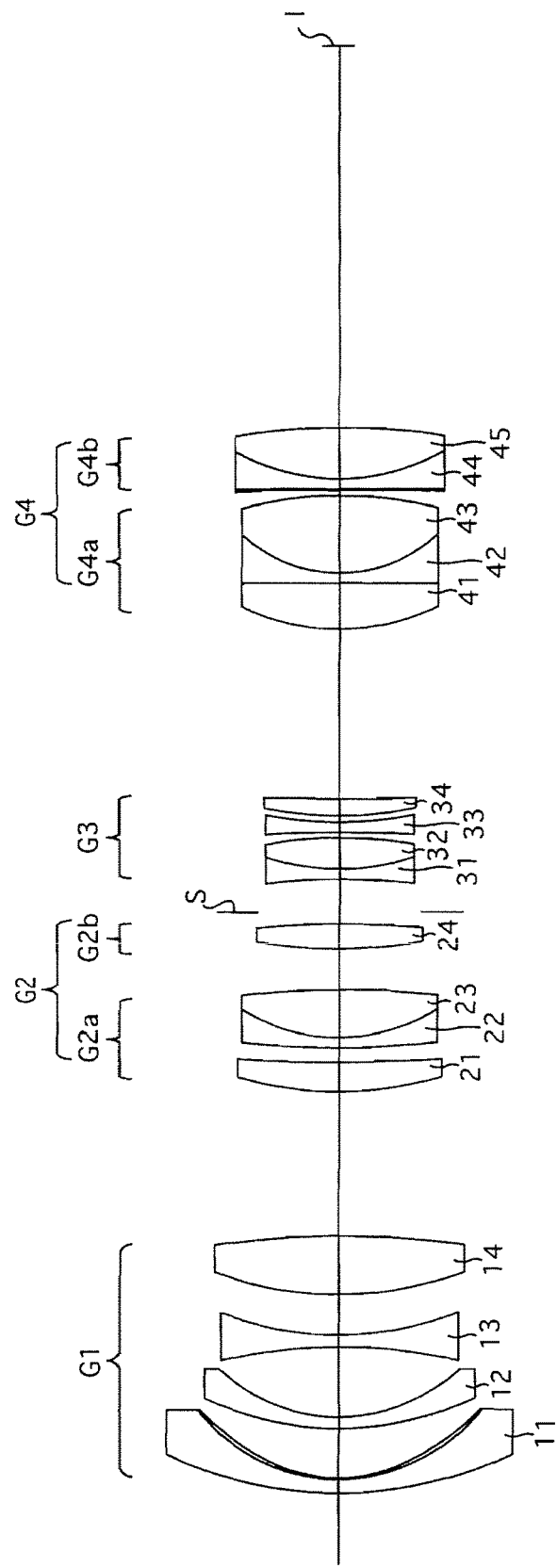
FIG. 103 shows a lens arrangement of a thirteenth numerical embodiment of a zoom lens system, according to the present invention, at the short focal length extremity when focused on an object at infinity.
Figures 104A, 104B, 104C, 104D:
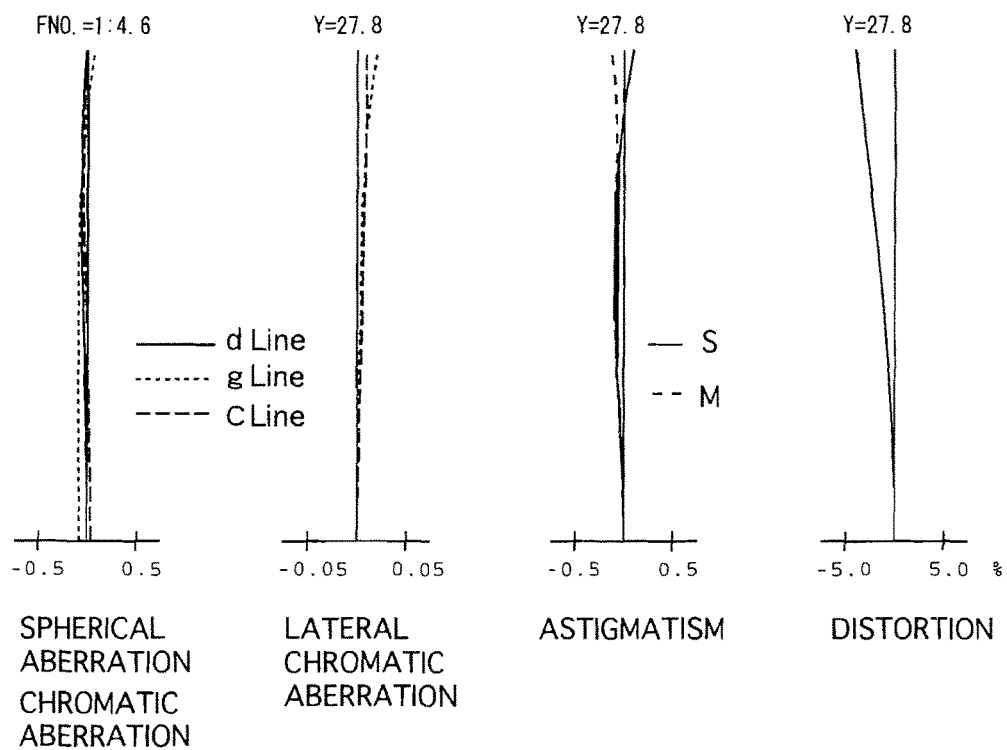
FIGS. 104A, 104B, 104C and 104D show various aberrations that occurred in the lens arrangement shown in FIG. 103, at the short focal length extremity when focused on an object at infinity.
Figure 105A:
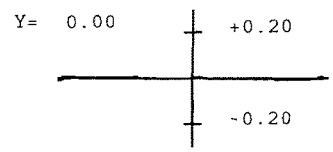
FIGS. 105A, 105B and 105C show lateral aberrations that occurred in the lens arrangement shown in FIG. 103, at the short focal length extremity when focused on an object at infinity.
Figure 105B:
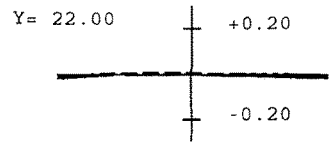
Figure 105C:
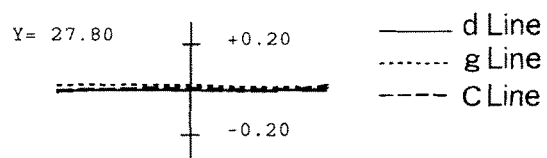
Figures 108A, 108B, 108C, 108D:
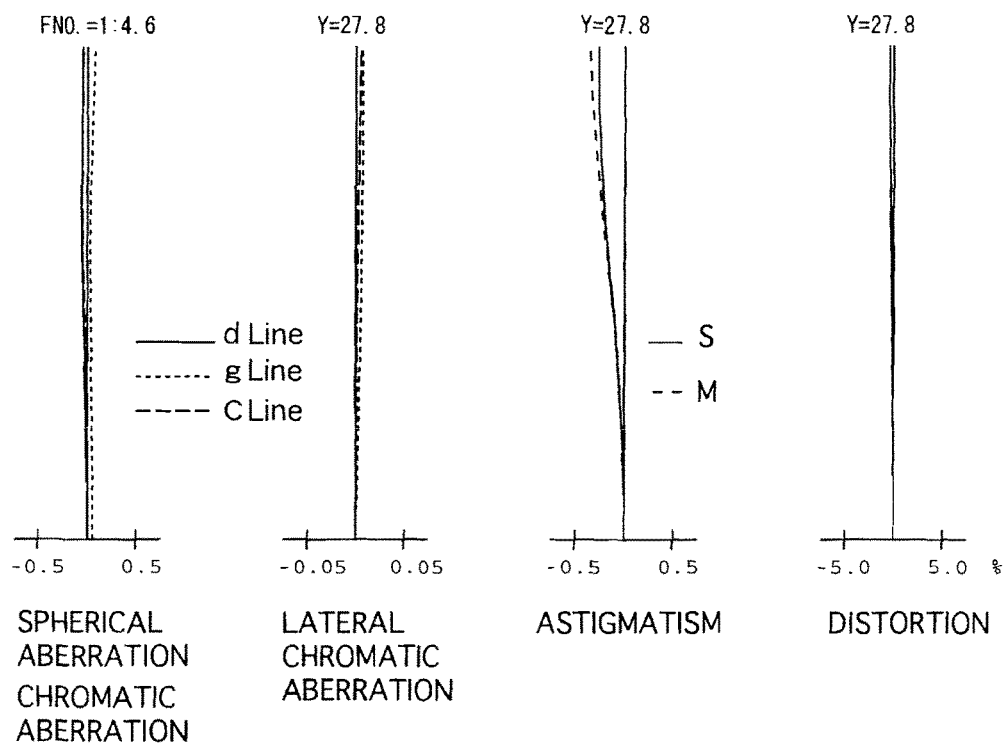
FIGS. 108A, 108B, 108C and 108D show various aberrations that occurred in the lens arrangement shown in FIG. 103, at the long focal length extremity when focused on an object at infinity.
Figure 109A:
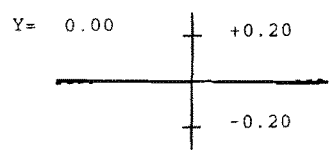
FIGS. 109A, 109B and 109C show lateral aberrations that occurred in the lens arrangement shown in FIG. 103, at the long focal length extremity when focused on an object at infinity.
Figure 109B:
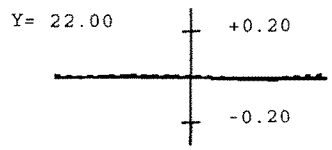
Figure 109C:
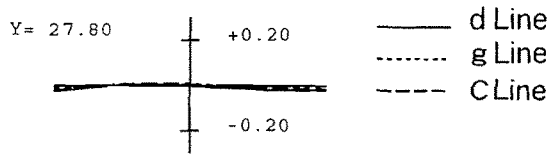

FIGS. 103 through 109C and Tables 55 through 58 show a thirteenth numerical embodiment of the zoom lens system according to the present invention. FIG. 103 shows a lens arrangement of the thirteenth numerical embodiment of the zoom lens system, at the short focal length extremity when focused on an object at infinity. FIGS. 104A, 104B, 104C and 104D show various aberrations that occurred in the lens arrangement shown in FIG. 103, at the short focal length extremity when focused on an object at infinity. FIGS. 105A, 105B and 105C show lateral aberrations that occurred in the lens arrangement shown in FIG. 103, at the short focal length extremity when focused on an object at infinity. FIGS. 106A, 106B, 106C and 106D show various aberrations that occurred in the lens arrangement shown in FIG. 103, at an intermediate focal length when focused on an object at infinity. FIGS. 107A, 107B and 107C show lateral aberrations that occurred in the lens arrangement shown in FIG. 103, at an intermediate focal length when focused on an object at infinity. FIGS. 108A, 108B, 108C and 108D show various aberrations that occurred in the lens arrangement shown in FIG. 103, at the long focal length extremity when focused on an object at infinity. FIGS. 109A, 109B and 109C show lateral aberrations that occurred in the lens arrangement shown in FIG. 103, at the long focal length extremity when focused on an object at infinity. Table 55 shows the lens surface data, Table 56 shows the aspherical surface data, Table 57 shows various lens-system data, and Table 58 shows lens group data.

The fundamental lens arrangement of the thirteenth numerical embodiment is the same as that of the ninth and tenth numerical embodiments.

TABLE 55

LENS SURFACE DATA

| Surf. No. | R | d | N (d) | ν (d) |
|---|---|---|---|---|
| 1 | 61.215 | 2.050 | 1.80400 | 46.6 |
| 2 | 27.200 | 0.200 | 1.52972 | 42.7 |
| 3* | 22.791 | 7.420 | | |
| 4 | 48.604 | 1.650 | 1.75500 | 52.3 |
| 5 | 26.347 | 10.510 | | |
| 6 | −78.561 | 1.800 | 1.61800 | 63.4 |
| 7 | 49.100 | 6.050 | | |
| 8 | 55.131 | 8.670 | 1.60562 | 43.7 |
| 9 | −129.547 | d9 | | |
| 10 | 55.088 | 4.360 | 1.54072 | 47.2 |
| 11 | 234.815 | 2.150 | | |
| 12 | 135.804 | 1.500 | 1.80000 | 29.9 |
| 13 | 28.463 | 7.030 | 1.59551 | 39.2 |
| 14 | −139.912 | 6.058 | | |
| 15 | 70.833 | 3.730 | 1.49700 | 81.6 |
| 16 | −141.899 | 1.710 | | |
| 17 (Diaphragm) | ∞ | d17 | | |
| 18 | −93.730 | 1.500 | 1.83481 | 42.7 |
| 19 | 37.144 | 4.690 | 1.58144 | 40.7 |
| 20 | −59.430 | 0.800 | | |
| 21 | −168.561 | 1.500 | 1.83481 | 42.7 |
| 22 | 62.147 | 0.940 | | |
| 23 | 59.027 | 2.500 | 1.80518 | 25.4 |
| 24 | 405.068 | d24 | | |
| 25 | 34.602 | 6.820 | 1.80518 | 25.4 |
| 26 | ∞ | 1.500 | 1.80000 | 29.9 |
| 27 | 21.950 | 11.440 | 1.49700 | 81.6 |
| 28 | −61.136 | 0.800 | | |
| 29* | −3333.333 | 0.200 | 1.52972 | 42.7 |
| 30 | −3333.333 | 1.500 | 1.80100 | 35.0 |
| 31 | 32.929 | 7.590 | 1.48749 | 70.2 |
| 32 | −98.355 | — | | |

The asterisk (*) designates an aspherical surface which is rotationally symmetrical with respect to the optical axis.

TABLE 56

ASPHERICAL SURFACE DATA

| Surf. No. | K | A4 | A6 | A8 | A10 |
|---|---|---|---|---|---|
| 3 | −1.000 | 0.2883E−05 | −0.8451E−09 | −0.3721E−12 | −0.2515E−14 |
| 29 | 0.000 | −0.3131E−05 | −0.4836E−09 | 0.2992E−11 | 0.1824E−13 |

TABLE 57

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 45.3 | 39.0 | 32.5 |
| Y | 27.80 | 27.80 | 27.80 |
| fB | 67.22 | 76.18 | 86.57 |
| L | 225.43 | 219.73 | 218.29 |
| d9 | 21.417 | 12.373 | 5.438 |
| d17 | 4.960 | 8.299 | 13.793 |
| d24 | 25.165 | 16.210 | 5.816 |

TABLE 58

LENS GROUP DATA

| Lens Group | 1$^{st}$ Surface | Focal Length |
|---|---|---|
| 1 | 1 | −29.21 |
| 2 | 10 | 52.18 |
| 3 | 18 | −80.91 |
| 4 | 25 | 73.91 |

Numerical Embodiment 14

Figure 110:
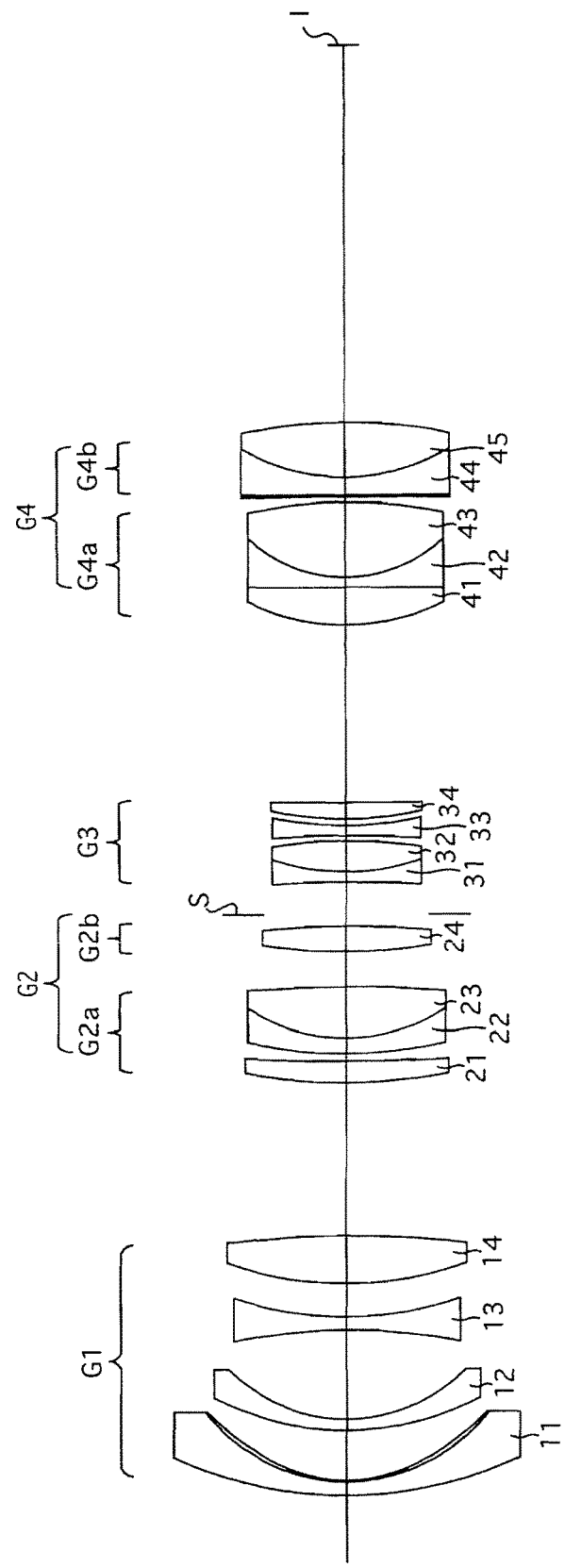
FIG. 110 shows a lens arrangement of a fourteenth numerical embodiment of a zoom lens system, according to the present invention, at the short focal length extremity when focused on an object at infinity.
Figures 111A, 111B, 111C, 111D:
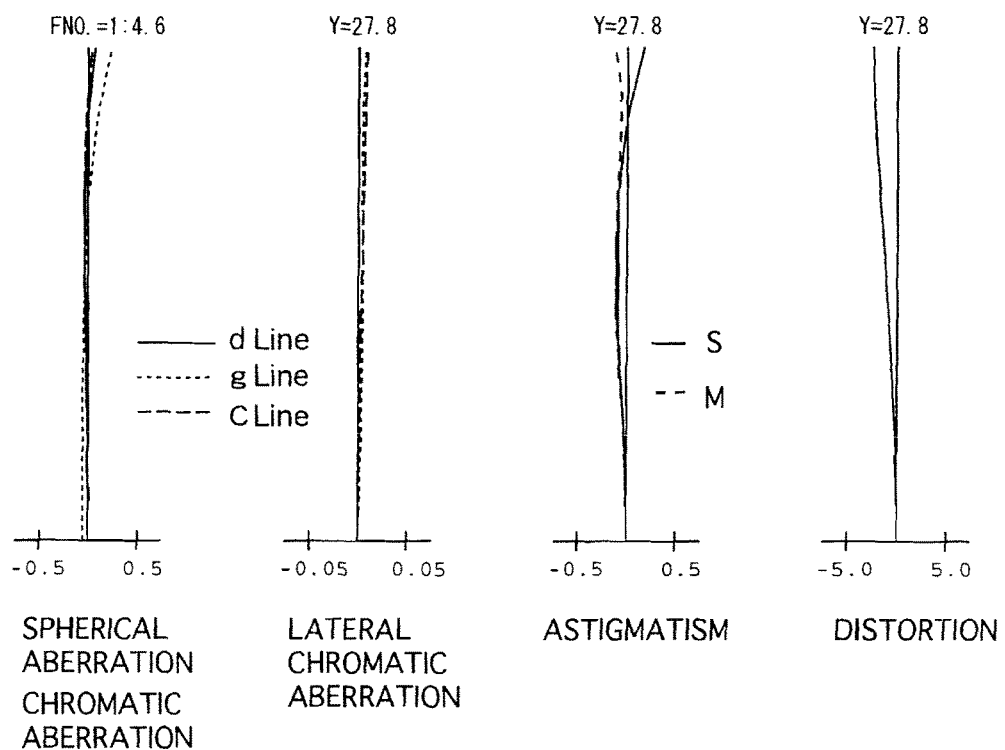
FIGS. 111A, 111B, 111C and 111D show various aberrations that occurred in the lens arrangement shown in FIG. 110, at the short focal length extremity when focused on an object at infinity.
Figure 112A:
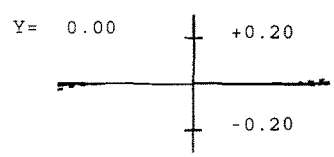
FIGS. 112A, 112B and 112C show lateral aberrations that occurred in the lens arrangement shown in FIG. 110, at the short focal length extremity when focused on an object at infinity.
Figure 112B:
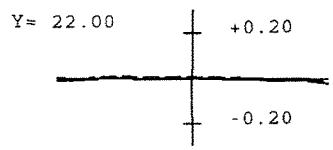
Figure 112C:
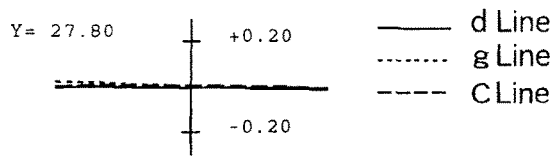
Figures 115A, 115B, 115C, 115D:
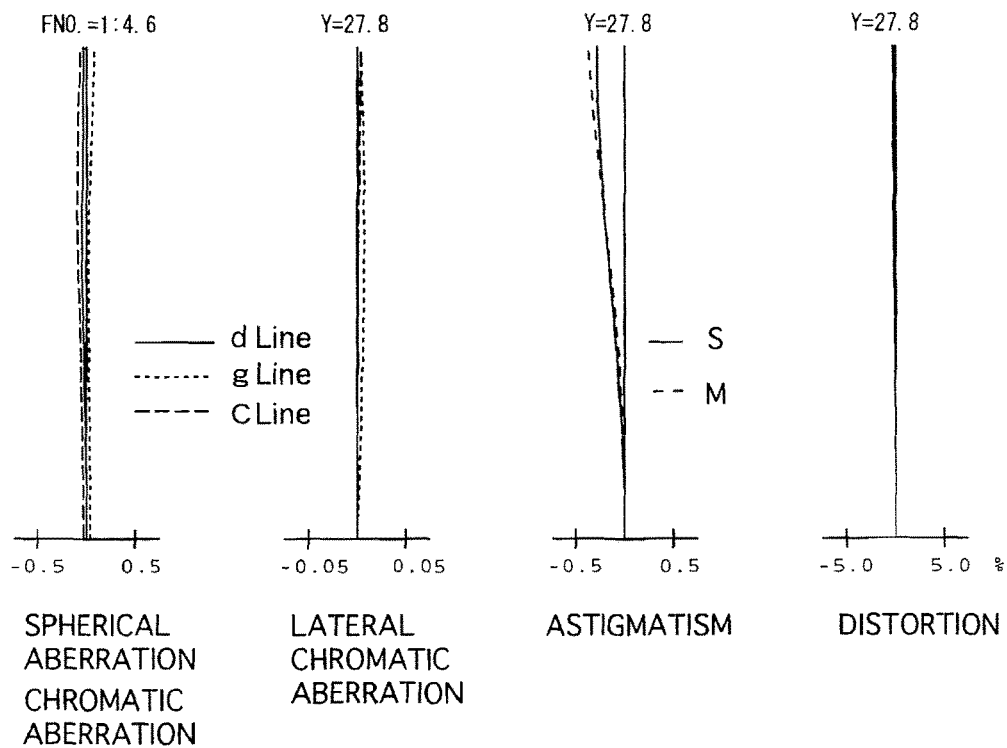
FIGS. 115A, 115B, 115C and 115D show various aberrations that occurred in the lens arrangement shown in FIG. 110, at the long focal length extremity when focused on an object at infinity.
Figure 116A:
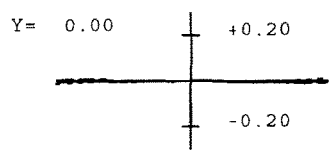
FIGS. 116A, 116B and 116C show lateral aberrations that occurred in the lens arrangement shown in FIG. 110, at the long focal length extremity when focused on an object at infinity.
Figure 116B:
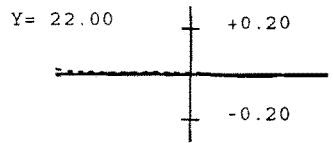
Figure 116C:
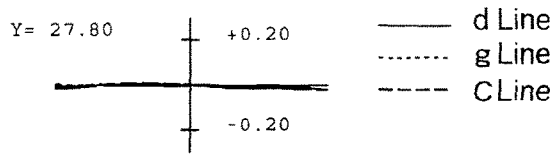

FIGS. 110 through 116C and Tables 59 through 62 show a fourteenth numerical embodiment of the zoom lens system according to the present invention. FIG. 110 shows a lens arrangement of the fourteenth numerical embodiment of the zoom lens system, at the short focal length extremity when focused on an object at infinity. FIGS. 111A, 111B, 111C and 111D show various aberrations that occurred in the lens arrangement shown in FIG. 110, at the short focal length extremity when focused on an object at infinity. FIGS. 112A, 112B and 112C show lateral aberrations that occurred in the lens arrangement shown in FIG. 110, at the short focal length extremity when focused on an object at infinity. FIGS. 113A, 113B, 113C and 113D show various aberrations that occurred in the lens arrangement shown in FIG. 110, at an intermediate focal length when focused on an object at infinity. FIGS. 114A, 114B and 114C show lateral aberrations that occurred in the lens arrangement shown in FIG. 110, at an intermediate focal length when focused on an object at infinity. FIGS. 115A, 115B, 115C and 115D show various aberrations that occurred in the lens arrangement shown in FIG. 110, at the long focal length extremity when focused on an object at infinity. FIGS. 116A, 116B and 116C show lateral aberrations that occurred in the lens arrangement shown in FIG. 110, at the long focal length extremity when focused on an object at infinity. Table 59 shows the lens surface data, Table 60 shows the aspherical surface data, Table 61 shows various lens-system data, and Table 62 shows lens group data.

The fundamental lens arrangement of the fourteenth numerical embodiment is the same as that of the ninth, tenth and thirteenth numerical embodiments.

TABLE 59

LENS SURFACE DATA

| Surf. No. | R | d | N (d) | ν (d) |
|---|---|---|---|---|
| 1 | 62.732 | 2.060 | 1.79952 | 42.2 |
| 2 | 27.200 | 0.200 | 1.52972 | 42.7 |
| 3* | 22.431 | 7.590 | | |
| 4 | 44.393 | 1.650 | 1.81600 | 46.6 |
| 5 | 25.367 | 13.400 | | |
| 6 | −86.316 | 2.000 | 1.67790 | 55.3 |
| 7 | 53.947 | 4.950 | | |
| 8 | 55.435 | 7.130 | 1.63980 | 34.5 |
| 9 | −149.495 | d9 | | |
| 10 | 83.857 | 3.200 | 1.67270 | 32.1 |
| 11 | 327.659 | 1.100 | | |
| 12 | 69.229 | 2.290 | 1.80518 | 25.4 |
| 13 | 28.168 | 7.590 | 1.58144 | 40.7 |
| 14 | −184.840 | 5.270 | | |
| 15 | 84.318 | 3.780 | 1.49700 | 81.6 |
| 16 | −141.779 | 1.710 | | |
| 17 (Diaphragm) | ∞ | d17 | | |
| 18 | −187.069 | 1.500 | 1.83481 | 42.7 |
| 19 | 34.987 | 4.610 | 1.53172 | 48.9 |
| 20 | −76.198 | 0.800 | | |
| 21 | −168.600 | 1.500 | 1.83481 | 42.7 |
| 22 | 54.034 | 0.970 | | |
| 23 | 53.321 | 2.430 | 1.80518 | 25.4 |
| 24 | 545.285 | d24 | | |
| 25 | 34.169 | 5.590 | 1.80000 | 29.9 |
| 26 | ∞ | 1.500 | 1.80100 | 35.0 |
| 27 | 22.167 | 11.180 | 1.49700 | 81.6 |

TABLE 59-continued

LENS SURFACE DATA

| Surf. No. | R | d | N (d) | ν (d) |
|---|---|---|---|---|
| 28 | −70.031 | 0.750 | | |
| 29* | −3178.150 | 0.300 | 1.52972 | 42.7 |
| 30 | −3178.150 | 2.610 | 1.83400 | 37.2 |
| 31 | 31.757 | 8.180 | 1.49700 | 81.6 |
| 32 | −76.901 | — | | |

The asterisk (*) designates an aspherical surface which is rotationally symmetrical with respect to the optical axis.

TABLE 60

ASPHERICAL SURFACE DATA

| Surf. No. | K | A4 | A6 | A8 | A10 |
|---|---|---|---|---|---|
| 3 | −1.000 | 0.2715E−05 | −0.1463E−08 | −0.5046E−12 | −0.3263E−14 |
| 29 | 0.000 | −0.2635E−05 | 0.3314E−09 | −0.1586E−12 | 0.2446E−13 |

TABLE 61

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 44.8 | 38.8 | 32.4 |
| Y | 27.80 | 27.80 | 27.80 |
| fB | 65.85 | 74.57 | 87.31 |
| L | 225.83 | 219.02 | 218.63 |
| d9 | 22.758 | 14.335 | 7.301 |
| d17 | 4.900 | 8.723 | 12.368 |
| d24 | 26.474 | 15.558 | 5.816 |

TABLE 62

LENS GROUP DATA

| Lens Group | 1st Surface | Focal Length |
|---|---|---|
| 1 | 1 | −27.09 |
| 2 | 10 | 49.01 |
| 3 | 18 | −79.02 |
| 4 | 25 | 76.59 |

Numerical Embodiment 15

Figure 117:
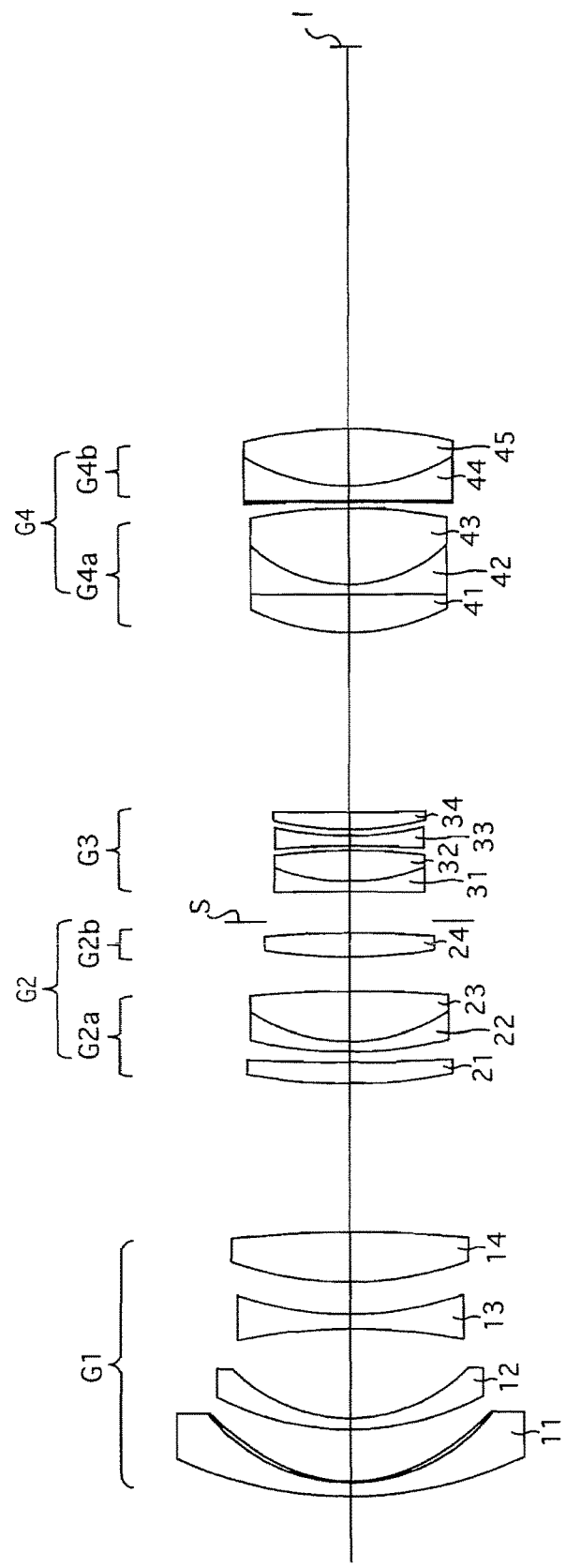
FIG. 117 shows a lens arrangement of a fifteenth numerical embodiment of a zoom lens system, according to the present invention, at the short focal length extremity when focused on an object at infinity.

FIGS. 117 through 123C and Tables 63 through 66 show a fifteenth numerical embodiment of the zoom lens system according to the present invention. FIG. 117 shows a lens arrangement of the fifteenth numerical embodiment of the zoom lens system, at the short focal length extremity when focused on an object at infinity. FIGS. 118A, 118B, 118C and 118D show various aberrations that occurred in the lens arrangement shown in FIG. 117, at the short focal length extremity when focused on an object at infinity. FIGS. 119A, 119B and 119C show lateral aberrations that occurred in the lens arrangement shown in FIG. 117, at the short focal length extremity when focused on an object at infinity. FIGS. 120A, 120B, 120C and 120D show various aberrations that occurred in the lens arrangement shown in FIG. 117, at an intermediate focal length when focused on an object at infinity. FIGS. 121A, 121B and 121C show lateral aberrations that occurred in the lens arrangement shown in FIG. 117, at an intermediate focal length when focused on an object at infinity. FIGS. 122A, 122B, 122C and 122D show various aberrations that occurred in the lens arrangement shown in FIG. 117, at the long focal length extremity when focused on an object at infinity. FIGS. 123A, 123B and 123C show lateral aberrations that occurred in the lens arrangement shown in FIG. 117, at the long focal length extremity when focused on an object at infinity. Table 63 shows the lens surface data, Table 64 shows the aspherical surface data, Table 65 shows various lens-system data, and Table 66 shows lens group data.

The fundamental lens arrangement of the fifteenth numerical embodiment is the same as that of the ninth, tenth, thirteenth and fourteenth numerical embodiments.

TABLE 63

LENS SURFACE DATA

| Surf. No. | R | d | N (d) | ν (d) |
|---|---|---|---|---|
| 1 | 61.615 | 2.050 | 1.79952 | 42.2 |
| 2 | 27.200 | 0.200 | 1.52972 | 42.7 |
| 3* | 22.385 | 7.820 | | |
| 4 | 43.680 | 1.650 | 1.80440 | 39.6 |
| 5 | 24.960 | 13.450 | | |
| 6 | −86.610 | 2.200 | 1.67790 | 55.3 |
| 7 | 51.905 | 4.790 | | |
| 8 | 54.398 | 7.390 | 1.66680 | 33.0 |
| 9 | −177.664 | d9 | | |
| 10 | 84.841 | 3.200 | 1.72151 | 29.2 |
| 11 | 314.128 | 1.550 | | |
| 12 | 65.840 | 1.500 | 1.80518 | 25.4 |
| 13 | 27.531 | 7.410 | 1.58144 | 40.7 |
| 14 | −201.077 | 5.166 | | |
| 15 | 83.879 | 3.580 | 1.49700 | 81.6 |
| 16 | −148.056 | 1.720 | | |
| 17 (Diaphragm) | ∞ | d17 | | |
| 18 | −523.319 | 1.500 | 1.83481 | 42.7 |
| 19 | 32.613 | 4.600 | 1.51742 | 52.4 |
| 20 | −90.712 | 0.700 | | |
| 21 | −151.265 | 1.500 | 1.83481 | 42.7 |
| 22 | 51.464 | 0.960 | | |
| 23 | 50.433 | 2.530 | 1.78472 | 25.7 |
| 24 | 607.345 | d24 | | |
| 25 | 33.569 | 5.650 | 1.80000 | 29.9 |
| 26 | ∞ | 1.500 | 1.80100 | 35.0 |
| 27 | 21.950 | 11.320 | 1.49700 | 81.6 |
| 28 | −78.126 | 0.810 | | |
| 29* | −2089.969 | 0.200 | 1.52972 | 42.7 |
| 30 | −2089.969 | 2.230 | 1.83400 | 37.2 |
| 31 | 31.062 | 8.500 | 1.49700 | 81.6 |
| 32 | −67.070 | — | | |

The asterisk (*) designates an aspherical surface which is rotationally symmetrical with respect to the optical axis.

TABLE 64

ASPHERICAL SURFACE DATA

| Surf. No. | K | A4 | A6 | A8 | A10 |
|---|---|---|---|---|---|
| 3 | −1.000 | 0.2709E−05 | −0.1514E−08 | −0.6028E−12 | −0.3340E−14 |
| 29 | 0.000 | −0.2632E−05 | 0.4566E−09 | 0.3709E−12 | 0.2249E−13 |

TABLE 65

VARIOUS LENS-SYSTEM DATA
Zoom Ratio: 1.53

| | Short Focal Length Extremity | Intermediate Focal Length | Long Focal Length Extremity |
|---|---|---|---|
| FNO. | 4.6 | 4.6 | 4.6 |
| f | 28.70 | 35.00 | 43.87 |
| W | 44.6 | 38.7 | 32.4 |
| Y | 27.80 | 27.80 | 27.80 |
| fB | 65.85 | 74.81 | 87.85 |
| L | 224.85 | 217.85 | 217.68 |
| d9 | 22.070 | 13.879 | 7.038 |
| d17 | 4.470 | 8.004 | 11.297 |
| d24 | 26.778 | 15.481 | 5.820 |

TABLE 66

LENS GROUP DATA

| Lens Group | 1st Surface | Focal Length |
|---|---|---|
| 1 | 1 | −26.74 |
| 2 | 10 | 48.34 |
| 3 | 18 | −77.81 |
| 4 | 25 | 75.96 |

The numerical values of each condition for each of the first through sixth embodiments are shown in Table 67.

TABLE 67

| | Embod. 1 | Embod. 2 | Embod. 3 |
|---|---|---|---|
| Cond. (1) | 0.11 | 0.40 | 0.55 |
| Cond. (2) | −0.09 | −0.05 | −0.14 |
| Cond. (3) | 0.11 | −0.81 | −1.06 |
| Cond. (4) | −0.51 | −0.36 | −0.34 |
| Cond. (5) | −0.62 | −0.44 | −0.41 |
| | Embod. 4 | Embod. 5 | Embod. 6 |
| Cond. (1) | 0.81 | 0.92 | 1.07 |
| Cond. (2) | 0.28 | 0.11 | −0.60 |
| Cond. (3) | −0.26 | −0.41 | 0.68 |
| Cond. (4) | −0.64 | −0.55 | −0.29 |
| Cond. (5) | −0.78 | −0.67 | −0.35 |

As can be understood from Table 67, the first through sixth numerical embodiments satisfy conditions (1) through (5). Furthermore, as can be understood from the aberration diagrams, the various aberrations are favorably corrected.

The numerical values of each condition for each of the seventh through fifteenth embodiments are shown in Table 68.

TABLE 68

|  | Embod. 7 | Embod. 8 | Embod. 9 |
| --- | --- | --- | --- |
| Cond. (6) | 1.388 | 1.451 | 1.568 |
| Cond. (7) | −1.79 | −1.82 | −1.81 |
| Cond. (8) | 2.80 | 3.08 | 3.08 |
| Cond. (9) | −2.42 | −2.65 | −2.65 |
| Cond. (10) | −0.90 | −0.92 | −0.91 |
| Cond. (11) | −1.99 | −1.97 | −1.93 |
| Cond. (12) | 19.8 | 16.2 | 18.5 |
| Cond. (13) | 7.5 | 13.4 | 12.4 |
| Cond. (14) | 4.91 | 6.11 | 5.92 |
| Cond. (15) | 0.573 | 0.573 | 0.563 |
|  | Embod. 10 | Embod. 11 | Embod. 12 |
| Cond. (6) | 1.763 | 1.875 | 1.886 |
| Cond. (7) | −1.81 | −1.81 | −1.81 |
| Cond. (8) | 3.02 | 3.21 | 3.28 |
| Cond. (9) | −2.66 | −2.78 | −2.88 |
| Cond. (10) | −0.98 | −0.94 | −0.89 |
| Cond. (11) | −2.22 | −1.97 | −1.79 |
| Cond. (12) | 20.3 | 15.4 | 17.8 |
| Cond. (13) | 12.1 | 17.5 | 32.0 |
| Cond. (14) | 5.47 | 6.31 | 6.96 |
| Cond. (15) | 0.580 | 0.573 | 0.583 |
|  | Embod. 13 | Embod. 14 | Embod. 15 |
| Cond. (6) | 2.191 | 2.596 | 2.797 |
| Cond. (7) | −1.79 | −1.81 | −1.81 |
| Cond. (8) | 2.77 | 2.92 | 2.91 |
| Cond. (9) | −2.53 | −2.83 | −2.84 |
| Cond. (10) | −0.95 | −1.12 | −1.16 |
| Cond. (11) | −2.10 | −2.58 | −2.66 |
| Cond. (12) | 23.7 | 20.7 | 20.7 |
| Cond. (13) | 6.6 | 9.7 | 9.3 |
| Cond. (14) | 4.24 | 4.58 | 4.44 |
| Cond. (15) | 0.572 | 0.592 | 0.596 |

As can be understood from Table 68, the seventh through fifteenth numerical embodiments satisfy conditions (6) through (15). Furthermore, as can be understood from the aberration diagrams, the various aberrations are favorably corrected.

Even if a lens element or lens group having effectively no refractive power were to be added to the zoom lens system included in the scope of the claims of the present invention, such a zoom lens system would still remain within the technical scope of the present invention (and would not be excluded from the technical scope of the present invention).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, a negative third lens group and a positive fourth lens group, in that order from the object side, wherein upon zooming from a short focal length extremity to a long focal length extremity, at least said first lens group, said second lens group and said fourth lens group are moved in the optical axis direction of the zoom lens system, wherein said third lens group includes a negative first sub-lens group and a negative second sub-lens group, in that order from the object side, wherein said second sub-lens group is provided with a negative single lens element and a positive single lens element, and an air lens is provided between said negative single lens element and said positive single lens element, and wherein said negative single lens element and said positive single lens element are immediately adjacent to each other.

2. The zoom lens system according to claim 1, wherein said negative single lens element has a concave surface on the image side, and said positive single lens element has a convex surface on the object side, in that order from the object side, wherein said air lens is meniscus-shaped and has a convex surface on the object side.

3. The zoom lens system according to claim 1, wherein the following relationship is satisfied:

$$0.1 < Ri/Ro < 1.1$$

wherein

Ri designates a radius of curvature of the image side surface of said meniscus-shaped air lens provided within said second sub-lens group, and Ro designates a radius of curvature of the object side surface of said meniscus-shaped air lens provided within said second sub-lens group.

4. The zoom lens system according to claim 2, wherein the following relationship is satisfied:

$$0.1 < Ri/Ro < 1.1$$

wherein

Ri designates a radius of curvature of the image side surface of said meniscus-shaped air lens provided within said second sub-lens group, and Ro designates a radius of curvature of the object side surface of said meniscus-shaped air lens provided within said second sub-lens group.

5. The zoom lens system according to claim 1, wherein the focal length of said air lens provided within said second sub-lens group has a positive value.

6. The zoom lens system according to claim 1, wherein the following relationship is satisfied:

$$-0.7 < (R3ao+R3ai)/(R3ao-R3ai) < 0.3$$

wherein

R3ao designates a radius of curvature of an object side surface of said first sub-lens group, and R3ai designates a radius of curvature of an image side surface of said first sub-lens group.

7. The zoom lens system according to claim 1, wherein the following relationship is satisfied:

$$-1.1 < (R3ai-R3bo)/(R3ai+R3bo) < 0.7$$

wherein

R3ai designates a radius of curvature of an image side surface of said first sub-lens group, and R3bo designates a radius of curvature of a surface on an object side surface of said second sub-lens group.

8. The zoom lens system according to claim 1, wherein the following relationships are satisfied:

$$-0.7 < (1-m3bS) \cdot m4S < -0.2$$

and $$-0.8 < (1-m3bL) \cdot m4L < -0.3$$

wherein m3bS designates a lateral magnification of said second sub-lens group when focusing on an object at infinity at the short focal length extremity, m4S designates a lateral magnification of said fourth lens group when focusing on an object at infinity at the short focal length extremity, m3bL designates a lateral magnification of said second sub-lens group when focusing on an object at infinity at the long focal length extremity, and m4L designates a lateral magnification of said fourth lens group when focusing on an object at infinity at the long focal length extremity.

9. The zoom lens system according to claim 1, wherein upon zooming from the short focal length extremity to the long focal length extremity, said third lens group remains stationary with respect to the optical axis direction.

10. The zoom lens system according to claim 1, wherein upon zooming from the short focal length extremity to the long focal length extremity, said third lens group moves in the optical axis direction.

11. The zoom lens system according to claim 8, wherein said second sub-lens group comprises an image-stabilizing lens group.

12. A zoom lens system comprising a negative first lens group, a positive second lens group, a negative third lens group and a positive fourth lens group, in that order from the object side, wherein upon zooming from a short focal length extremity to a long focal length extremity, at least said first lens group, said second lens group and said fourth lens group are moved in the optical axis direction of the zoom lens system, wherein said third lens group includes a negative first sub-lens group and a negative second sub-lens group, in that order from the object side, wherein said second sub-lens group is provided with a negative single lens element and a positive single lens element, and an air lens having a positive focal length is provided between said negative single lens element and said positive single lens element, and wherein said a negative single lens element has a concave surface on the image side, and said positive single lens element has a convex surface on the object side, in that order from the object side, wherein said negative single lens element and said positive single lens element are immediately adjacent to each other and wherein said air lens is meniscus-shaped and has a convex surface on the object side, wherein the following relationship is satisfied:

$$0.1 < Ri/Ro < 1.1$$

wherein

Ri designates a radius of curvature of an image side surface of said meniscus-shaped air lens provided within said second sub-lens group, and Ro designates a radius of curvature of an object side surface of said meniscus-shaped air lens provided within said second sub-lens group.

13. The zoom lens system according to claim 12, wherein said second sub-lens group comprises an image-stabilizing lens group.

* * * * *